(12) United States Patent
Krink et al.

(10) Patent No.: US 11,865,651 B2
(45) Date of Patent: Jan. 9, 2024

(54) ELECTRODES FOR GAS- AND LIQUID-COOLED PLASMA TORCHES

(71) Applicant: KJELLBERG-STIFTUNG, Finsterwalde (DE)

(72) Inventors: Volker Krink, Finsterwalde (DE); Frank Laurisch, Finsterwalde (DE); Ralf-Peter Reinke, Finsterwalde (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 0 days.

(21) Appl. No.: 18/058,049

(22) Filed: Nov. 22, 2022

(65) Prior Publication Data

US 2023/0086150 A1   Mar. 23, 2023

Related U.S. Application Data

(62) Division of application No. 16/622,267, filed as application No. PCT/EP2018/068942 on Jul. 12, 2018.

(30) Foreign Application Priority Data

Jun. 12, 2017  (DE) .......................... 102017112821.2

(51) Int. Cl.
| | |
|---|---|
| *H05H 1/34* | (2006.01) |
| *B23K 9/32* | (2006.01) |
| *B23K 10/00* | (2006.01) |
| *B23K 35/02* | (2006.01) |
| *B23K 37/00* | (2006.01) |
| *H05H 1/28* | (2006.01) |

(52) U.S. Cl.
CPC .............. *B23K 9/322* (2013.01); *B23K 10/00* (2013.01); *B23K 35/0216* (2013.01); *B23K 37/003* (2013.01); *H05H 1/28* (2013.01); *H05H 1/34* (2013.01); *H05H 1/3436* (2021.05); *H05H 1/3457* (2021.05)

(58) Field of Classification Search
CPC ...... H05H 1/34; H05H 1/3436; H05H 1/3457; H05H 1/3468; H05H 1/28
See application file for complete search history.

(56) References Cited

FOREIGN PATENT DOCUMENTS

FR       2996792 A1 *   4/2014   ............... H05H 1/34

* cited by examiner

*Primary Examiner* — Geoffrey S Evans
(74) *Attorney, Agent, or Firm* — Jonathan M. D'Silva; MMI Intellectual Property

(57) ABSTRACT

A method for conducting gas in a gas-cooled plasma torch wherein the plasma torch has a plasma torch body which holds an electrode with an open end and a closed end. A cavity extends from the open end in the direction of the closed end, and which, with a spacing in an axial direction, holds a nozzle by means of a nozzle holder. The nozzle has a central opening with an upstream inlet end, into which the electrode projects, and with an outlet end with a nozzle bore and is surrounded by a nozzle cap and/or a nozzle protection cap. The plasma torch body has an opening for a gas feeder, which opening is fluidically connected to a cooling tube which projects into the open end of the electrode.

28 Claims, 68 Drawing Sheets

ELECTRODES FOR GAS- AND LIQUID-COOLED PLASMA TORCHES

BACKGROUND

The following invention relates to an electrode for an, in particular gas-cooled, plasma torch, to an electrode for a gas-cooled or liquid-cooled plasma torch, to a system composed of an electrode for an, in particular gas-cooled, plasma torch and of a cooling tube, to a single-part or multi-part tubular or annular gas-conducting unit, to a plasma torch, in particular plasma cutting torch, and to a method for conducting gas in a gas-cooled plasma torch, in particular plasma cutting torch, and to a method for operating a plasma torch, in particular plasma cutting torch. The liquid-cooled plasma torch may in particular be a water-cooled plasma torch.

In plasma cutting, an arc (pilot arc) is firstly ignited between a cathode (electrode) and an anode (nozzle) and is subsequently transferred directly to a workpiece in order to thereby make a cut.

Said arc forms a plasma, which is a thermally highly heated electrically conductive gas (plasma gas), which is composed of positive and negative ions, electrons and excited and neutral atoms and molecules. As plasma gas, use is made of gases such as argon, hydrogen, nitrogen, oxygen or air. These gases are ionized and dissociated by the energy of the arc. The resulting plasma jet is used for cutting the workpiece.

A gas-cooled plasma cutting torch is composed substantially of the main elements of plasma torch body, electrode (cathode), nozzle, one or more caps, in particular a nozzle protection cap which surrounds the nozzle, and of connections which serve for the supply of electrical current and gases to the plasma cutting torch. The electrode, the nozzle and nozzle protection cap are the thermally most highly loaded parts. These are subject to intense operational wear and are therefore referred to as wearing parts, which are exchanged at regular intervals.

By contrast to liquid-cooled plasma cutting torches, not liquid but a gas, preferably air, is used for cooling the thermally highly loaded wearing parts of the plasma torch. For this purpose, however, large volume flows or mass flows of air are required in order to achieve an acceptable cooling action. While a water-cooled plasma torch requires between 1000 l/h and 6000 l/h of gas depending on the electrical cutting current, the volume flows of the gas-cooled plasma torches amount to between 12,000 and 18,000 l/h depending on the electrical cutting current. The service life of the wearing parts of gas-cooled plasma torches is nevertheless shorter than that of water-cooled plasma torches.

Advantages of gas-cooled plasma torches are their simple and inexpensive construction and their ease of handling. The exchange of the wearing parts is straightforward. Furthermore, no liquid coolant can lead to faults. In the case of liquid-cooled plasma torches, coolant that finds its way between wearing parts, for example electrode and nozzle, which have a different voltage potential during the cutting process can lead to a short circuit and thus to damage to the plasma torch.

In the case of gas-cooled torches, it is common for air to be used as plasma gas and cooling gas. A system for plasma cutting using a gas-cooled plasma torch is composed at least of an electrical current source for providing the voltage and the electrical current for the plasma cutting process and of a gas supply, which for example of a valve, which activates and deactivates or controls the gas flow and of the plasma torch. The plasma torch is then connected via lines and hoses to the electrical current source and to the gas supply.

The electrical current source and gas supply may be arranged in one housing.

It is common for the air to be fed to the plasma torch via a gas line.

FIG. 1 schematically illustrates an overall system from the prior art. Said system comprises a plasma cutting installation 300. The plasma cutting installation 300 comprises an electrical current source 310, a high-voltage ignition device 320, a control unit 330 for gas or compressed air (compressed-air bottle) (gas supply 335)—in this case a solenoid valve—and a nozzle contactor 350. A plasma torch 10 is connected to the plasma cutting installation 300 via lines 360, which comprise an electrical current line 362 to an electrode 30 and an electrical current line 363 to a nozzle 50 and also a gas hose 361 for a gas feeder.

Likewise, a workpiece 400 is connected via an electrical current line 370 to the plasma cutting installation 300.

In the plasma cutting installation 300, there is situated a controller (not shown) which controls the process sequence, in particular the electrical current, the ignition device and the gas flow.

The plasma torch 10 schematically shown in FIG. 1 is a gas-cooled plasma torch according to the prior art. The plasma torch 10 that is shown comprises a plasma torch body 20 which in turn is composed of multiple constituents (not shown here), for example hose connectors, connectors for electrical lines, electrically insulating parts, for example with openings for conducting gas. Further constituents of the plasma torch are the electrode 30, the nozzle 50, a gas-conducting unit 70 and a nozzle protection cap 60. These are illustrated schematically.

The nozzle 50 has an internal cavity, in which a part of the electrode 30 with the emission insert 31 is arranged, and a nozzle bore 51. The electrode 30 and the nozzle 50 are mounted so as to be insulated with respect to one another by means of the gas-conducting unit 70. The nozzle protection cap 60 has an internal cavity which surrounds a part of the nozzle 50 with a spacing and which is likewise electrically insulated with respect thereto. The gas-conducting unit 70 is composed of electrically insulating material, while the electrode 30, the nozzle 50 and the nozzle protection cap 60 are composed of material with good electrical conductivity, normally copper or an alloy with copper. The emission insert 31 in the electrode 30 is composed of material with a higher melting point than the electrode itself. Hafnium, zirconium or tungsten is normally used here.

For the cutting process, a total gas stream flows firstly through a gas feeder 23, then through a cavity 32 of the electrode 30, and is then, in the plasma torch body 20, divided up into a first partial gas stream 210 (plasma gas), which flows between the electrode 30 and the nozzle 50 and then out of the nozzle bore 51, and a second partial gas stream 220 (cooling gas, nozzle-nozzle protection cap), which flows between the nozzle 50 and the nozzle protection cap 60 and then out of a nozzle protection cap opening 61. This is followed by the ignition of a pilot arc that burns between the electrode 30 and the nozzle 50. The ignition is performed by applying a high voltage, with the aid of the high-voltage ignition device 320, between the electrode 30 and the nozzle 50. The high voltage ionizes the plasma gas such that it becomes electrically conductive, and the pilot arc is formed. When the pilot arc makes contact with the workpiece 400, the anodic point of contact moves from the nozzle 50 to the workpiece 400 owing to the voltage drop, generated by the pilot resistor 340, between nozzle 50 and workpiece 400, and the plasma jet 15 burns between the electrode 30 and the workpiece 400. Cutting can be performed.

It is also possible to ignite the pilot arc by means of a short circuit. Here, the electrode 30 and the nozzle 50 are in contact with one another by way of physical contact. For this purpose, the nozzle 50 and/or the electrode 30 are mounted so as to be movable relative to one another. After the activation of the electrical current source, an electrical current flows between the electrode 30 and the nozzle 50 through the short circuit. The total gas stream is subsequently activated, and the nozzle and the electrode are separated from one another by the pressure generated in the space by the flowing plasma gas, and the pilot arc is ignited. There is then no need for a high-voltage ignition device.

With this system, that is to say the division of the total gas stream into a first partial gas stream 210 (plasma gas) and second partial gas stream 220 (cooling gas, nozzle-nozzle protection cap), a service life of 100 cuts with in each case 20 seconds cutting time at 100 A was achieved. It was subsequently necessary to exchange the electrode 30 and the nozzle 50, because they were worn. Furthermore, the plasma torch body 20 was very hot. This leads, in particular in the case of the plastics parts used, to a shortening of the service life of the plasma torch 10 as a whole. This in turn leads to high costs. Furthermore, the working process must be interrupted for the exchange of the wearing parts.

SUMMARY

The present invention is therefore based on the object of lengthening the service life of the wearing parts in order to reduce the costs of the operation of a plasma torch, in particular of the plasma cutting, and to increase productivity.

According to the invention, said object is achieved according to a first aspect by means of an electrode for an, in particular gas-cooled, plasma torch, in particular plasma cutting torch, wherein the electrode has:
 an elongate electrode body with an open end and with a closed end which define a longitudinal axis L, and
 an emission insert in the closed end, wherein a cavity extends in the electrode body from the open end of the electrode body in the direction of the closed end, and the cavity is fluidically connected via at least one opening in the wall thereof or in the front solid portion of the closed end to the radial outer side, in relation to the longitudinal axis, of the electrode body.

According to a further aspect, said object is achieved by means of an electrode for a gas-cooled or liquid-cooled plasma torch, in particular plasma cutting torch, wherein the electrode has:
 an elongate electrode body with an open end and with a closed end which define a longitudinal axis (L), and
 an emission insert in the closed end, wherein a cavity extends in the electrode body from the open end of the electrode body in the direction of the closed end, and wherein at least one depression, one elevation and one depression are situated in a direct sequence on the outer surface approximately in the front third of the longitudinal extent of the electrode body.

Said object is furthermore achieved by means of a system composed of an electrode for an, in particular gas-cooled, plasma torch, in particular plasma cutting torch, and of a cooling tube, wherein the cooling tube has an elongate cooling tube body with a front end arranged in the open end of the electrode and with a rear end and with a coolant channel extending through said cooling tube body, wherein the front end of the cooling tube projects beyond the opening or the openings in the wall of the cavity in the electrode body into the electrode.

Said object is furthermore achieved by means of a system composed of an electrode for an, in particular gas-cooled, plasma torch, in particular plasma cutting torch, and of a cooling tube, wherein the cooling tube has an elongate cooling tube body with a front end arranged in the open end of the electrode and with a rear end and with a coolant channel extending through said cooling tube projects body, wherein the front end of the cooling tube projects into the electrode as far as the transition between the first cylindrical portion and the second cylindrical portion of the cavity.

According to a further aspect, said object is achieved by means of a single-part or multi-part tubular or annular gas-conducting unit for a gas-cooled plasma torch, in particular plasma cutting torch, wherein the gas-conducting unit has:
 a single-part or multi-part tubular or annular gas-conducting unit body with a longitudinal axis L1, wherein, in the wall of the gas-conducting unit body, there are situated at least one opening, which is inclined by an angle $\delta$ in a range of $\pm 20°$, preferably $\pm 15°$, with respect to the longitudinal axis L1, and at least one opening, which is inclined radially with respect to the longitudinal axis L1 or which, in a radial plane, is inclined at an angle $\gamma$ in the range of $\pm 45°$, preferably $\pm 30°$, from the radial to the longitudinal axis L1.

Said object is furthermore achieved by means of a plasma torch, in particular plasma cutting torch, having an electrode.

Said object is also achieved by means of a plasma torch, in particular plasma cutting torch, having a system.

Said object is furthermore achieved by means of a plasma torch, in particular plasma cutting torch, comprising a gas-conducting unit.

Said object is furthermore achieved by means of a method for conducting gas in a gas-cooled plasma torch, wherein the plasma torch has a plasma torch body which holds an electrode with an open end and a closed end, wherein a cavity extends from the open end in the direction of the closed end, and which, with a spacing in an axial direction, holds a nozzle by means of a nozzle holder, wherein the nozzle has a central opening with an upstream inlet end, into which the electrode projects, and with an outlet end with a nozzle bore and is surrounded by a nozzle cap and/or a nozzle protection cap, wherein the plasma torch body has an opening for a gas feeder, which opening is fluidically connected to a cooling tube which projects into the open end of the electrode, wherein the method comprises:
 conducting a total gas stream through the opening of the gas feeder, conducting the total gas stream through the cooling tube into the electrode in the direction of the closed end of the electrode,
 conducting the total gas stream out of the electrode via an annular gap between the cooling tube and the electrode either only via a gas channel in the plasma torch body, which gas channel is fluidically connected to the annular gap via the open end of the electrode, or additionally via at least one opening in the wall of the electrode, and
 conducting the first partial gas stream of the total gas stream through the first space formed between the electrode and the nozzle and through the nozzle bore, conducting a second partial gas stream of the total gas stream through a second space formed by the nozzle and the nozzle cap and/or through a space formed by the nozzle cap and the nozzle protection cap or through a second space formed by the nozzle and the nozzle protection cap and possibly also outward through one or more openings in the nozzle protection cap, and conducting a third partial gas stream of the total gas stream through a third space formed between the electrode and a gas-conducting unit and through one or more openings in the gas-conducting unit to the outer side of the plasma torch.

The third space may be an annular gap, or may comprise this.

Said object is furthermore achieved by means of a method for conducting gas in a gas-cooled plasma torch, wherein the plasma torch has a plasma torch body which holds an electrode with an open end and a closed end, wherein a cavity extends from the open end in the direction of the closed end, and which, with a spacing in an axial direction, holds a nozzle by means of a nozzle holder, wherein the nozzle has a central opening with an upstream inlet end, into which the electrode projects, and with an outlet end with a nozzle bore and is surrounded by a nozzle cap and/or a nozzle protection cap, wherein the plasma torch body has a plasma gas feeder, wherein the method comprises:

conducting a total gas stream through the opening for the gas feeder, branching off either i) a second partial gas stream or ii) a first and a second partial gas stream or iii) a second and a third partial gas stream from the total gas stream upstream of the electrode via a gas channel in the plasma torch body, conducting the remaining gas stream through the open end of the electrode into the cavity in the direction of the closed end of the electrode, conducting the remaining gas stream out of the electrode via at least one opening in the wall of the electrode, and conducting the first partial gas stream of the total gas stream through the first space formed between the electrode and the nozzle and through the nozzle bore, conducting the second partial gas stream of the total gas stream through a second space formed by the nozzle and the nozzle cap and/or through a second space formed by the nozzle and the nozzle protection cap and possibly also outward through one or more openings in the nozzle protection cap, and conducting the third partial gas stream of the total gas stream through a third space formed between the electrode and a gas-conducting unit and through one or more openings in the gas-conducting unit to the outer side of the plasma torch.

Finally, the present invention also provides an electrode for a gas-cooled or liquid-cooled plasma torch, in particular plasma cutting torch, in particular electrode, wherein the electrode has:

an elongate electrode body with a rear open end and a front closed end which define a longitudinal axis L, wherein the front closed end has a substantially cylindrical outer surface, and an emission insert in the closed end, wherein at least one depression, one elevation and one depression are situated in a direct sequence on the outer surface approximately in the front third of the longitudinal extent of the electrode body, and a plasma torch, comprising a plasma torch body which an electrode with an open end and a closed end and, with a spacing in an axial direction, a nozzle by means of a nozzle holder, wherein the electrode projects with its front, closed end into the nozzle and the electrode and the nozzle are insulated with respect to one another by means of a gas-conducting unit, wherein the electrode is an electrode.

The expressions "depression" and "elevation" relate only to the immediate vicinity. In other words, a "depression" is not imperatively meant as relating to the maximum diameter. Correspondingly, an "elevation" is not imperatively meant as going beyond the maximum diameter or the outer contour of the electrode.

In the case of the electrode according to the first aspect, provision may be made whereby the cavity extends from the open end over more than half, more preferably over more than two thirds, even more preferably over more than five sixths, of the length of the electrode body toward the closed end.

In particular, provision may be made whereby the opening or at least one of the openings is/are situated—as viewed from the closed end—at a distance of at most one half, more preferably one third, even more preferably one sixth, of the length of the electrode body.

Expediently, the opening or at least one of the openings extends entirely or partially radially with respect to the longitudinal axis L and/or with an offset a; b with respect to the radial to the longitudinal axis L and/or at an angle $\alpha$ in a range from 45° to 90° with respect to the longitudinal axis L in the direction of the open end and/or at an angle $\beta$ in a range from 45° to 90° with respect to the longitudinal axis L in the direction of the closed end and/or at an angle $\epsilon \neq 0$ with respect to the radial to the longitudinal axis L. Expediently, the cavity is cylindrical or has at least one cylindrical portion.

In a particular embodiment, the cavity has a first cylindrical portion with a first diameter and has a second cylindrical portion with a second diameter, wherein the first cylindrical portion is situated closer to the closed end than the second cylindrical portion, and the first diameter is smaller than the second diameter.

Advantageously, the cross-sectional area of the cavity radially with respect to the longitudinal axis L or the largest cross-sectional area of the cavity radially with respect to the longitudinal axis L is larger, preferably by a factor of 2, even more preferably by a factor of 4, than the cross-sectional area of the opening or larger than the sum of the cross-sectional areas of the openings. This refers in particular to the cross-sectional area that is relevant with regard to flow.

Expediently, the smallest cross-sectional area of the cavity radially with respect to the longitudinal axis L is larger, preferably by a factor of 2, even more preferably by a factor of 4, than the cross-sectional area of the opening or than the sum of the cross-sectional areas of the openings.

Provision may furthermore be made whereby the electrode body has an external thread on its outer surface at the open end.

It is also conceivable that the radial outer surface, in relation to the longitudinal axis L, of the electrode body has—proceeding from the closed end—a substantially cylindrical first portion and a second portion which, preferably directly, adjoins said first portion, wherein the second portion has, per unit of length along the longitudinal axis L, a larger surface area than the first portion.

Expediently, the second portion has a thread or at least one spiral-shaped groove.

In a particular embodiment, the radial outer surface, in relation to the longitudinal axis L, of the electrode body has a third portion which, preferably directly, adjoins the second portion in the direction of the open end and which has a largest diameter which is larger than the largest diameter of the first and second portions of the outer surface of the electrode body.

In particular, provision may be made whereby the third portion is part of the open end.

It is furthermore conceivable that the third portion has the external thread.

Expediently, the electrode body has, in its outer surface in the region of the largest diameter, an encircling groove and a round ring in the groove.

Advantageously, on the base of the cavity, preferably centrally, a preferably pillar-like projection extends in the direction of the open end.

In the case of the electrode, provision may be made whereby the direct sequence of at least one depression, one elevation and one depression is arranged on the outer surface between the openings and the end surface of the closed end 33.

In the case of the system, provision may be made whereby the largest cross-sectional area of the coolant channel is larger, preferably by a factor of 2, even more preferably by a factor of 4, than the cross-sectional area or larger than the sum of the cross-sectional areas of the openings. This refers in particular to the cross-sectional area that is relevant with regard to flow.

The gas-conducting unit is advantageously electrically insulating.

In the case of the plasma torch, provision may be made whereby the gas-conducting unit is electrically insulating and is arranged such that it spaces a nozzle belonging to the plasma torch and an electrode belonging to the plasma torch apart from one another in an axial direction and electrically insulates these.

In particular, provision may be made here whereby the electrode is arranged in the gas-conducting unit such that an annular gap results between the electrode and the gas-conducting unit over a partial region in the longitudinal direction. For example, the third space may be an annular gap, or may comprise this.

In particular, provision may be made here whereby the annular gap is, preferably directly, fluidically connected to the outer side of the gas-conducting unit and/or to the inner side of the electrode and/or to the at least one opening which is inclined at an angle δ in a range of ±20°, preferably ±15°, with respect to the longitudinal axis L1. The annular gap is advantageously also fluidically connected to the outer side of the plasma torch body.

Advantageously, the at least one opening which is inclined at an angle δ in a range of ±20°, preferably ±15°, with respect to the longitudinal axis L1 is fluidically connected to the nozzle bore via the inner side and/or the outer side of the nozzle.

The plasma torch advantageously has an opening for the gas feeder.

The plasma torch likewise advantageously has a gas distributor connected downstream of the opening for the gas feeder.

The plasma torch expediently has a nozzle protection cap.

In a particular embodiment, the plasma torch is a gas-cooled plasma torch.

In a particular embodiment, the plasma torch is a liquid-cooled plasma torch.

In the method for conducting gas, provision may be made whereby the third partial gas stream is conducted through one or more openings in the nozzle holder to the outer side of the plasma torch.

Provision may furthermore be made whereby the total gas stream is divided up into the first to third partial gas streams only after exiting the electrode.

Advantageously, the total gas stream is, after exiting the electrode, conducted through the at least one opening which is inclined at an angle δ in a range of ±20°, preferably ±15°, with respect to the longitudinal axis L1.

Expediently, the third partial gas stream is branched off from the total gas stream via the at least one opening in the wall of the electrode.

In a particular embodiment, the gas stream that corresponds to the total gas stream minus the third partial gas stream is, after exiting the electrode, conducted through at least one opening, which is inclined with respect to the longitudinal axis L1 or at an angle δ in the range of ±20°, preferably ±15°, with respect to the longitudinal axis L1, in the gas-conducting unit. Advantageously, the first partial gas stream is branched off from the total gas stream via the at least one opening in the wall of the electrode.

In particular, provision may be made here whereby the gas stream that corresponds to the total gas stream minus the first partial gas stream is, after exiting the electrode, conducted through at least one opening which is inclined at an angle δ in a range of ±20°, preferably ±15°, with respect to the longitudinal axis L1.

Provision may also be made whereby the first and third partial gas streams are branched off from the total gas stream via the at least one opening in the wall of the electrode.

In particular, provision may be made whereby the second partial gas stream is, after exiting the electrode, conducted through at least one opening which is inclined at an angle δ in a range of ±20°, preferably ±15°, with respect to the longitudinal axis L1.

Advantageously, the third partial gas stream 230 is conducted through one or more openings in the nozzle holder to the outer side of the plasma torch.

In a further particular embodiment, if the remaining gas stream comprises the first partial gas stream and a third partial gas stream, said remaining gas stream is also divided up in the electrode into the first partial gas stream and the third partial gas stream.

In particular, provision may be made here whereby the remaining gas stream is divided up by branching off the first and third partial gas streams via the at least one opening in the wall of the electrode.

Advantageously, the branched-off second partial gas stream is conducted through the at least one opening which is inclined at an angle in a range of ±20°, preferably ±15°, with respect to the longitudinal axis L1.

In a particular embodiment, if the first and the second partial gas stream are branched off upstream of the electrode, the branched-off first and second partial gas streams are conducted through the at least one opening which is inclined relative to the longitudinal axis L1 at an angle δ in the range of ±20°, preferably ±15°, with respect to the longitudinal axis L1.

Expediently, the conducting of the first partial gas stream through the first space comprises conducting through the first space with rotation about the longitudinal axis L1 in the direction of the closed end of the electrode.

Advantageously, the conducting of the third partial gas stream through the third space comprises conducting through the third space about the longitudinal axis L1 in the direction of the open end of the electrode.

Provision may furthermore be made whereby, during operation, the difference between a pressure p1 in the cavity and a pressure p2 in the third space and/or the difference between the pressure p1 in the cavity and a pressure p3 in the first space, preferably in the immediate vicinity of the opening(s), are/is selected so as to amount to at least 0.5 bar, preferably at least 1 bar.

Provision may also be made whereby, during operation, a pressure drop in the cavity between the open end of the electrode or the interior space of the cooling tube between the rear end and the front end and the opening(s) of the electrode is smaller than a pressure drop across the opening(s) between the inner surface and the outer surface of the electrode.

Finally, the operation may comprise cutting operation and/or operation with a burning arc.

In a particular embodiment of the electrode, the direct sequence of at least one depression, one elevation and one depression is arranged on the outer surface between the openings and the end surface of the closed end.

Advantageously, the width b33b of the elevation between the depressions is smaller than the sum of the widths b33a and b33c of the depressions, preferably smaller than the width b33a or b33c of one of the depressions.

In the case of the electrode, provision may be made whereby the depression, the elevation and the depression extend on the surface in a circumferential direction or with a maximum deviation of 10°, preferably at most 5°, with respect to the circumferential direction.

Advantageously, the depression, the elevation and the depression extend over at least ⅕, one half or the entirety of the circumference.

In particular, provision may be made whereby the depression, the elevation and the depression extend on segments of the circumference.

In a particular embodiment of the present invention, the elevation has a diameter D33b which is at most equal to its maximum diameter D37c and/or to the maximum diameter D37b of its front third.

Provision may also be made whereby the depth t33a, t33c of the depressions amounts to at most ⅒, preferably at most ⅟₂₀ and even more preferably ⅟₃₀ of the largest diameter D37c of the electrode or to at most one millimeter, advantageously at most 0.5 millimeters, even more preferably at most 0.3 millimeters.

Advantageously, an interior space or cavity which extends in the interior of the electrode proceeding from the rear end extends at most as far as the depression, elevation and depression.

In the case of the plasma torch, provision may be made whereby the diameter D33b of the elevation of the electrode is smaller than or equal to the inner diameter D70a of the gas-conducting unit.

Advantageously, at least one depression, one elevation and one depression of the electrode are situated opposite the inner surface of the nozzle.

Finally, provision may be made whereby the shortest spacing S33b between the gas-conducting unit and the elevation of the electrode amounts to at least 1.5 mm, advantageously at least 3 mm.

BRIEF DESCRIPTION OF DRAWINGS

Further features and advantages of the invention will emerge from the appended claims and from the following description, which describes multiple exemplary embodiments of the invention with reference to the schematic drawings, in which:

FIG. 18d shows an exemplary variant in relation to the electrode of FIG. 18a;

DETAILED DESCRIPTION

Figure 1:
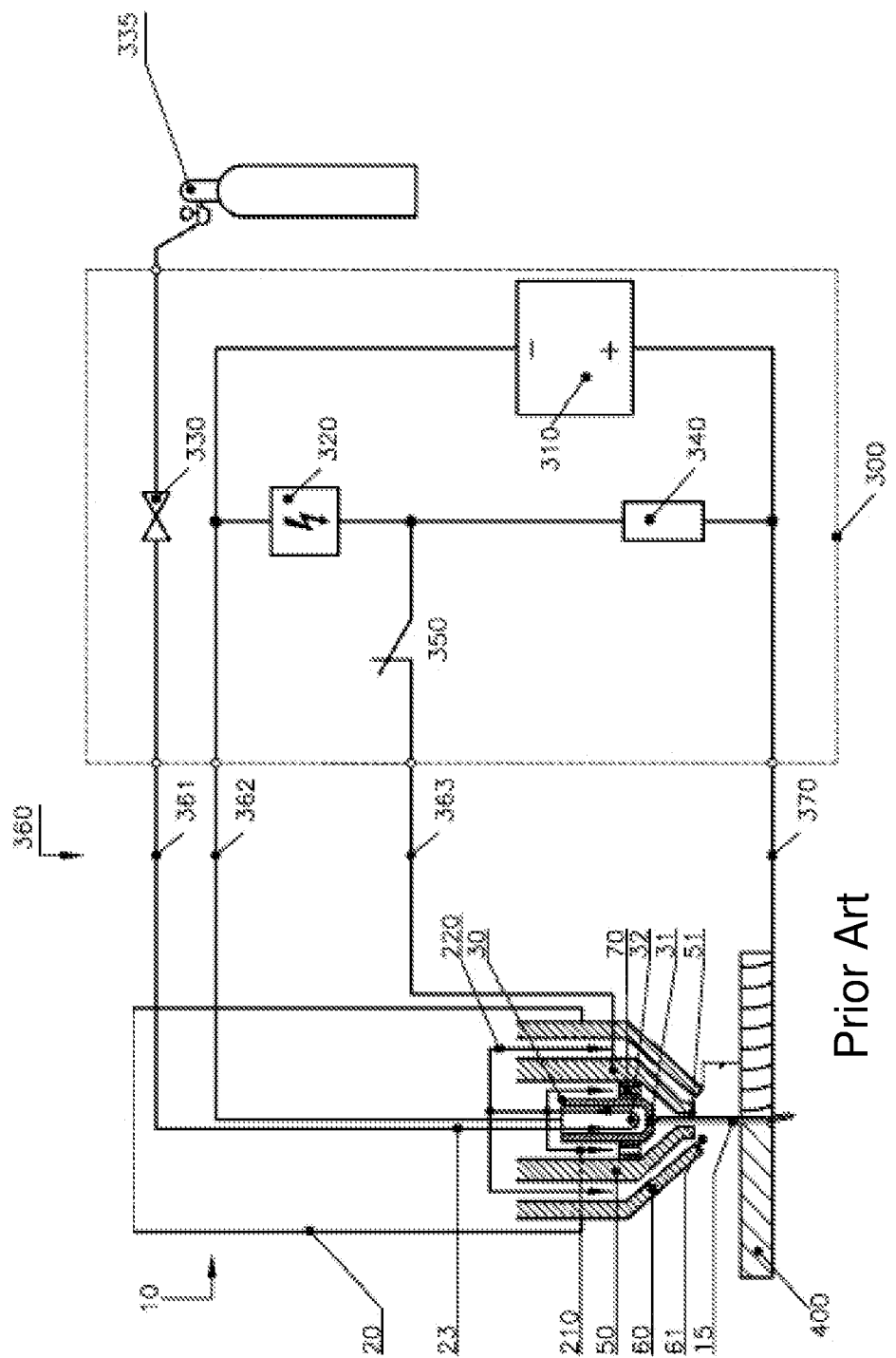
FIG. 1 is a schematic illustration of a plasma cutting installation according to the prior art.
Figure 2:
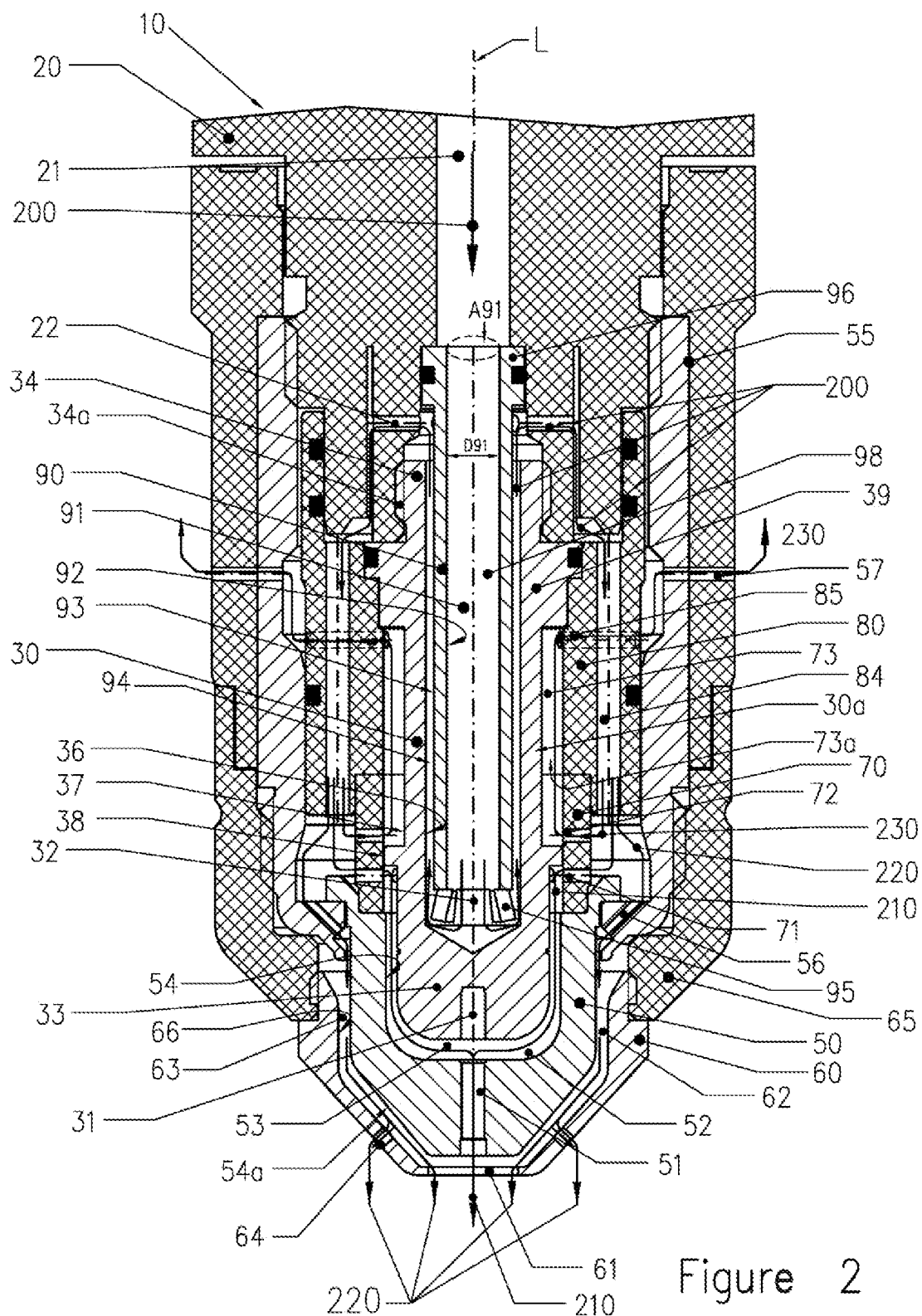
FIG. 2 is a sectional diagram of a plasma torch according to a particular embodiment of the present invention.
Figure 2A:
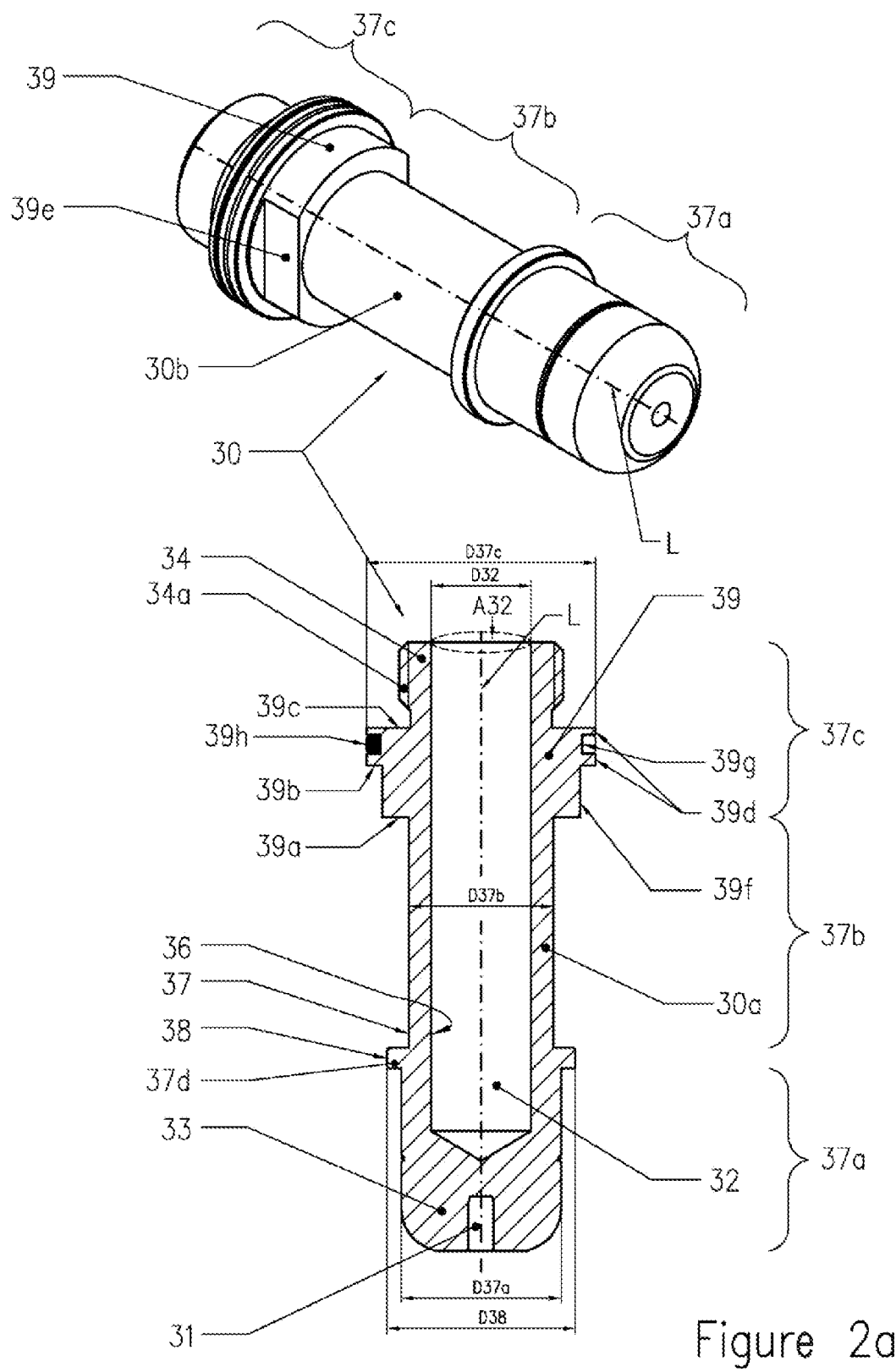
FIG. 2a shows an electrode of the plasma torch from FIG. 2.
Figure 2B:
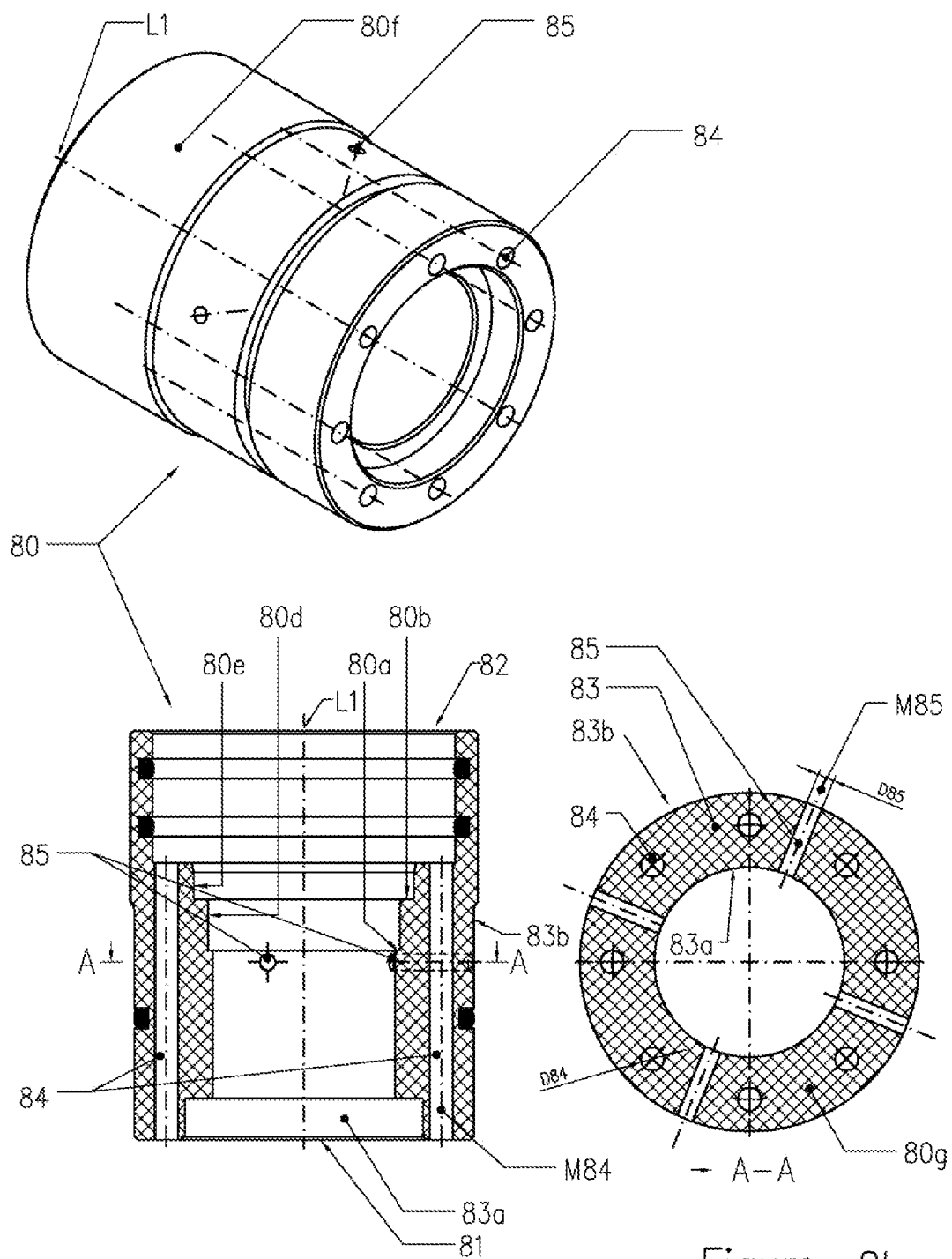
FIG. 2b shows a rear gas-conducting unit of a plasma torch as per FIG. 2.
Figure 2C:
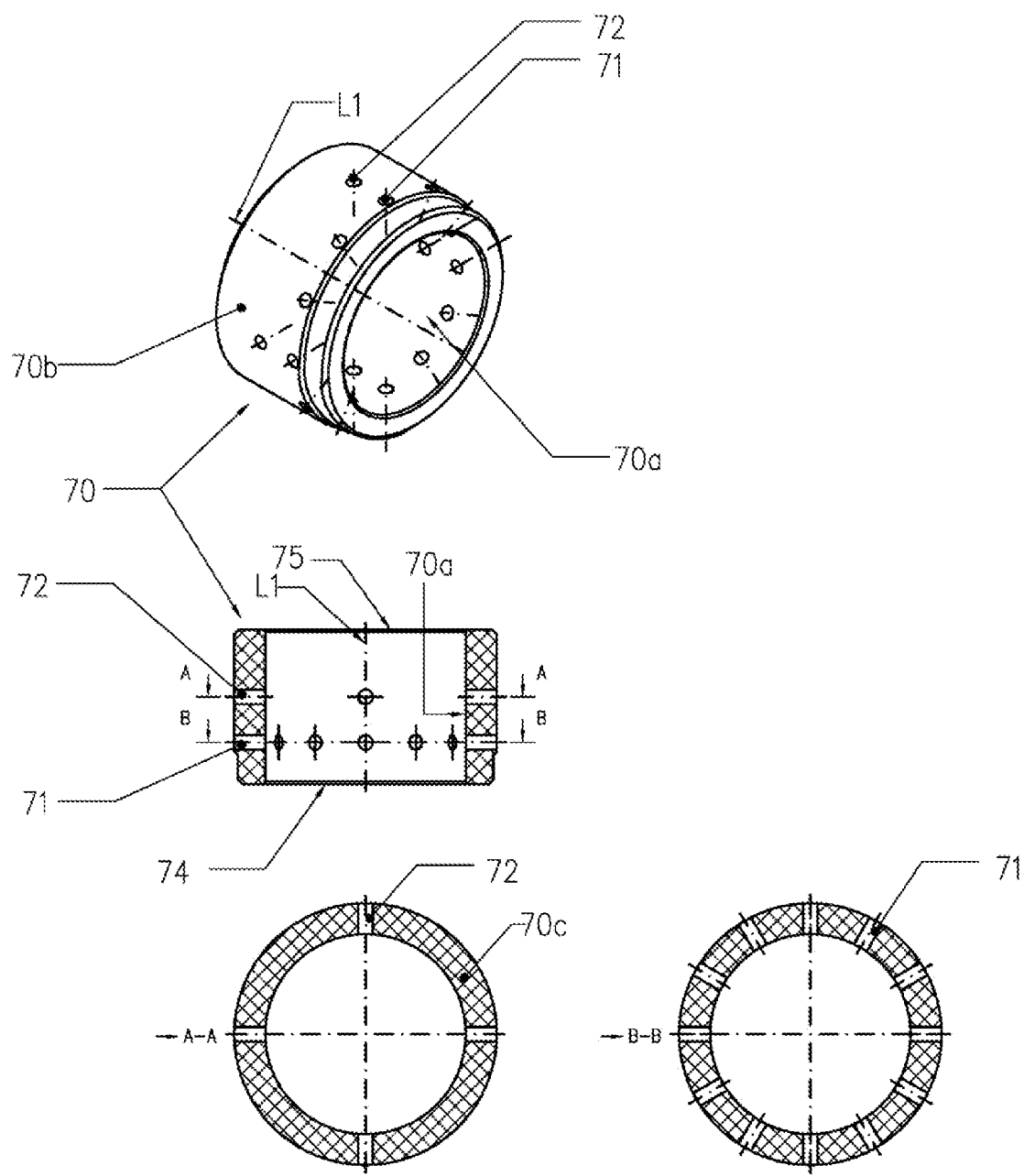
FIG. 2c shows a front gas-conducting unit of a plasma torch as per FIG. 2.

FIG. 2 shows, by way of example, a plasma torch 10 according to a particular embodiment of the invention. FIG. 2a shows details of an electrode 30 used therein, FIG. 2b shows details of a gas-conducting unit 80 used therein, and FIG. 2c shows of a gas-conducting unit 70 used therein. The plasma torch 10 that is shown comprises a plasma torch body 20 which in turn is composed of multiple constituents (not shown here), for example hose connectors, connectors for electrical lines and electrically conductive parts for conducting electrical currents and also electrically insulating parts, for example with openings for conducting gas.

The electrode 30 is screwed into the plasma torch body 20. The electrode 30 has a front, closed end 33 and a rear, open end 34. The open end 34 leads into an internal cavity 32 of the electrode 30. The cavity 32 with a diameter D32 extends along the longitudinal axis L of the electrode 30 or of the plasma torch body 20. The closed end 33 receives an emission insert 31 for an electric arc. A cooling tube 90 is inserted into an opening 21 of the plasma torch body 20 and projects into the cavity 32 of the electrode 30. The cooling tube 90 projects in with its front end 95 as far as into the vicinity of the end or as far as the end of the cavity 32, and may be supported there in order that it cannot slip any further forward. Here, the electrode 30 is screwed by way of a thread (external thread) 34a at the open end 34 into the torch body 20. A transmission of electrical current from the plasma torch body 20 to the electrode 30 also takes place here. The cavity 32 extends in the direction of the front, closed end 33 at least to an extent to which the thread 34a for screwing into the plasma torch body 20 extends on the outer surface 37 of the electrode 30. In this way, the location of the transmission of electrical current between the plasma torch body 20 and the electrode 30 is cooled.

The outer surface 37 of the electrode 30 comprises, or is substantially composed of, three portions (see also FIG. 2a). A first portion 37a at the front, closed end 33 projects into the internal cavity 52 of the nozzle 50 and into a part of the gas-conducting unit 70, and has a substantially cylindrical shape. A second portion 37b begins after an encircling projection 37d on the surface of the electrode 30 and projects into a part of the gas-conducting unit 70 and into the gas-conducting unit 80, and likewise has a substantially cylindrical shape. A third portion 37c is situated at the rear end 34 of the electrode 30. Said third portion comprises the thread 34a and a region 39 with the (substantially) circular annular stop surfaces 39a, 39b and 39c, the outer (substantially cylindrical) centering surface 39d, and an outer surface 39f with an encircling groove 39g for receiving a round ring. The stop surfaces 39a and/or 39b serve for the axial positioning, relative to the longitudinal axis L, of the electrode 30 with respect to stop surfaces 80a and/or 80b of the gas-conducting unit 80 (see also FIG. 2b). A stop surface 39c serves for the axial positioning of the electrode 30 with respect to the plasma torch body 20. The (substantially cylindrical) outer surface 39f of the electrode 30 serves for the radial alignment, relative to the longitudinal axis L, with respect to (substantially cylindrical) inner centering surface 80d of the gas-conducting unit 80. The (substantially cylindrical) outer centering surface 39d of the electrode 30 is interrupted by "flattened" surfaces 39e. These serve as wrench flats for a tool for enabling the electrode to be screwed in and unscrewed. The expression "substantially cylindrical" means that such interruptions on a cylindrical outer surface are permitted (continuation being possible by means of a virtual body edge).

The nozzle 50 has an internal cavity 52 which surrounds a part of the electrode 30 with a spacing and which is electrically insulated with respect thereto. The insulation and spacing between the electrode 30 and the nozzle 50 is realized by means of the gas-conducting unit 70 (in certain cases, this may also be referred to as plasma gas feeder) and the gas-conducting unit 80 (depending on the configuration, this may conduct all gases or gas types or gas constituents). The nozzle 50 is held by means of a nozzle holder 55 which is screwed together with the plasma torch body 20 by means of threads. In the assembled state of the plasma torch, a cavity 53 is formed between the front portion 37*a* of the outer surface of the electrode 30 and the inner surface 54 of the nozzle 50.

The nozzle protection cap 60 has an internal cavity 62 which surrounds a part of the nozzle 50 with a spacing and which is electrically insulated with respect thereto. The insulation and spacing between the nozzle 50 and the nozzle protection cap 60 is realized by means of a nozzle protection cap bracket 65. Here, the nozzle protection cap 60 is screwed together with the nozzle protection cap bracket 65 by way of a thread, and said nozzle protection cap bracket is screwed together with the nozzle holder 55. The gas-conducting unit 70, the gas-conducting unit 80 and the nozzle protection cap bracket 65 are composed of electrically insulating material, while the electrode 30, the nozzle 50 and the nozzle protection cap 60 are composed of material with good electrical conductivity, normally copper or an alloy with copper. The emission insert 31 in the electrode 30 is composed of material with a higher melting point than the electrode itself. Hafnium, zirconium or tungsten is normally used here.

In the plasma torch 10 that is shown, the total gas stream 200 is conducted through an opening 21 in the torch body 20 through the interior space 91 of a cooling tube 90 into the interior space 32 of an electrode 30. Said total gas stream impinges on the front, closed end 33 of the electrode 30, in which the emission insert 31 is also situated. This portion, at which the heat is generated by the arc (plasma jet) which makes contact with the emission insert, is thus cooled in an effective manner. The total gas stream 200 subsequently flows back in a space 94 formed by the outer surface 93 of the cooling tube 90 and the inner surface 36 of the electrode 30, and is conducted through openings or grooves 22 or channels in the plasma torch body 20 firstly in a radially outward direction with respect to the longitudinal axis L and then through openings 84 of the gas-conducting unit 80 in the direction of the nozzle 50 and nozzle protection cap 60. The total gas stream 200 is then divided up into a first partial gas stream 210 for the plasma gas and a second partial gas stream 220 for the cooling gas for the nozzle 50 and the nozzle protection cap 60 and also a third partial gas stream 230 for the cooling gas for the electrode 30.

The first partial gas stream 210, that is to say in this case the plasma gas, flows through openings 71 in the gas-conducting unit 70 before flowing into the space 53 between the nozzle 50 and the electrode 30 and ultimately out of the nozzle bore 51. The first partial gas stream 210 thus flows around the first, front portion 37*a* of the outer surface 37 of the electrode 30.

The second partial gas stream 220, that is to say in this case the cooling gas for the nozzle 50 and the nozzle protection cap 60, flows through openings or grooves 56 of the nozzle holder 55 before flowing into the space 63 between the outer surface 54*a* of the nozzle 50 and the inner surface 66 of the nozzle protection cap 60 and then out of the nozzle protection cap opening 61 and the further openings 64 of the nozzle protection cap 60.

The third partial gas stream 230, that is to say in this case the cooling gas for the electrode 30, flows through opening 72 in the gas-conducting unit 70 into the space 73 formed by the second, central portion 37*b* of the outer surface 37 of the electrode 30, by the front gas-conducting unit 70 and by the rear gas-conducting unit 80, and flows through said space in the direction of the rear end 34. The partial gas stream 230 thus flows around the second, central portion 37*b* of the outer surface 37 of the electrode 30. In the vicinity of the rear end 34 of the electrode 30, the partial gas stream 230 is conducted radially outward through openings 85 in the gas-conducting unit 80 and the openings 57 of the nozzle holder 55.

Thus, the total gas stream 200 cools the inner surface 36 and the third partial gas stream 230 cools the second, central portion 37*b* of the outer surface 37 of the electrode 30. The improvement in the cooling has the effect that the service life of the electrode 30 is considerably lengthened. It is thus additionally possible to achieve good cutting quality over a longer period of time.

FIG. 2*a* shows the electrode 30 used in the plasma torch 10, wherein the upper image is a perspective illustration and the lower image is a sectional illustration (longitudinal section). The electrode 30 is already shown in FIG. 2 and has already been described. Said electrode extends along the longitudinal axis L and has a front, closed end 33 and a rear, open end 34 and a substantially cylindrical shape. In the region 39, said electrode has the stop surfaces 39*a* and/or 39*b*, which are formed perpendicular to the longitudinal axis and which serve for the axial positioning with respect to stop surfaces 80*a* and/or 80*b* of the gas-conducting unit 80. Said electrode has, at the transition between the front, first portion 37*a* and the central, second portion 37*b*, an encircling projection 37*d* which has an outer surface 38 (centering surface) which aligns the electrode 30 with the inner surface 70*a* of the front gas-conducting unit 70 (FIG. 3*c*) radially with respect to the longitudinal axis L.

FIG. 2*b* shows the rear gas-conducting unit 80 which is used in the plasma torch 10 of FIGS. 2 to 20, wherein the upper image shows a perspective and the lower left-hand image shows the longitudinal section and the lower right-hand image shows the section through the plane A-A. The rear gas-conducting unit 80 has already been partly shown in FIG. 2 and described in conjunction therewith. The rear gas-conducting unit 80 extends along the longitudinal axis L and has a front end 81 and a rear end 82 and a substantially cylindrical shape. On the inner surface 83*a*, said rear gas-conducting unit has the stop surfaces 80*a* and/or 80*b*, which are formed perpendicular to the longitudinal axis and which serve for the axial positioning with respect to stop surfaces 39*a* and/or 39*b* of the electrode 30. The rear gas-conducting unit 80 furthermore has cylindrical inner surfaces 80*d* and 80*e*. In the installed state, the inner surface 80*e*, with the then facing outer surface 39*d* of the electrode 30 and with a round ring 39*h* situated in the groove 39*g*, functions as a sealing surface. In the installed state, the inner surface 80*e* likewise functions as a centering surface with the facing outer centering surface 39*d* of the electrode 30. The electrode 30 and the rear gas-conducting unit 80 are thus centered relative to one another and aligned radially along the longitudinal axis L.

Openings are situated in the wall 83 of the gas-conducting unit 80. In this example, eight openings 84 are shown, which extend in the wall 83 parallel to the longitudinal axis L. In the installed state, said openings conduct the total gas stream 200 or a partial gas stream from the rear end, or the vicinity of the rear end 82, to the front end 81. Here, eight openings 85 are shown which extend from the inner surface 83a to the outer surface 83b. Here, said openings 85 are aligned at right angles to the longitudinal axis L. In the installed state, the openings 85 conduct the partial gas stream 230 for cooling the electrode 30 out of the space 73, which is formed by the outer surface 37 of the electrode 30, by the gas-conducting unit 70 and by the gas-conducting unit 80, outward through the wall of the gas-conducting unit 80 (see also FIG. 2 and the description relating thereto).

The openings 84 need not be arranged parallel to the longitudinal axis L; deviations are possible. It is important that connect the rear end 82 or the vicinity of the rear end and the front end 81 or the vicinity of the front end to one another. Deviations of up to 20° are possible.

The openings 85 need not be arranged perpendicular to the longitudinal axis L; deviations are possible. It is important that they connect the inner surface 83a and the outer surface 83b to one another. Deviations of up to 40° are possible. The openings 84 are arranged relative to one another with respect to the openings 85 such that they are not connected to one another within the gas-conducting unit body 80f.

Figure 3:
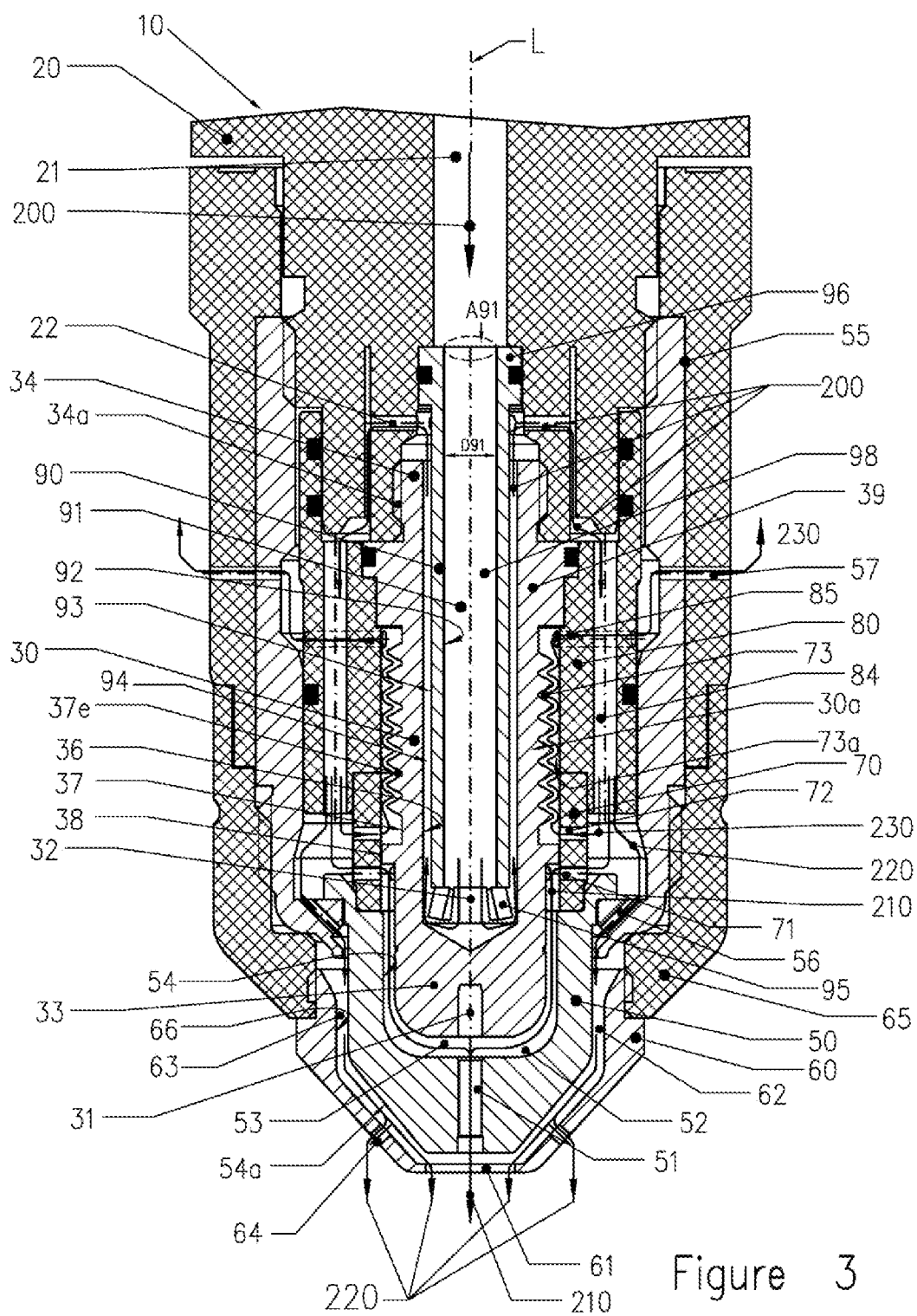
FIG. 3 is a sectional diagram of a plasma torch according to a further particular embodiment of the present invention.
Figure 4:
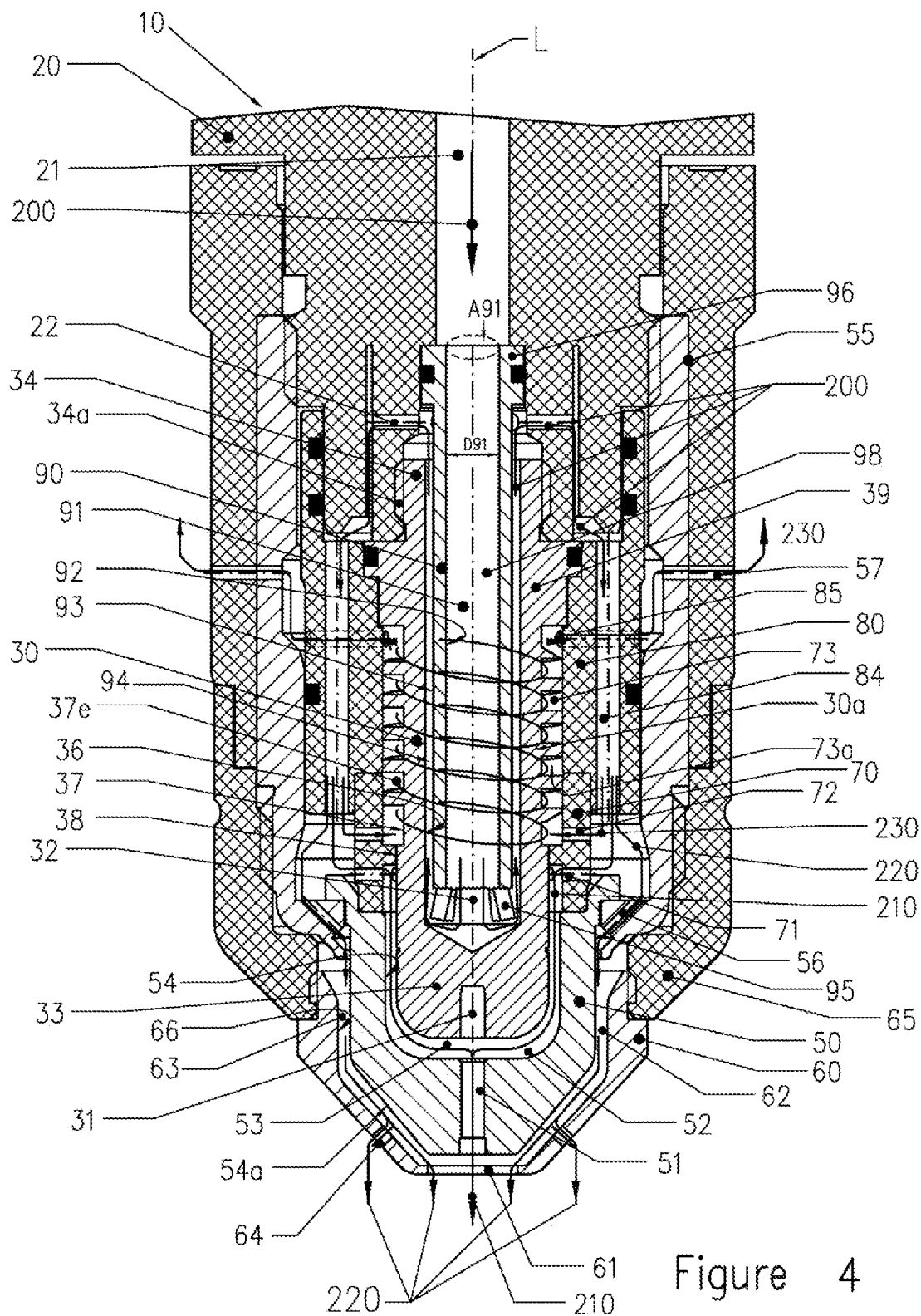
FIG. 4 is a sectional diagram of a plasma torch according to a further particular embodiment of the present invention.

FIG. 2c shows the front gas-conducting unit 70 of the plasma torch from FIGS. 2 to 4, wherein the upper image shows a perspective, the middle image shows the longitudinal section, the lower left-hand image shows the section through the plane A-A, and the lower right-hand image shows the section through the plane B-B. The front gas-conducting unit 70 has already been partly described in FIG. 2. The front gas-conducting unit 70 extends along the longitudinal axis L and has a front end 74 and a rear end 75 and a substantially cylindrical shape. Said front gas-conducting unit has, in the vicinity of the front end 74, openings 71 through which the first partial gas stream 210, plasma gas, flows in the installed state and openings 72 through which the partial gas stream 230, cooling gas, electrode, flows in the installed state.

Owing to the presence of the bore 84 and 85 and the throughflow of the total gas stream and a partial gas stream, the rear gas-conducting unit 80 is cooled in an effective manner. In this way, and owing to the larger spacing to the arc, the thermal loading is reduced in relation to the front gas-conducting unit 70, and can thus be produced from a thermally less resistant material than the front gas-conducting unit 70.

Figure 2D:
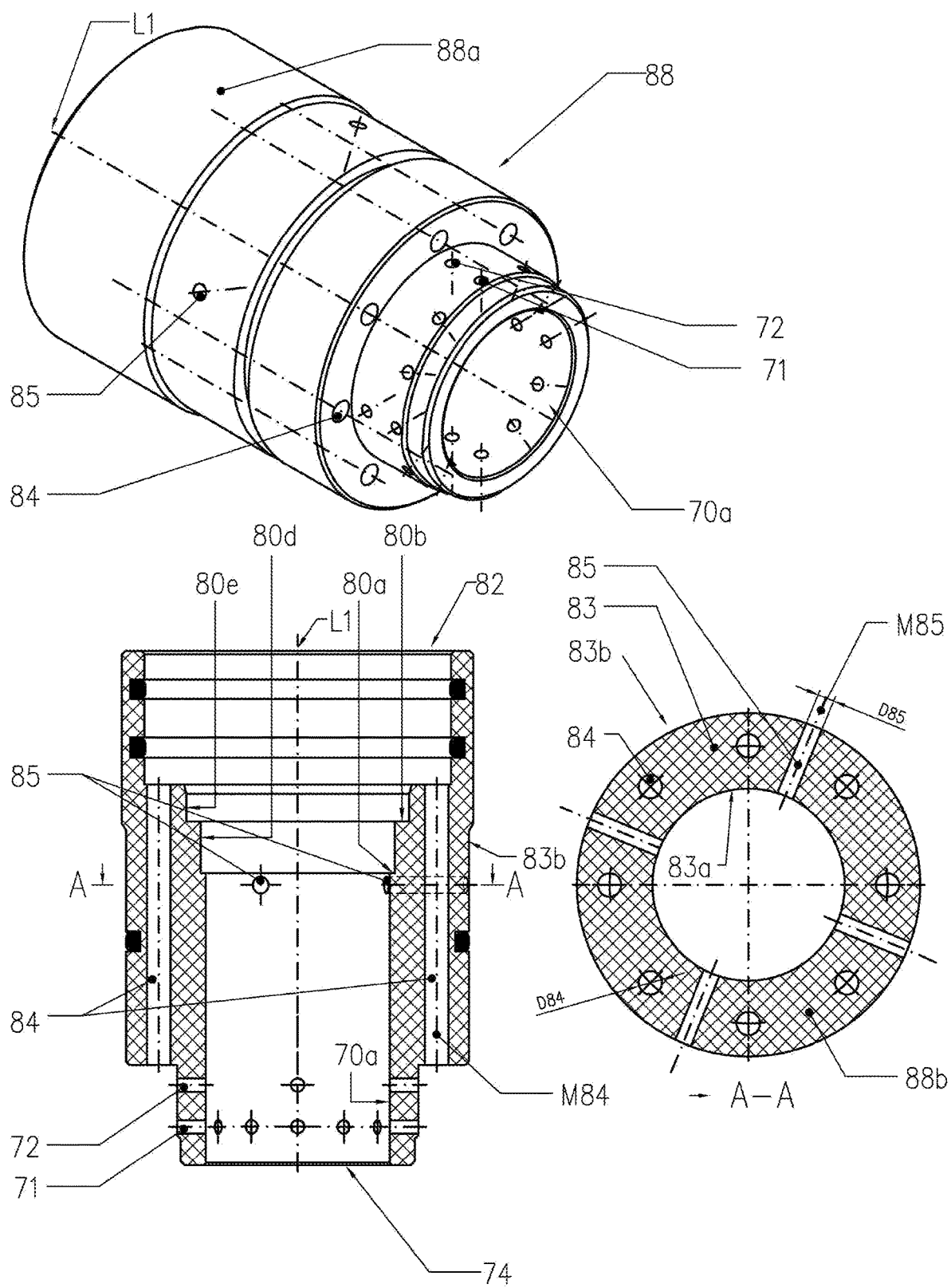
FIG. 2d shows a single-part gas-conducting unit for the plasma torch as per FIG. 2.

It is however possible for the gas-conducting units 70 and 80 to be produced from one part. FIG. 2d shows a single-part gas-conducting unit 88 of said type.

In the installed state, the inner surface 70a faces the outer surface 38 of the projection 37d of the electrode 30. By means of these two centering surfaces, the gas-conducting unit 88 and the electrode 30 are aligned and centered relative to one another radially with respect to the longitudinal axis.

Figure 2E:
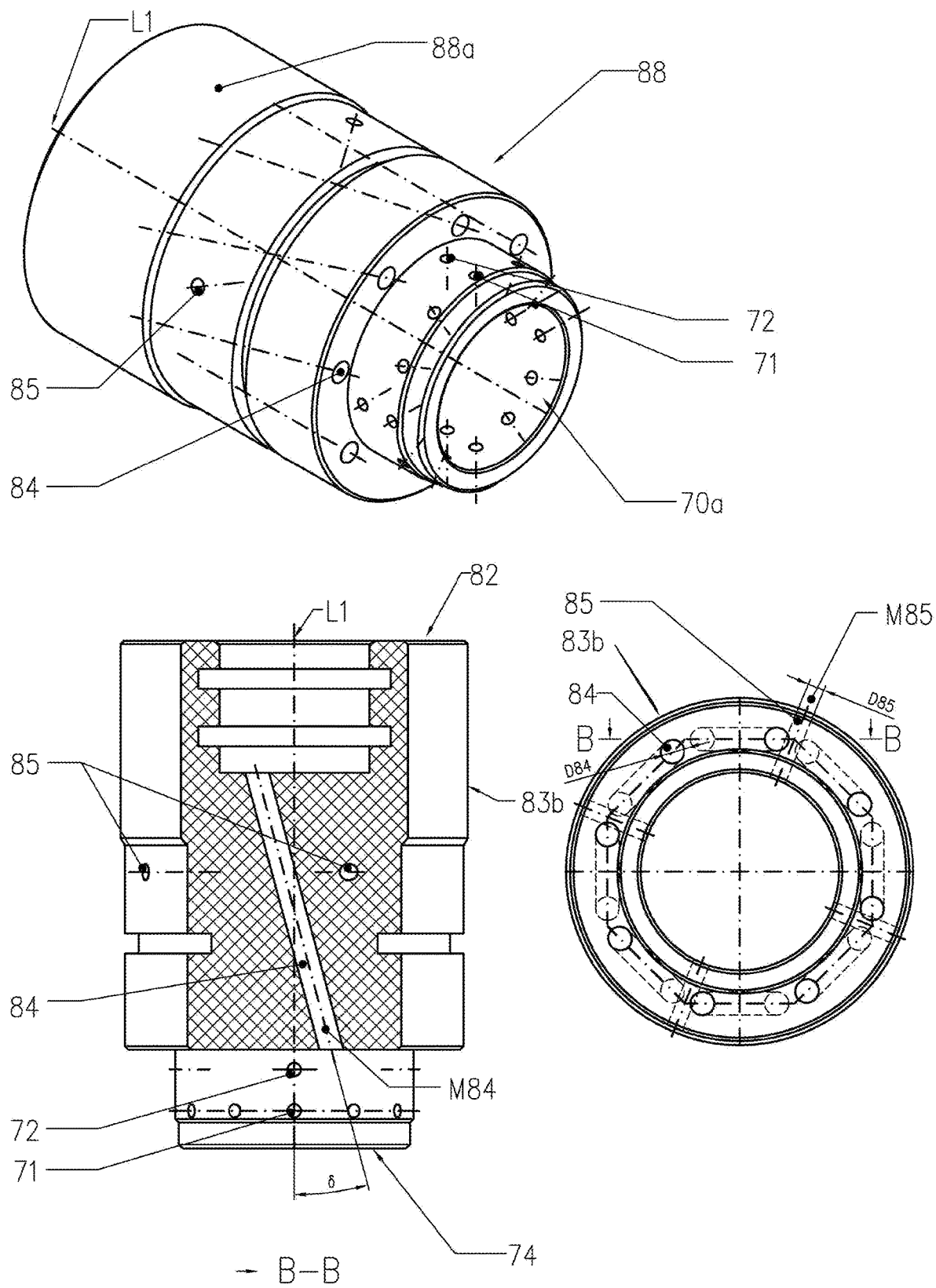
FIG. 2e an embodiment of a single-part gas-conducting unit for a plasma torch.

FIG. 2e shows a design variant of a single-part gas-conducting unit 88. By contrast to FIG. 2d, the openings 84 are inclined relative to the longitudinal axis L and the angle S. Said angle expediently amounts to at most 20°. The gas flowing through said openings has, with the inclination relative to the longitudinal axis, a longer flow path through the gas-conducting unit 80 or 88, and thus cools the latter more effectively. Furthermore, more intense turbulence arises in the interior space of the plasma torch downstream of the exit from the openings 84, and cools the torch parts that come into contact with the gas flow more effectively.

Figure 2F:
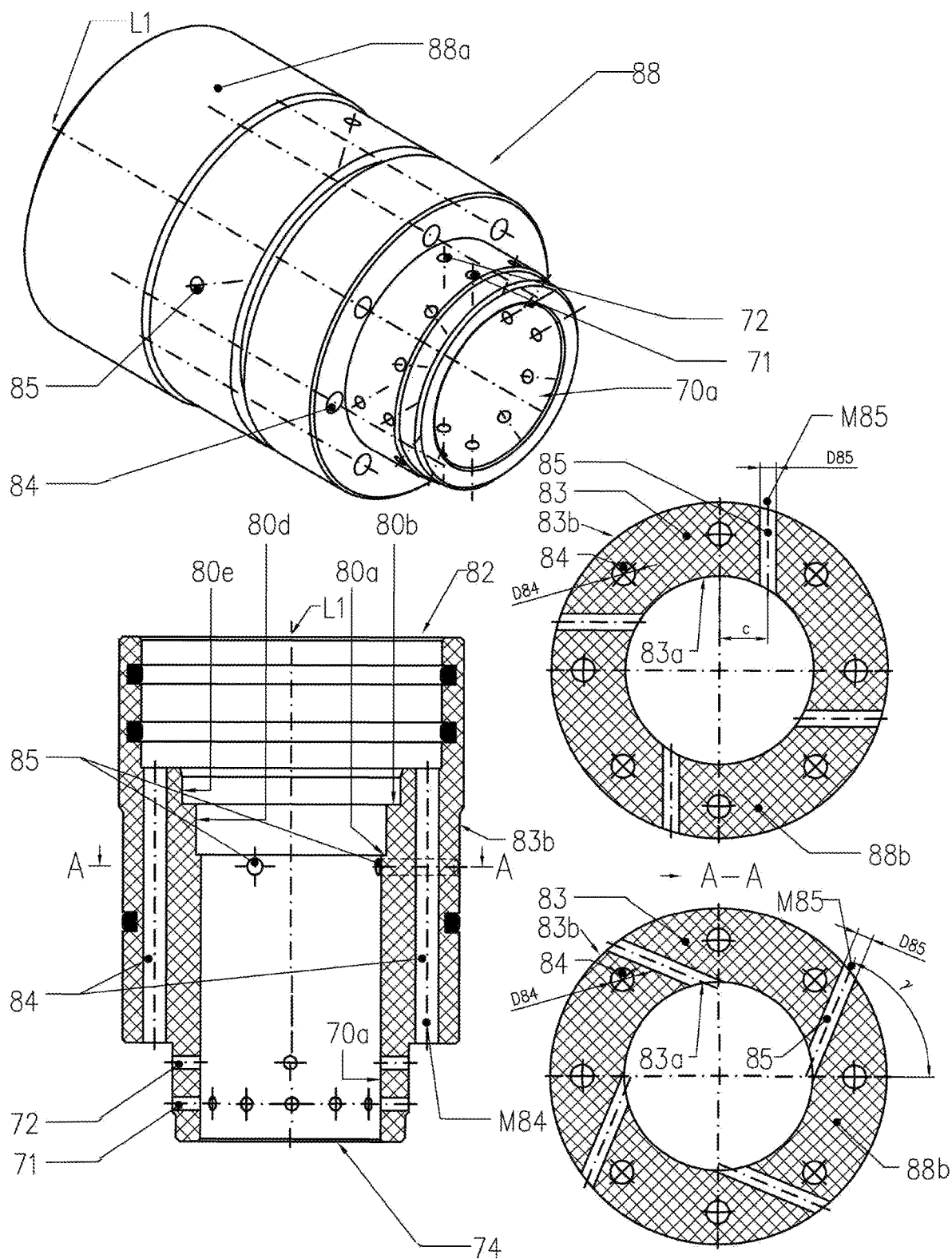
FIG. 2f a further embodiment of a single-part gas-conducting unit for a plasma torch.

The design variant with the inclined opening 84 is likewise possible for the gas-conducting unit 80 as shown for example in FIG. 2b, and the same comments apply. FIG. 2f shows a further design variant of a single-part gas-conducting unit 88. By contrast to FIG. 2d, the openings 85 are offset with respect to the radial to the longitudinal axis L by c (lower right-hand figure, upper section A-A) figure or inclined with respect to the radial to the longitudinal axis by the angle γ. Said angle expediently amounts to at most 45°. The gas flowing through said openings has, with the inclination, a longer flow path through the gas-conducting unit 80 or 88, and thus cools the latter more effectively. Furthermore, more intense turbulence arises in the interior space of the plasma torch downstream of the exit from the openings 85, and cools the torch parts that come into contact with the gas flow more effectively.

The design variant with the inclined opening 84 is likewise possible for the gas-conducting unit 80 as shown for example in FIG. 2b, and the same comments apply.

The of inclination of the openings 84 and 85 and offset of the openings 85 is also possible.

For the cutting process, the total gas stream firstly flows. This is followed by the ignition of the pilot arc that burns between the electrode 30 and nozzle 50. The ignition is performed by applying a high voltage between the electrode 30 and nozzle 50. The high voltage ionizes the plasma gas such that it becomes electrically conductive, and the pilot arc is formed. When the pilot arc makes contact with the workpiece, the anodic point of contact of the arc moves from the nozzle to the workpiece, and cutting can be performed.

It is also possible for the pilot art to be ignited by means of a short circuit, that is to say by means of contact between the electrode 30 and nozzle 50. For this purpose, the nozzle and/or electrode are/is arranged so as to be movable relative to one another, such that they make contact before the total gas stream 200 flows. Application of a DC voltage causes an electrical current to form, which flows via the nozzle and electrode. The total gas stream subsequently flows, which, as described above, is divided up into the partial gas streams. The first partial gas stream 210 (plasma gas) has the effect that either the nozzle is moved forward away from the electrode or the electrode is moved rearward away from the nozzle. The pilot arc subsequently forms.

FIG. 3 shows, by way of example, a similar system to FIG. 2. To (further) improve the cooling action, the second, central portion 37b of the outer surface 37 has been designed such that the partial gas stream 230 flowing past is made more intensely turbulent by means of a thread, and the cooling is thus further improved.

Figure 3A:
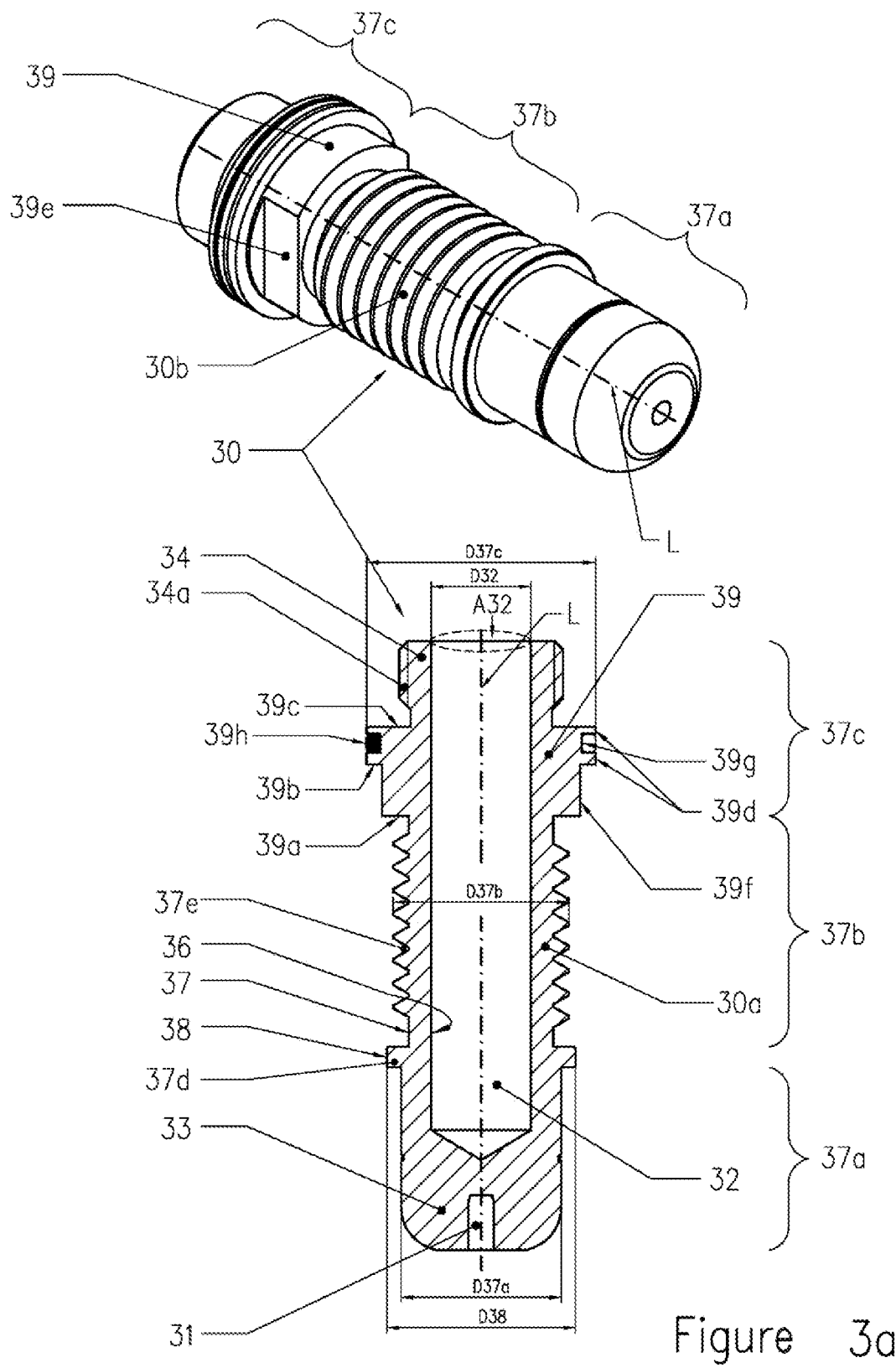
FIG. 3a shows an electrode of the plasma torch as per FIG. 3.

FIG. 3a shows the electrode 30 used in the plasma torch 10 shown in FIG. 3, wherein the upper image is a perspective illustration and the lower image is a sectional illustration (longitudinal section). Said electrode is of similar design to the electrode in FIG. 2a. By contrast thereto, the central, second portion 37b of the outer surface 37 has been designed such that, in the installed state, the partial gas stream 230 flowing past is made more intensely turbulent by means of a thread, and the cooling is thus further improved.

FIG. 4 shows a further system similar to FIG. 2. To (further) improve the cooling action, the central, second portion 37b of the outer surface 37 has been designed such that the partial gas stream 230 is conducted through a spiral-shaped groove 37e and thus remains in contact with the surface of the central, second portion 37b for longer, and the cooling is thus further improved. The arrangement of two or more spiral-shaped grooves running parallel is also possible.

Furthermore, by contrast to FIG. 2, the electrode 30 has no projection 37d on the outer surface 37 between the first, front portion 37a and the second, central portion 37b of the outer surface 37 of the electrode 30. Here, the centering surface 38 is a constituent part of the first, front portion 37a.

Figure 4A:
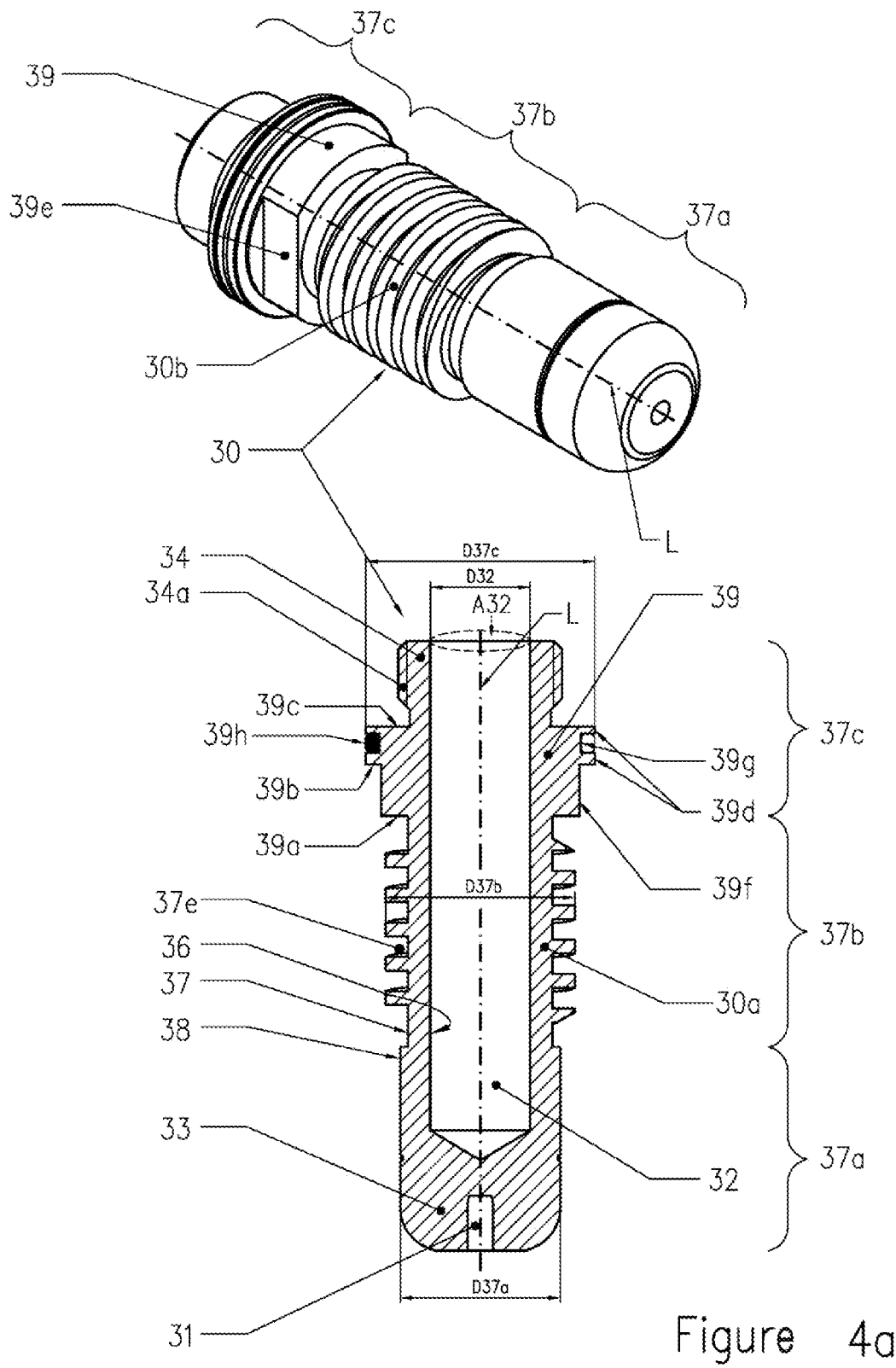
FIG. 4a shows an electrode of the plasma torch from FIG. 4.

FIG. 4a shows the electrode 30 used in the plasma torch 10 shown in FIG. 4, wherein the upper image is a perspective illustration and the lower image is a sectional illustration (longitudinal section). Said electrode is of similar design to the electrode in FIG. 3a. By contrast thereto, the second, central portion 37b of the outer surface 37 has been designed such that, in the installed state, the partial gas stream 230 is conducted through a spiral-shaped groove 37e and thus remains in contact with the surface of the second, central portion 37b for longer, and the cooling is thus further improved. Furthermore, by contrast to FIG. 2a, the electrode 30 has no projection 37d on the outer surface 37 between the first, front portion 37a and the second, central portion 37b of the outer surface 37 of the electrode 30. Here, the centering surface 38 is a constituent part of the first, front portion 37a.

Figure 4B:
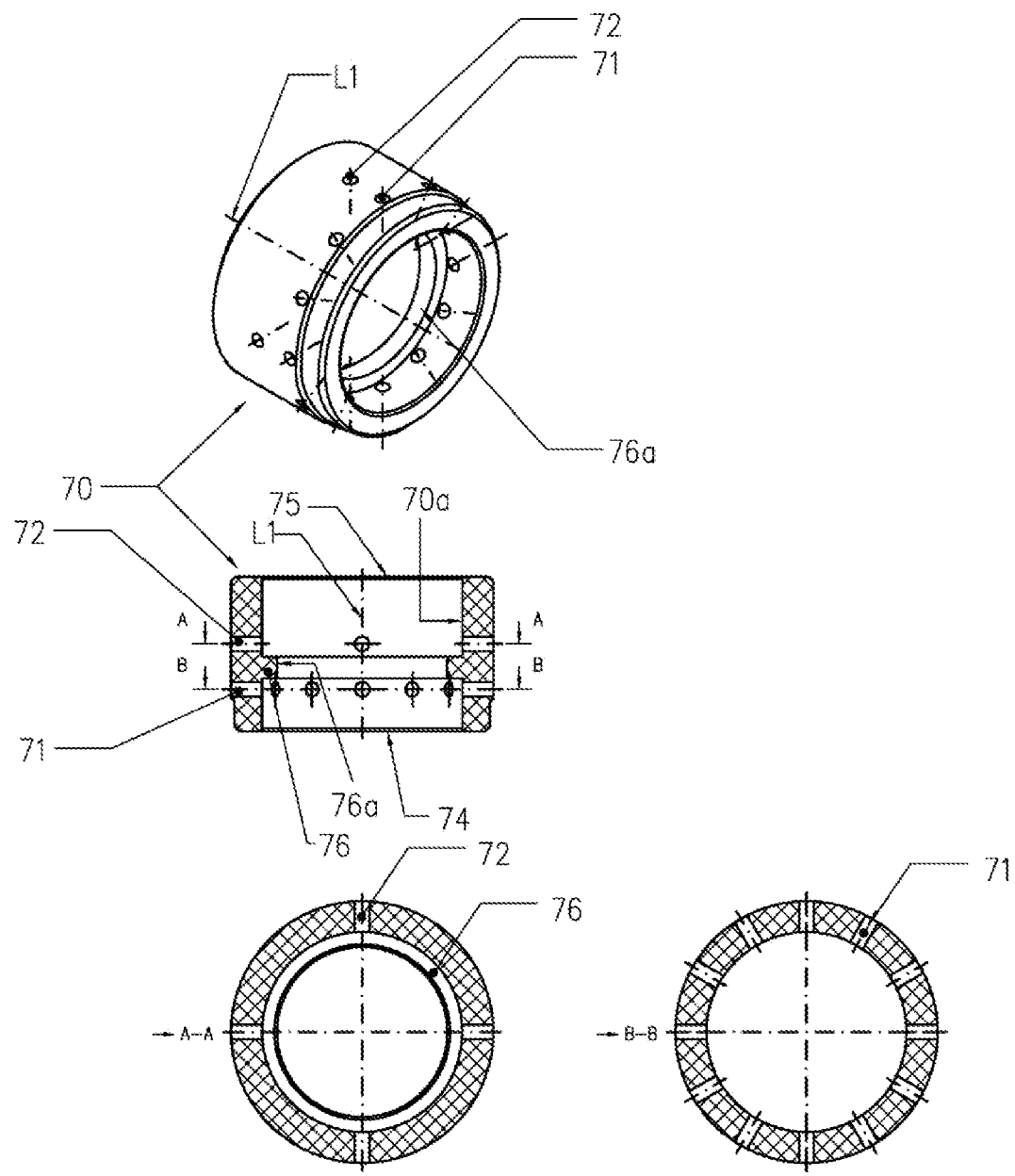
FIG. 4b shows a front gas-conducting unit of the plasma torch as per FIG. 4.

FIG. 4b shows the front gas-conducting unit 70, wherein the upper image shows a perspective, the middle image shows the longitudinal section, the lower left-hand image shows the section through the plane A-A, and the lower right-hand image shows the section through the plane B-B. Said front gas-conducting unit differs from the gas-conducting unit shown in FIG. 2c by the projection 76 which is present on the inner surface 70a and which has the inner surface 76a. In the installed state, said inner surface 76a faces the outer centering surface 38, which is a constituent part of the first, front portion 37a of the electrode 30. By means of these two centering surfaces, the gas-conducting unit 80 and the electrode 30 are aligned and centered relative to one another radially with respect to the longitudinal axis.

Figure 4C:
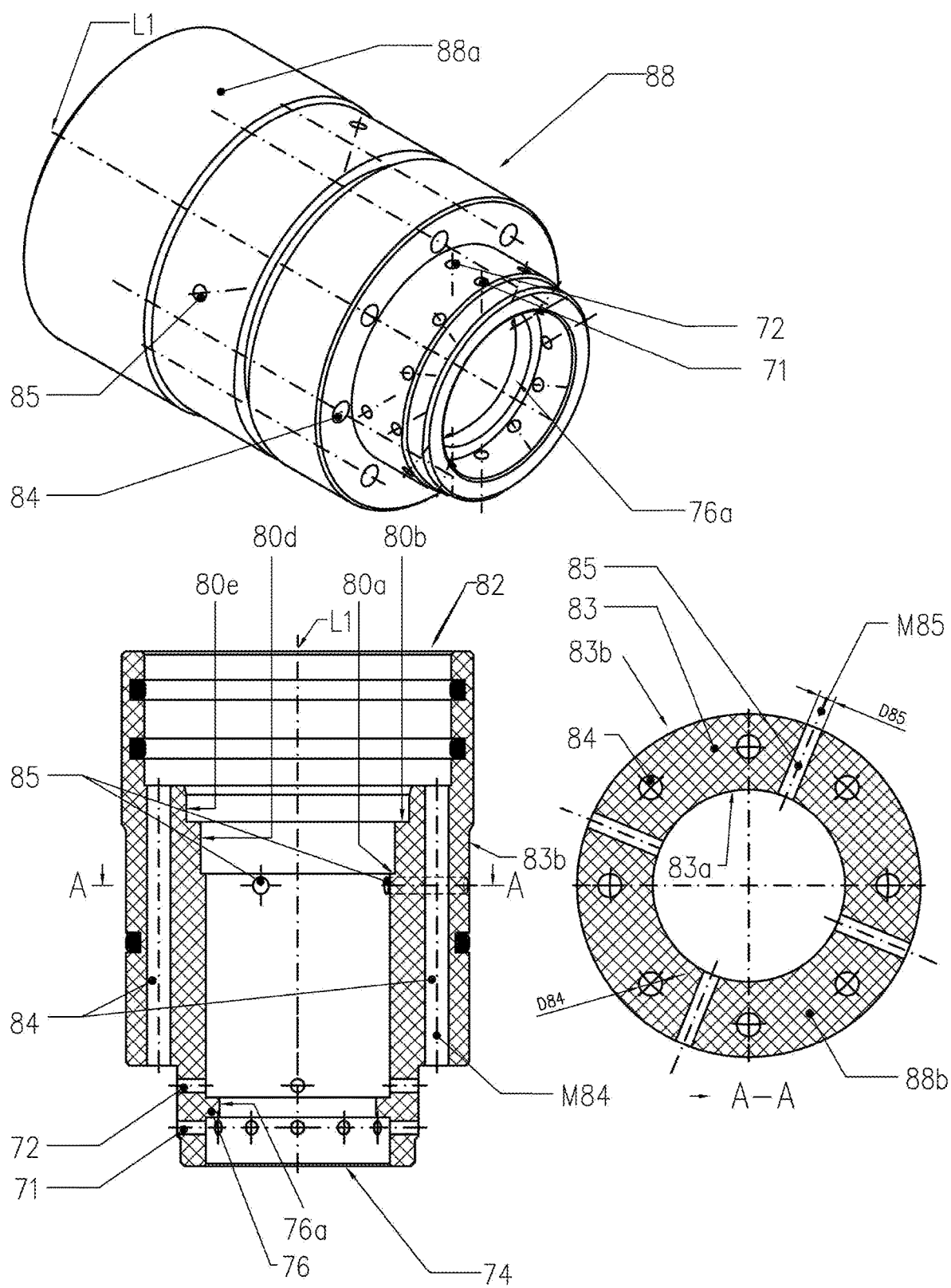
FIG. 4c shows a single-part gas-conducting unit for the plasma torch as per FIG. 4.

It is however possible for the gas-conducting units 70 and 80 to be produced from one part. FIG. 4c shows a single-part gas-conducting unit 88 of said type.

Figure 5:
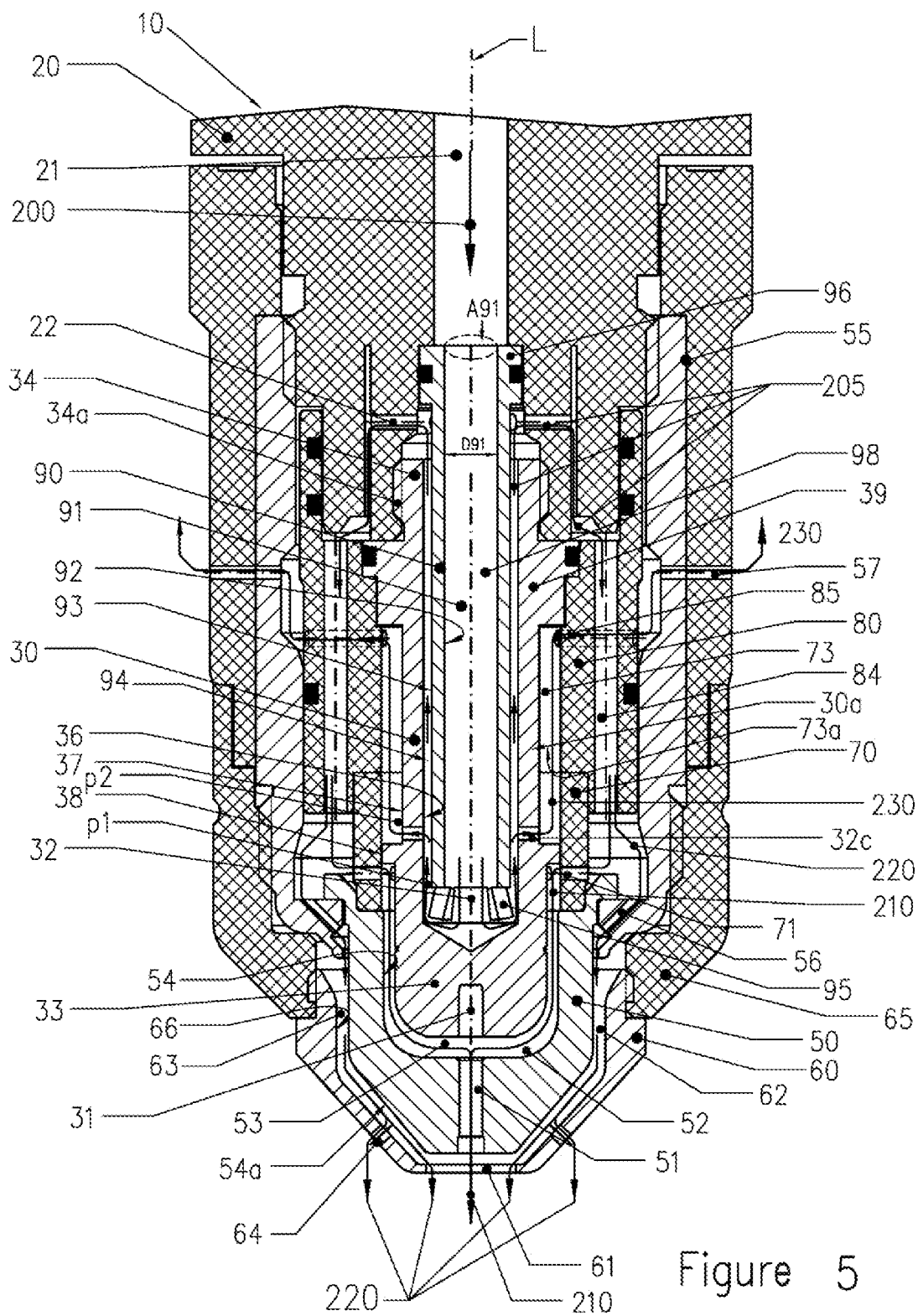
FIG. 5 is a sectional diagram of a plasma torch according to a further particular embodiment of the present invention.
Figure 5A:
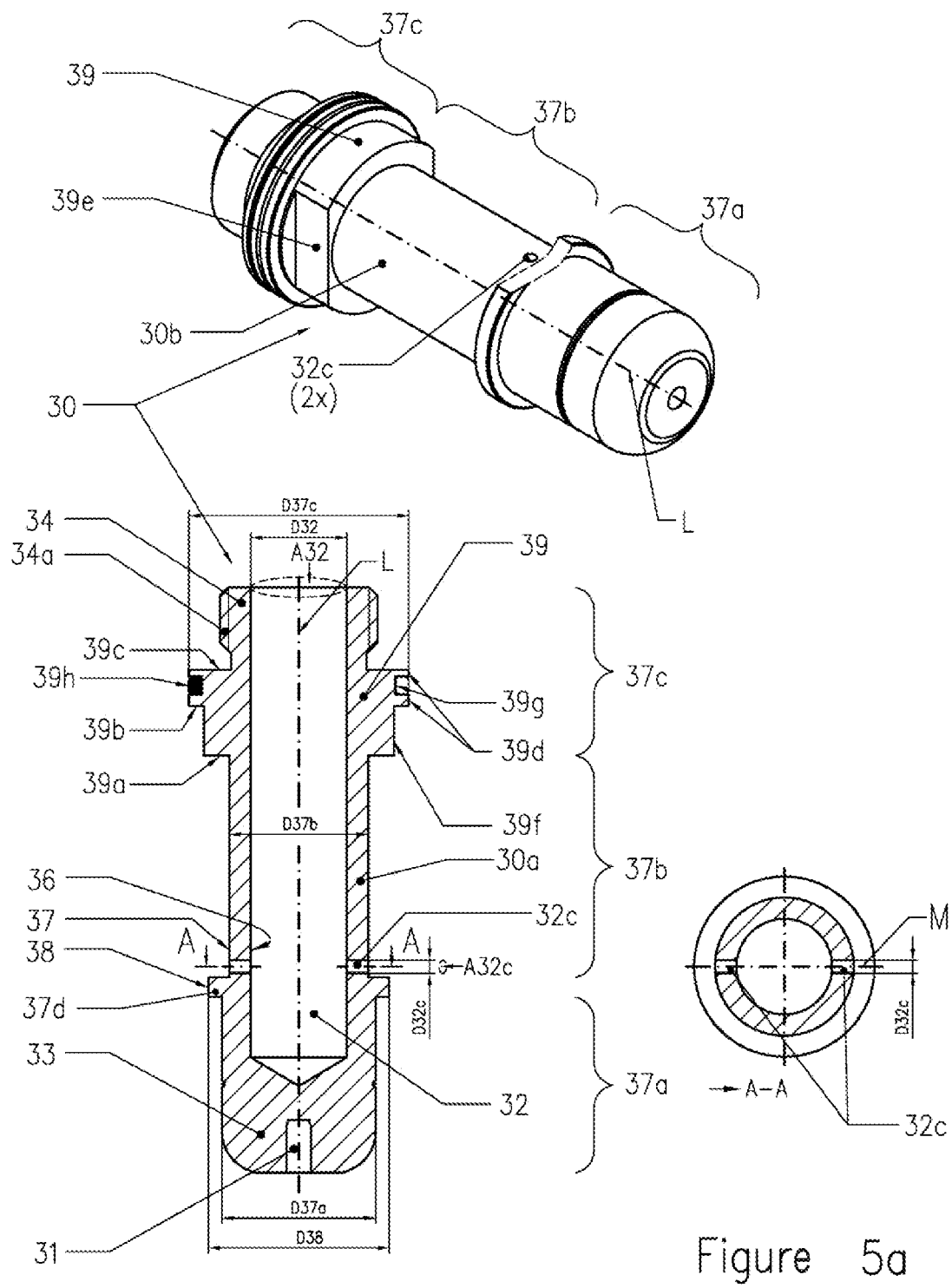
FIG. 5a shows an electrode of the plasma torch from FIG. 5.
Figure 5B:
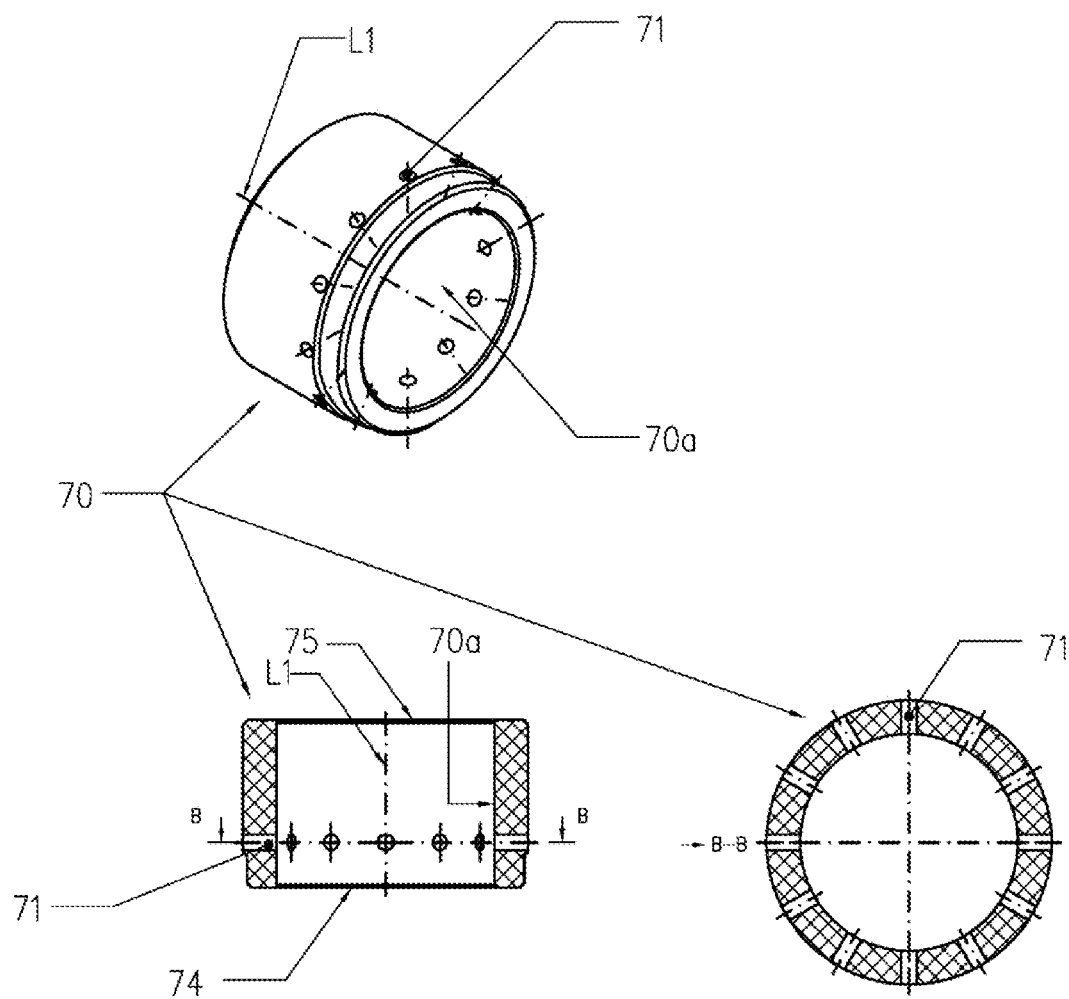
FIG. 5b shows a front gas-conducting unit of the plasma torch as per FIG. 5.

FIG. 5 shows, by way of example, a variant of a plasma torch according to the invention. FIG. 5a shows details of the electrode 30 used therein, and FIG. 5b shows details of the front gas-conducting unit 70 used therein. The rear gas-conducting unit 80 is identical to that shown in FIG. 2b.

The plasma torch shown differs from that shown in FIG. 2 by a different electrode 30 and a different front gas-conducting unit 70. Associated with this is the change in the conducting of the total gas stream 200 and the division into the partial gas streams 210, 220 and 230.

The cavity 32 of the electrode 30 extends along the longitudinal axis L as far as into the vicinity of the transition between the front, first portion 37a and the central, second portion 37b. From the cavity 32 or the inner surface 36 of the electrode 30, in this case two openings 32c lead outward through the electrode wall 30a in the second, central portion 37b. The third partial gas stream 230 (cooling gas, electrode) flows through said openings. One opening, or more than two openings, is/are however also possible. The openings 32c are in this case arranged radially with respect to the longitudinal axis L. An offset with respect to the radial is also possible in order to enable the third partial gas stream 230 to rotate in the space 73 between the electrode 30 and the front gas-conducting unit 70 and the rear gas-conducting unit 80. This in turn improves the cooling action (yet further).

In the plasma torch 10 that is shown, the total gas stream 200 is conducted through an opening 21 in the torch body 20 through the interior space 91 of a cooling tube 90 into the interior space 32 of an electrode 30. Said total gas stream impinges on the front, closed end 33 of the electrode 30, in which the emission insert 31 is also situated. This portion, at which the heat is generated by the arc (plasma jet) which makes contact with the emission insert, is thus cooled in an effective manner. The third partial gas stream 230 flows outward through the openings 32c through the wall 30a of the electrode 30.

The partial gas stream 205 that remains in the cavity of the electrode 30 flows back in the space 94 formed by the outer surface 93 of the cooling tube 90 and the inner surface 36 of the electrode 30, and is conducted through openings or grooves or channels 22 in the plasma torch body 20 firstly in a radially outward direction with respect to the longitudinal axis L and then through openings 84 of the rear gas-conducting unit 80 in the direction of the nozzle 50 and nozzle protection cap 60. The partial gas stream 205 is subsequently divided up into the first partial gas stream 210 for the plasma gas and the second partial gas stream 220 for the cooling gas for the nozzle 50 and the nozzle protection cap 60.

The first partial gas stream 210, that is to say in this case the plasma gas, flows through openings 71 of the gas-conducting unit 70 before flowing into the space 53 between the nozzle 50 and the electrode 30 and ultimately out of the nozzle bore 51. The first partial gas stream 210 thus flows around the first, front portion 37a of the outer surface 37 of the electrode 30. By contrast to FIG. 3, the front gas-conducting unit 70 has no openings 72 for the partial gas stream 230, cooling gas, electrode, because this is already conducted through the openings 32c of the electrode 30.

The second partial gas stream 220, that is to say in this case the cooling gas for the nozzle 50 and the nozzle protection cap 60, flows through openings or grooves 56 of the nozzle holder 55 before flowing into the space 63 between the outer surface 54a of the nozzle 50 and inner surface 66 of the nozzle protection cap 60 and then out of the nozzle protection cap opening 61 and the further openings 64 of the nozzle protection cap 60.

As already described in the preceding paragraph, the third partial gas stream 230, that is to say the cooling gas for the electrode 30, flows through the openings 32c of the electrode into the space 73 formed by the second, central portion 37b of the outer surface 37 of the electrode 30, by the front gas-conducting unit 70 and by the rear gas-conducting unit 80, and flows through said space. The third partial gas stream 230 thus flows around the second, central portion 37b of the outer surface 37 of the electrode 30 in the direction of the rear end 34 of the electrode 30. In the vicinity of the rear, open end 34 of the electrode 30, the third partial gas stream 230 is conducted (radially) outward through openings 85 of the gas-conducting unit 80 and the openings 57 of the nozzle holder 55.

Thus, the partial gas stream 205 cools the inner surface 36 of the electrode 30 and the third partial gas stream 230 cools the central, second portion 37b of the outer surface 37 of the electrode 30. The improvement in the cooling considerably lengthens the service life of the electrode 30. Additionally, the third partial gas stream 230 flowing through the openings 32c cools the electrode in said openings, and improves the cooling thereof. It is thus additionally possible to achieve good cutting quality over a longer period of time.

FIG. 5a shows the electrode 30 which is used in the plasma torch 10, wherein the upper image is a perspective illustration and the lower left-hand image is a sectional illustration (longitudinal section) and the lower right-hand image is a section through the plane A-A. The electrode 30 differs from that described in FIG. 2a by the openings 32c which extend, radially with respect to the longitudinal axis L, between the inner surface 36 and the outer surface 37 through the wall 30a in the second, central portion 37b. Gas can flow outward through said openings from the cavity 32 of the electrode 30.

In the installed state in the plasma torch 10, it is sought to attain as high a flow speed as possible for the third partial gas stream 230 through the openings 32c during the cutting process. For this purpose, in the presence of a flowing gas (total gas stream), a relatively small pressure drop on the flow path in the interior space 91 of the cooling tube 90 between the rear end 96 and the front end 95 of the cooling tube 90 and a relatively large pressure drop on the flow path of the openings 32c between the internal cavity 32 of the electrode 30 and the space 73 between the electrode 30 and the gas-conducting units 70 and 80 are necessary. In the presence of a flowing partial gas stream 230, the difference between the pressure p1 in the internal cavity 32 and the pressure p2 in the space 73, in each case in the immediate vicinity of the one or more openings 32c, advantageously amounts to at least 0.5 bar, but more preferably 1 bar.

This is achieved for example by virtue of the area A91, arising from the diameter D91 radially with respect to the longitudinal axis L, of the interior space 91 of the cooling tube 90 being larger than the sum of the areas A32c, arising from the diameter D32c radially with respect to the central axis/axes M, of the openings 32c. The high flow speed improves in particular the cooling action in the openings 32c and also at the surfaces of the downstream space 73, through which the third partial gas stream 230 flows.

The diameter D91 of the cavity 91 of the cooling tube 90 in this case amounts to for example 3 mm, and the diameter D32c (wherein the diameters may also differ) of the two openings 32c in this case amounts to 1.0 mm. Using PI/4*D$^2$, this yields, for the cavity 91, an area A91, formed radially with respect to the longitudinal axis L, of approximately 7 mm$^2$ and, for a bore 32c, an area A32c, formed radially with respect to the central axis M of the bore 32c, of approximately 0.8 mm$^2$. Two bores thus yield approximately 1.6 mm$^2$. The ratio between the area A91 and the sum of the two areas A32c amounts to 4.3.

Figure 6:
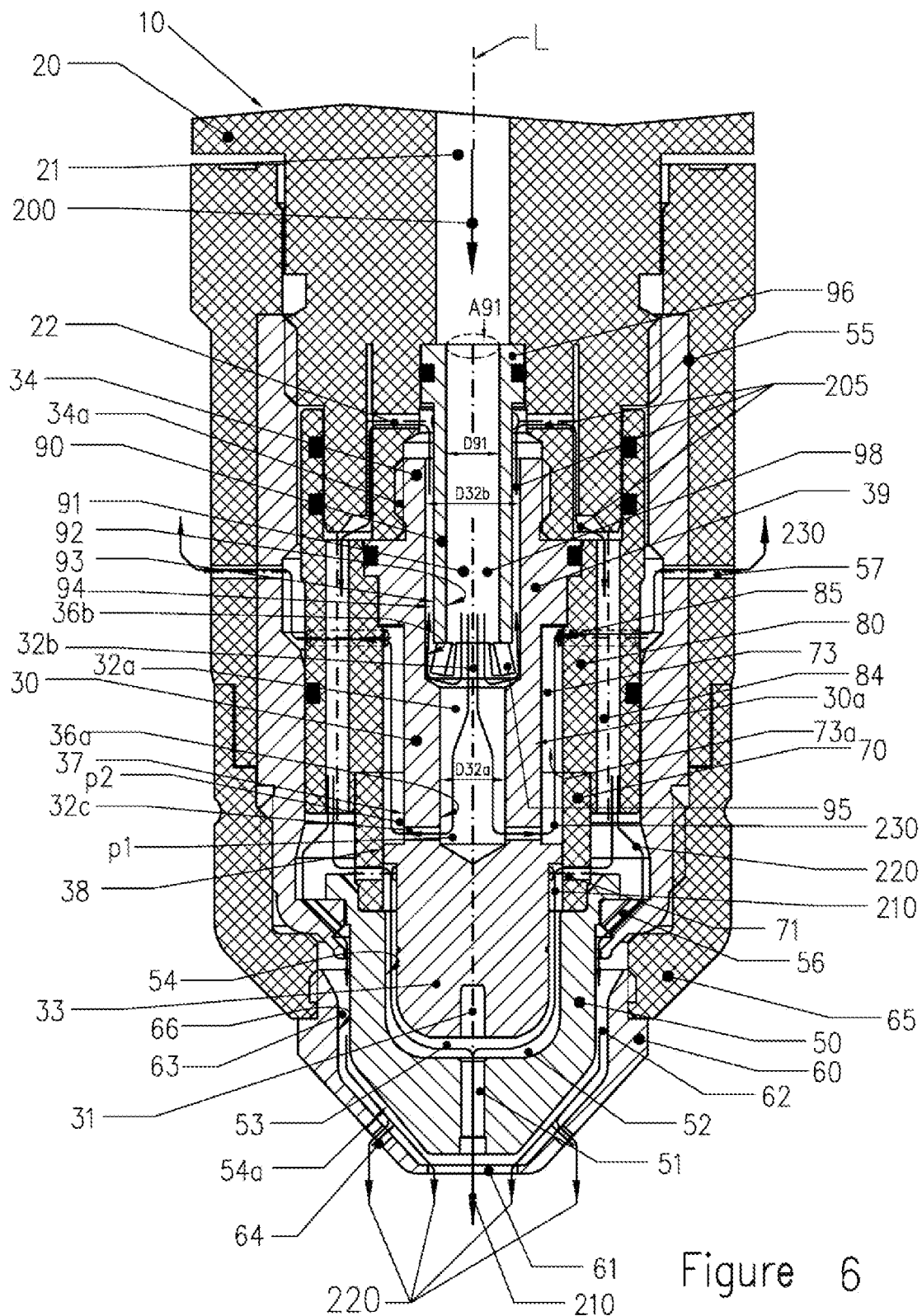
FIG. 6 is a sectional diagram of a plasma torch according to a further particular embodiment of the present invention.
Figure 7:
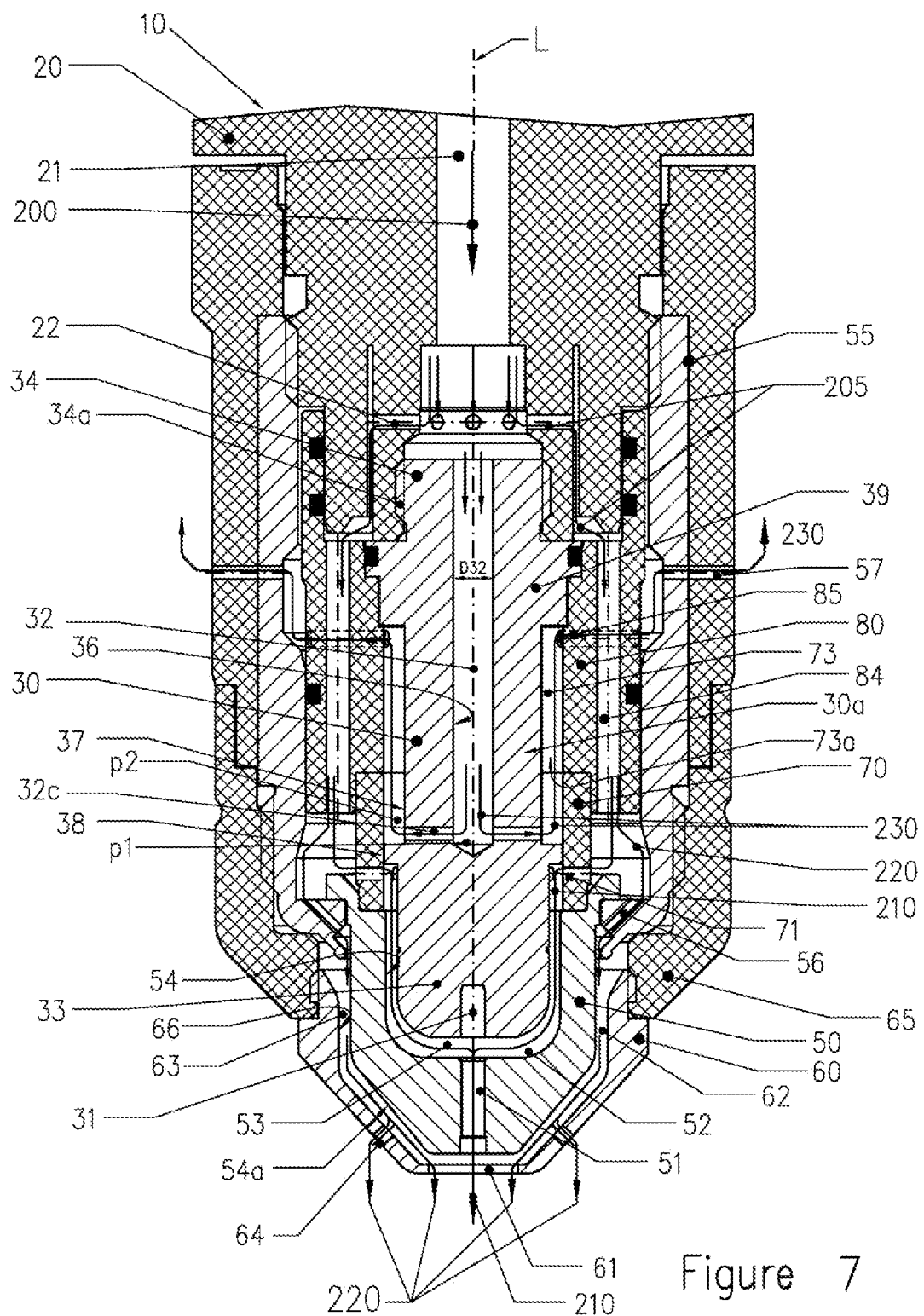
FIG. 7 is a sectional diagram of a plasma torch according to a further particular embodiment of the present invention.

FIG. 5b shows the front gas-conducting unit 70 of the plasma torch from FIGS. 5 to 7, wherein the upper image shows a perspective, the lower left-hand image shows the longitudinal section, and the lower right-hand image shows the section through the plane B-B. The front gas-conducting unit 70 differs from that described in FIG. 2c in that it has no openings 72 for the third partial gas stream 230 (cooling gas, electrode).

FIG. 6 shows, by way of example, a similar system to FIG. 5. Here, however, the cavity 32 of the electrode 30 is composed of two cavities, the front cavity 32a and the rear cavity 32b, which differ in terms of their diameter D32a and D32b. In this example, the rear cavity 32b has a larger diameter than the front cavity 32a. Further cavities with different diameters are also possible. The cooling tube 90 projects in with its front end 95 as far as into the vicinity of the transition, or as far as the transition, from the rear cavity 32b to the front cavity 32a, and may be supported there in order that it cannot slip any further forward.

By means of this arrangement, the thickness of the wall 30a of the electrode 30 in the region of the front cavity 32a is larger, and can more effectively dissipate heat by heat conduction from the front end 33 of the electrode 30 in the direction of the rear, open end 34.

Figure 6A:
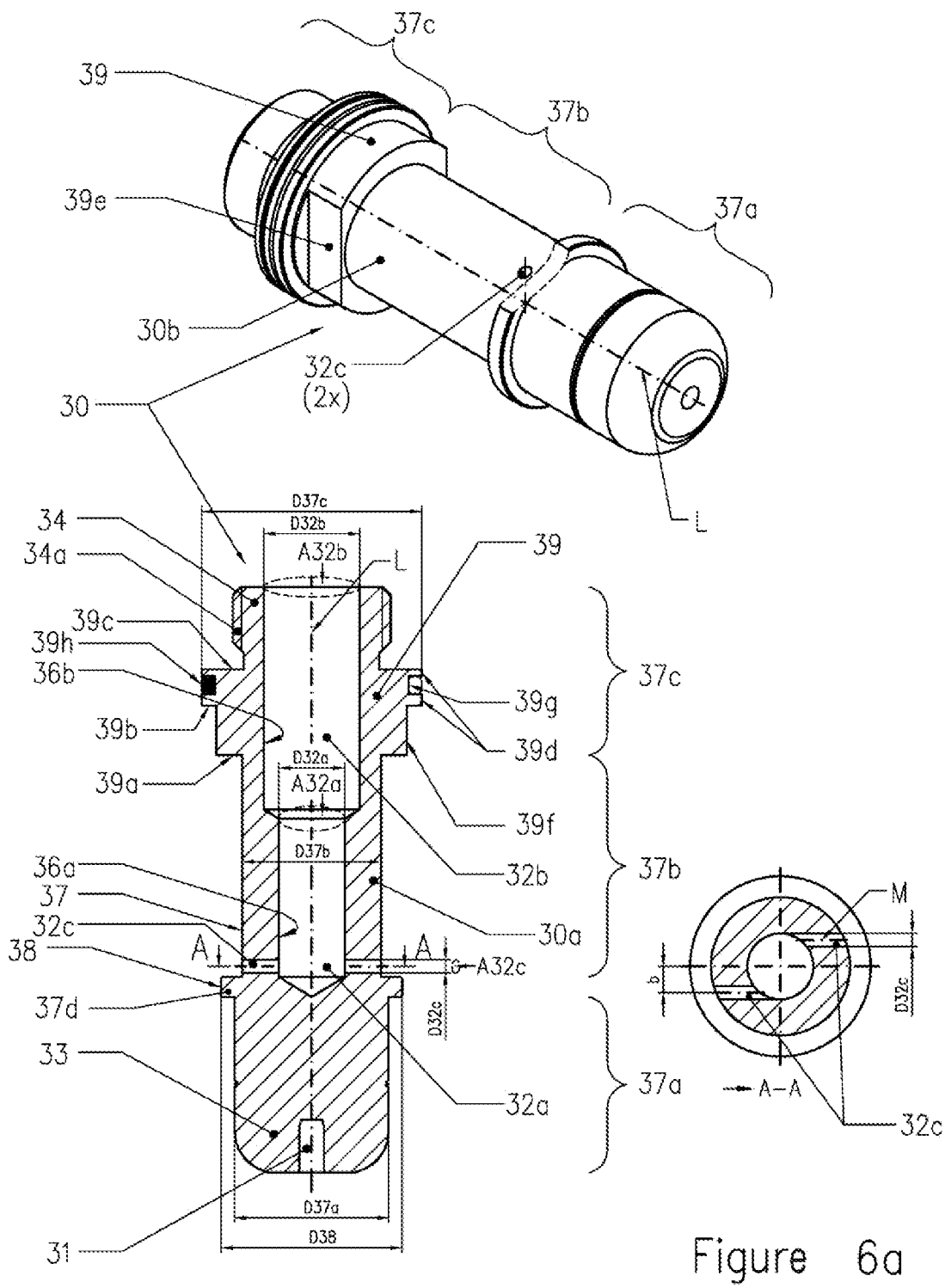
FIG. 6a shows an electrode of the plasma torch from FIG. 6.

FIG. 6a shows the electrode 30 used in the plasma torch 10 of FIG. 6. It differs from the electrode in FIG. 5a by the cavity 32, in this case composed of two cavities, the front cavity 32a and the rear cavity 32b, which differ in terms of their diameter D32a and D32b. The rear cavity 32b has a larger diameter than the front cavity 32a. Furthermore, the openings 32c in the second, central portion 37b are, as illustrated in the section A-A, arranged so as to be offset with respect to the radial to the longitudinal axis so as to be offset L by b. Gas can flow outward through said openings from the cavity 32a of the electrode 30. Thus, in the installed state, the gas flowing through the openings is set in rotation in the space 73 and cools the surface of the portion 37b of the electrode 30 more effectively.

In the installed state in the plasma torch 10, it is sought to attain as high a flow speed as possible for the third partial gas stream 230 through the openings 32c during the cutting process. For this purpose, in the presence of a flowing gas (total gas stream), a relatively small pressure drop on the flow path in the interior space 91 of the cooling tube 90 between the rear end 96 and the front end 95 of the cooling tube 90 and a relatively large pressure drop on the flow path of the openings 32c between the front internal cavity 32a of the electrode 30 and the space 73 between the electrode 30 and the gas-conducting units 70 and 80 are necessary. In the presence of a flowing partial gas stream 230, the difference between the pressure p1 in the front internal cavity 32a and the pressure p2 in the space 73, in each case in the immediate vicinity of the one or more openings 32c, advantageously amounts to at least 0.5 bar, but more preferably 1 bar.

This is achieved by virtue of the area A91, arising from the diameter D91 radially with respect to the longitudinal axis L, of the interior space 91 of the cooling tube 90 being larger than the sum of areas A32c, arising from the diameter D32c radially with respect to the central axis/axes M, of the openings 32c. The high flow speed improves in particular the cooling action in the openings 32c and also at the surfaces of the downstream space 73, through which the third partial gas stream 230 flows.

Since the diameter D91 of the interior space 91 of the cooling tube 90 is smaller than the diameter D32a of the front cavity 32a of the electrode 30, the area A91 formed by the diameter D91 has a greater influence than the area A32a formed by the diameter D32a in determining the pressure drop.

The diameter D91 of the cavity 91 of the cooling tube 90 in this case amounts to for example 3 mm, and the diameter D32c (wherein the diameters may also differ) of the two openings 32c in this case amounts to 1.0 mm. Using PI/4*D$^2$, this yields, for the cavity 91, an area A91, formed radially with respect to the longitudinal axis L, of approximately 7 mm$^2$ and, for a bore 32c, an area A32c, formed radially with respect to the central axis M of the bore 32c, of approximately 0.8 mm$^2$. Two bores thus yield approximately 1.6 mm$^2$. In this example, the ratio between the area A91 and the sum of the two areas A32c amounts to 4.3.

FIG. 7 shows a similar system to FIG. 5, but without a cooling tube. The cavity 32 of the electrode 30 has a smaller diameter D32 than that in FIG. 5. By means of this arrangement, the thickness of the electrode wall 30a is larger, and can more effectively dissipate heat by heat conduction from the front end 33 of the electrode 30 in the direction of the rear end 34.

The total gas stream 200 flows through the opening 21 in the plasma torch body 20 firstly in the direction of the cavity 32 of the electrode 30, but will in all likelihood not flow in its entirety through the entire cavity 32 because, upstream of the rear, open end 34 of the electrode 30, a partial gas stream 205 flows through the openings 22 of the torch body and, by contrast to FIGS. 5 and 6, no conducting through a cooling tube occurs. At least the third partial gas stream 230 flows through the cavity 32, which third partial gas stream then flows through the openings 32c of the electrode 30, as already discussed with regard to FIG. 5.

Figure 7A:
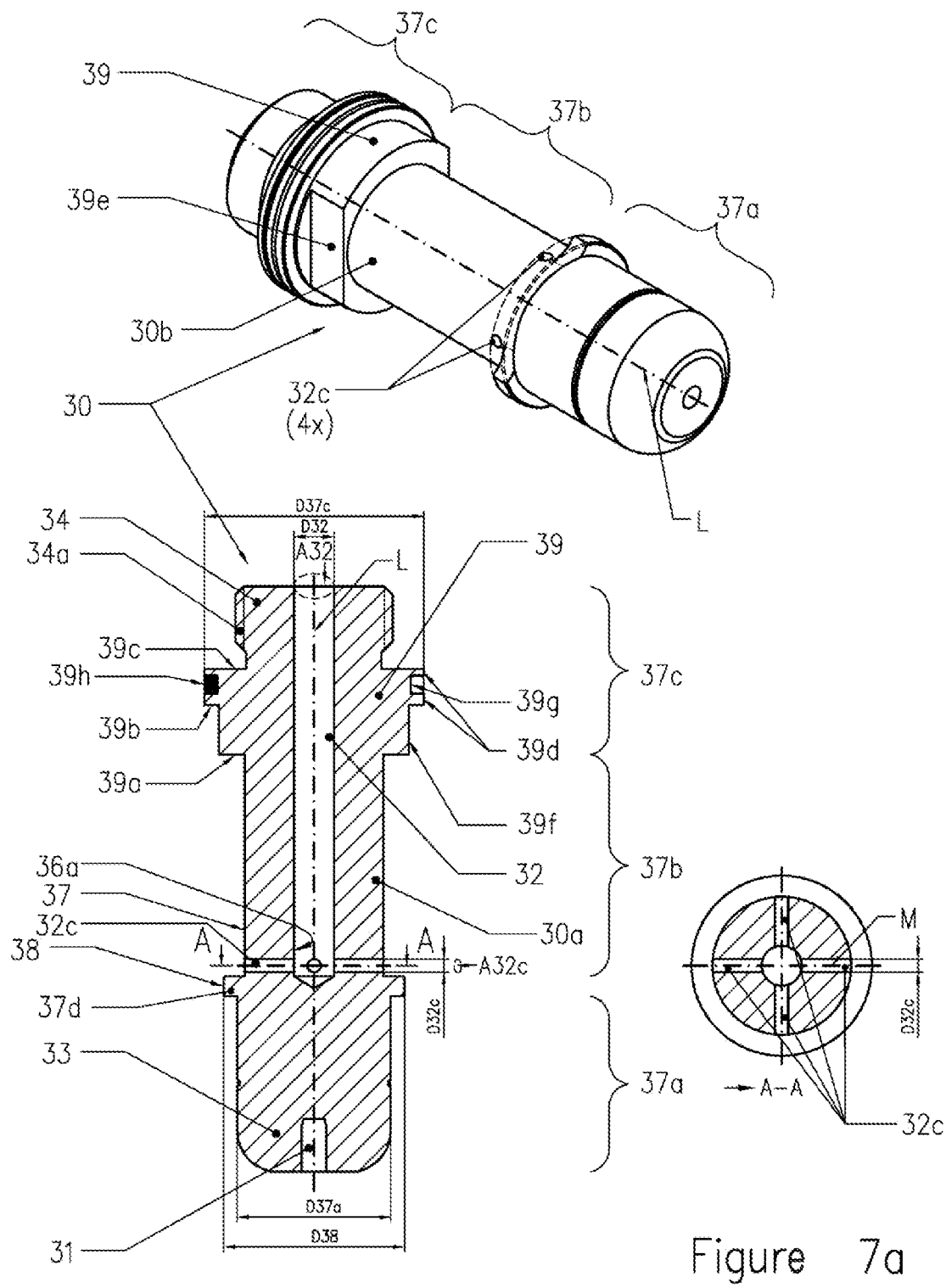
FIG. 7a shows an electrode of the plasma torch from FIG. 7.

FIG. 7a shows the electrode used in the plasma torch 10 of FIG. 7. Said electrode differs from that shown in FIG. 5a by the smaller diameter D32 of the cavity 32. Furthermore, in the central, second portion 37b, said electrode has, by way of example, 4 openings 32c which extend radially with respect to the longitudinal axis and through which gas can flow outward from the cavity 32 of the electrode 30.

In the installed state in the plasma torch 10, it is sought to attain as high a flow speed as possible for the partial gas stream 230 through the openings 32c during the cutting process. For this purpose, in the presence of a flowing gas, a relatively small pressure drop on the flow path in the cavity 32 of the electrode 30 between the rear end 34 and the front end 33 of the electrode 30 and a relatively large pressure drop on the flow path of the openings 32c between the internal cavity 32 of the electrode 30 and the space 73 between the electrode 30 and the gas-conducting units 70 and 80 are necessary. In the presence of a flowing third partial gas stream 230, the difference between the pressure p1 in the internal cavity 32 and the pressure p2 in the space 73, in each case in the immediate vicinity of the one or more openings 32c, advantageously amounts to at least 0.5 bar, but more preferably 1 bar.

This is achieved by virtue of the area A32, arising from the diameter D32 radially with respect to the longitudinal axis L, of the cavity 32 of the electrode 30 being larger than the sum of the areas A32c, arising from the diameter D32c radially with respect to the central axis/axes M, of the openings 32c. The high flow speed improves in particular the cooling action in the openings 32c and also at the surfaces of the downstream space 73, through which the third partial gas stream 230 flows.

The diameter D32 of the interior space 32 of the electrode 30 in this case amounts to for example 2.5 mm, and the diameter D32c of the two openings 32c in this case amounts to 0.8 mm. Using $\text{PI}/4 * D^2$, this yields, for the cavity 32, an area A32, formed radially with respect to the longitudinal axis L, of approximately 5 mm² and, for a bore 32c, an area A32c, formed radially with respect to the central axis M of the bore 32c, of approximately 0.5 mm². Four bores thus yield approximately 2 mm². In this example, the ratio between the area A32 and the sum of the four areas A32c amounts to 2.5.

Figure 8:
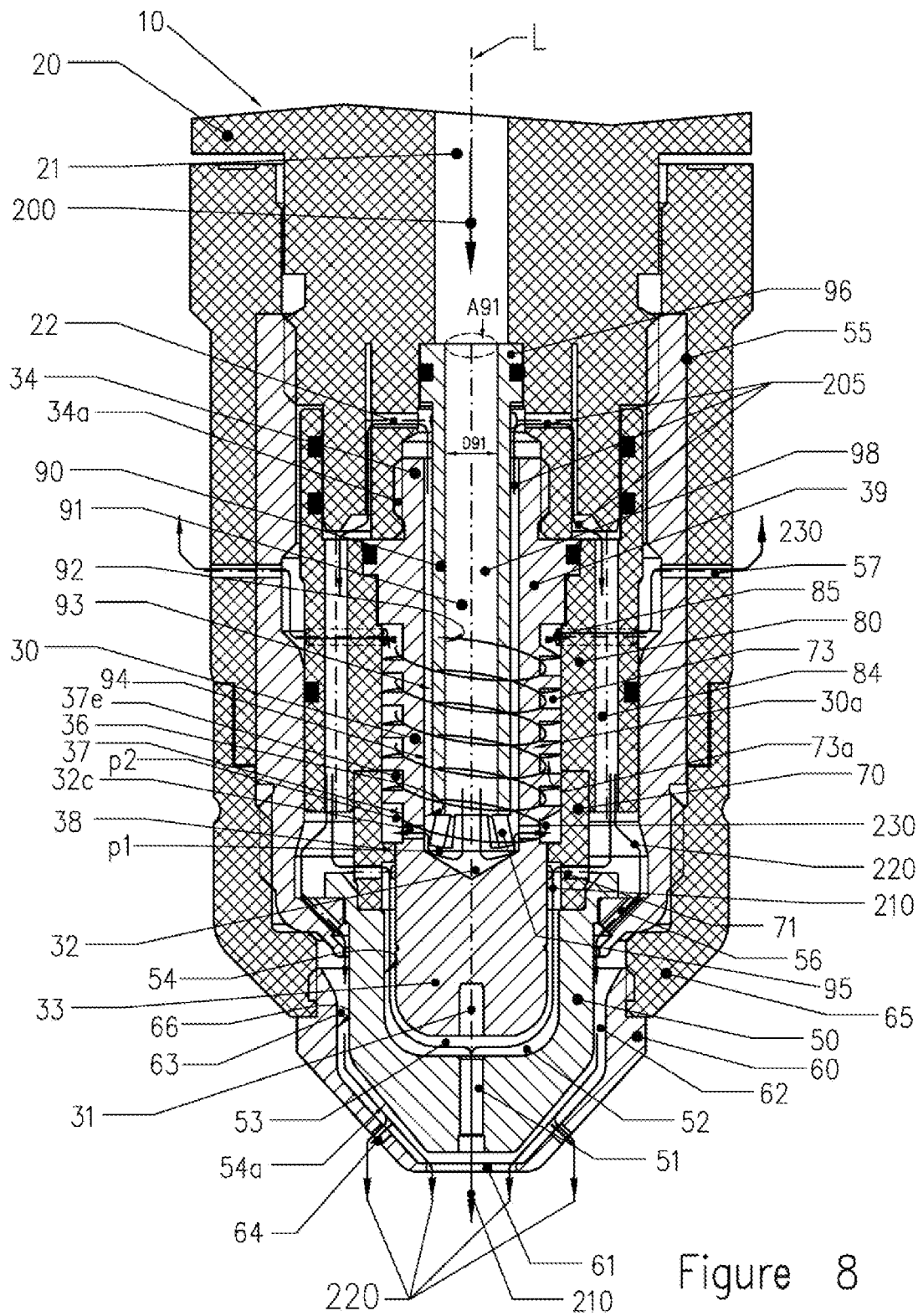
FIG. 8 is a sectional diagram of a plasma torch according to a further particular embodiment of the present invention.

FIG. 8 shows a further system similar to FIG. 5. To (further) improve the cooling action, the central, second portion 37b of the outer surface 37 has been designed such that the third partial gas stream 230 is conducted through a spiral-shaped groove 37e and thus remains in contact with the surface of the central, second portion 37b for longer, and the cooling is thus further improved. The arrangement of two or more spiral-shaped grooves or multi-start grooves running parallel is also possible.

Furthermore, by contrast to FIG. 5, the electrode 30 has no projection 37d on the outer surface 37 between the first, front portion 37a and the second, central portion 37b of the outer surface 37 of the electrode 30. Here, the centering surface 38 is a constituent part of the first, front portion 37a.

Figure 8A:
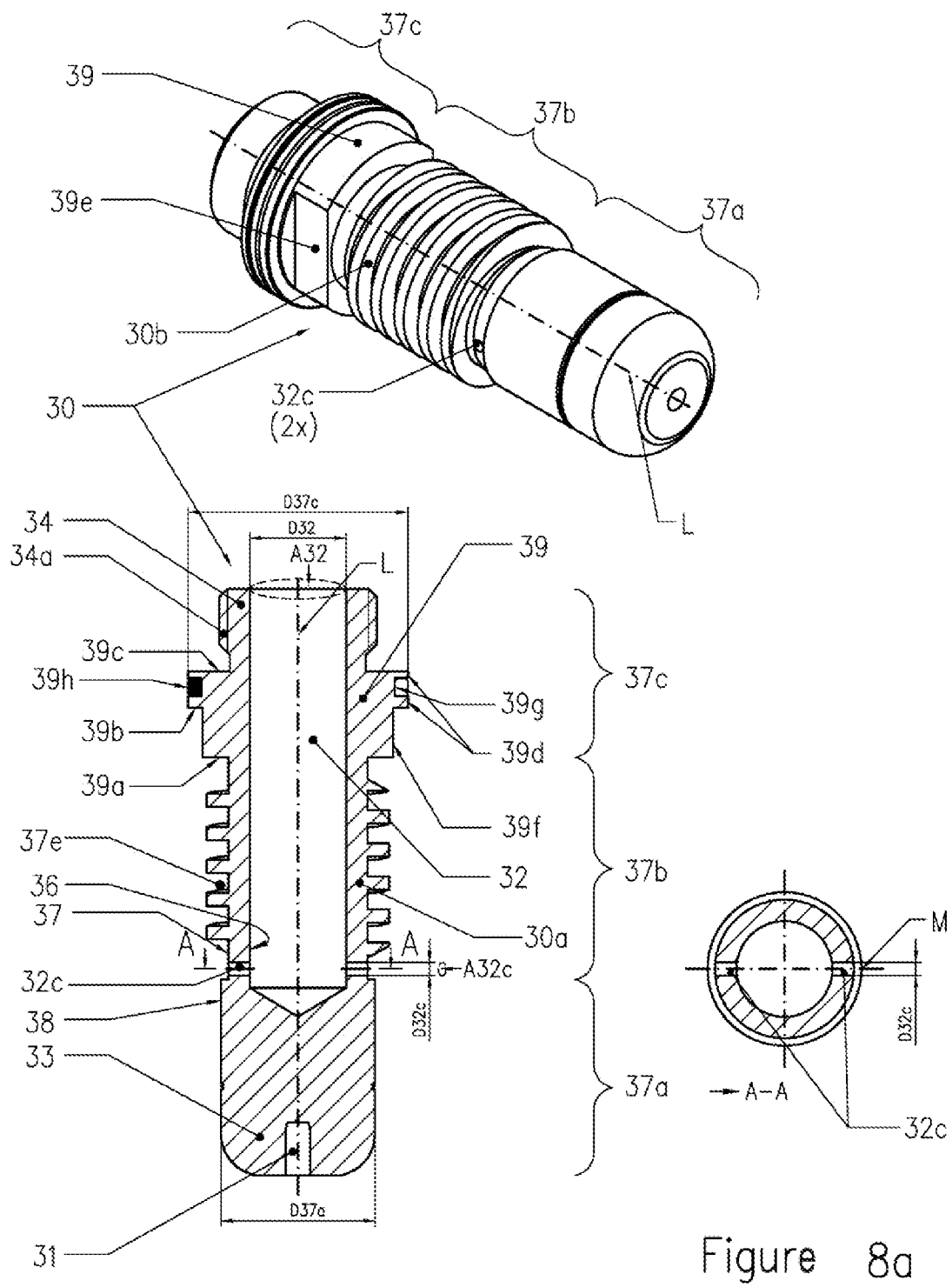
FIG. 8a shows an electrode of the plasma torch from FIG. 8.

FIG. 8a shows the electrode 30 which is used in the plasma torch 10, wherein the upper image is a perspective illustration and the lower left-hand image is a sectional illustration (longitudinal section) and the lower right-hand image is a section through the plane A-A.

By contrast to FIG. 5a, the second, central portion 37b of the outer surface 37 has been designed such that, in the installed state, the third partial gas stream 230 is conducted through a spiral-shaped groove 37e and thus remains in contact with the surface of the second, central portion 37b for longer, and the cooling is thus further improved.

Furthermore, by contrast to FIG. 5a, the electrode 30 has no projection 37d on the outer surface 37 between the first, front portion 37a and the second, central portion 37b of the outer surface 37 of the electrode 30. Here, the centering surface 38 is a constituent part of the first, front portion 37a.

The electrode 30 has two openings 32c which extend, radially with respect to the longitudinal axis L, between the inner surface 36 and the outer surface 37 through the electrode wall 30a in the second, central portion 37b. Gas can flow outward through said openings from the cavity 32 of the electrode 30.

The statements made with regard to FIG. 5a apply for the diameters D32 and D32c, the resulting areas A32 and A32c and the pressures p1 and p2.

The systems shown in FIGS. 5 to 8 may be equipped with electrodes 30 which have different surface in the portion 37b, as shown by way of example in FIG. 3.

Figure 8B:
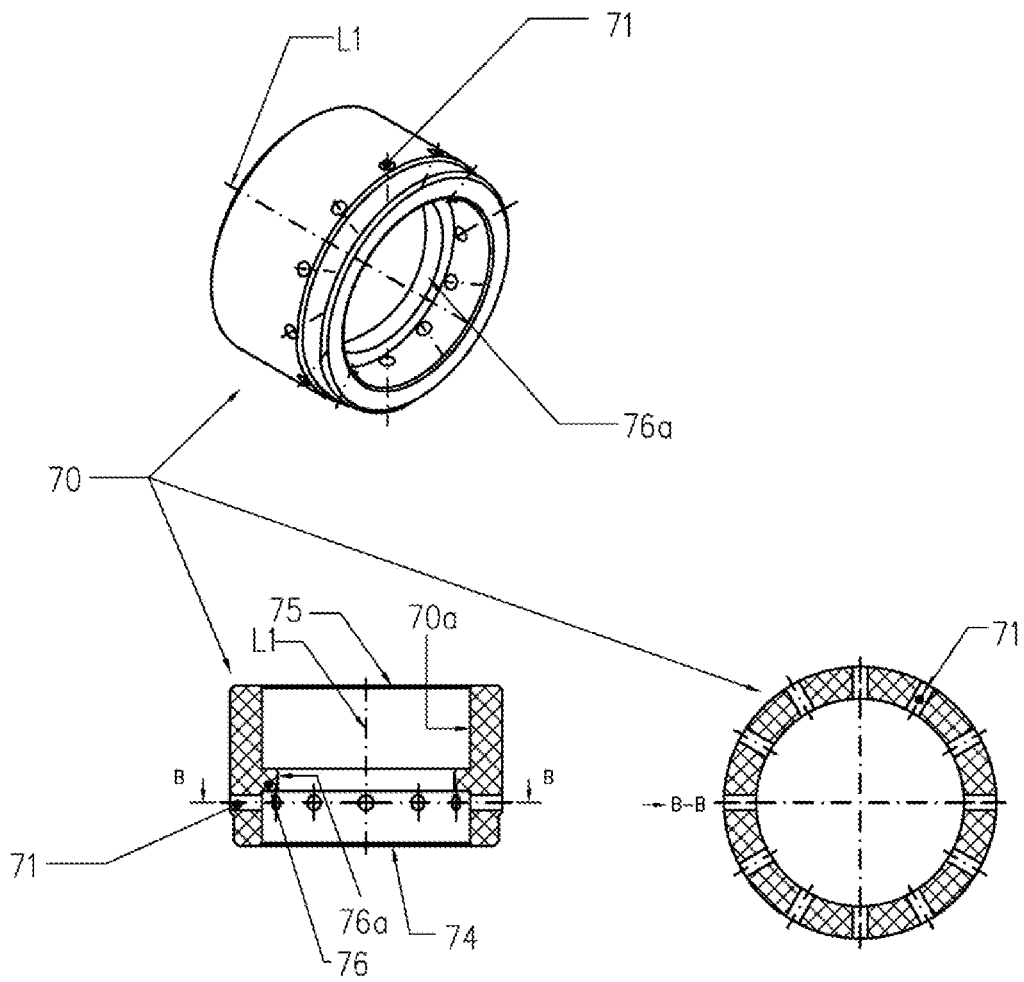
FIG. 8b shows a front gas-conducting unit of the plasma torch from FIG. 8.

FIG. 8b shows the front gas-conducting unit 70, wherein the upper image shows a perspective image, the lower left-hand image shows the longitudinal section, and the lower right-hand image shows the section through the plane B-B. Said front gas-conducting unit differs from the gas-conducting unit shown in FIG. 5b by the projection 76 which is present on the inner surface 70a and which has the inner surface 76a. In the installed state, said inner surface 76a faces the outer surface 38, which is a constituent part of the first, front portion 37a of the electrode 30. By means of these two centering surfaces, the gas-conducting unit 70 and the electrode 30 are aligned and centered relative to one another radially with respect to the longitudinal axis.

Figure 8C:
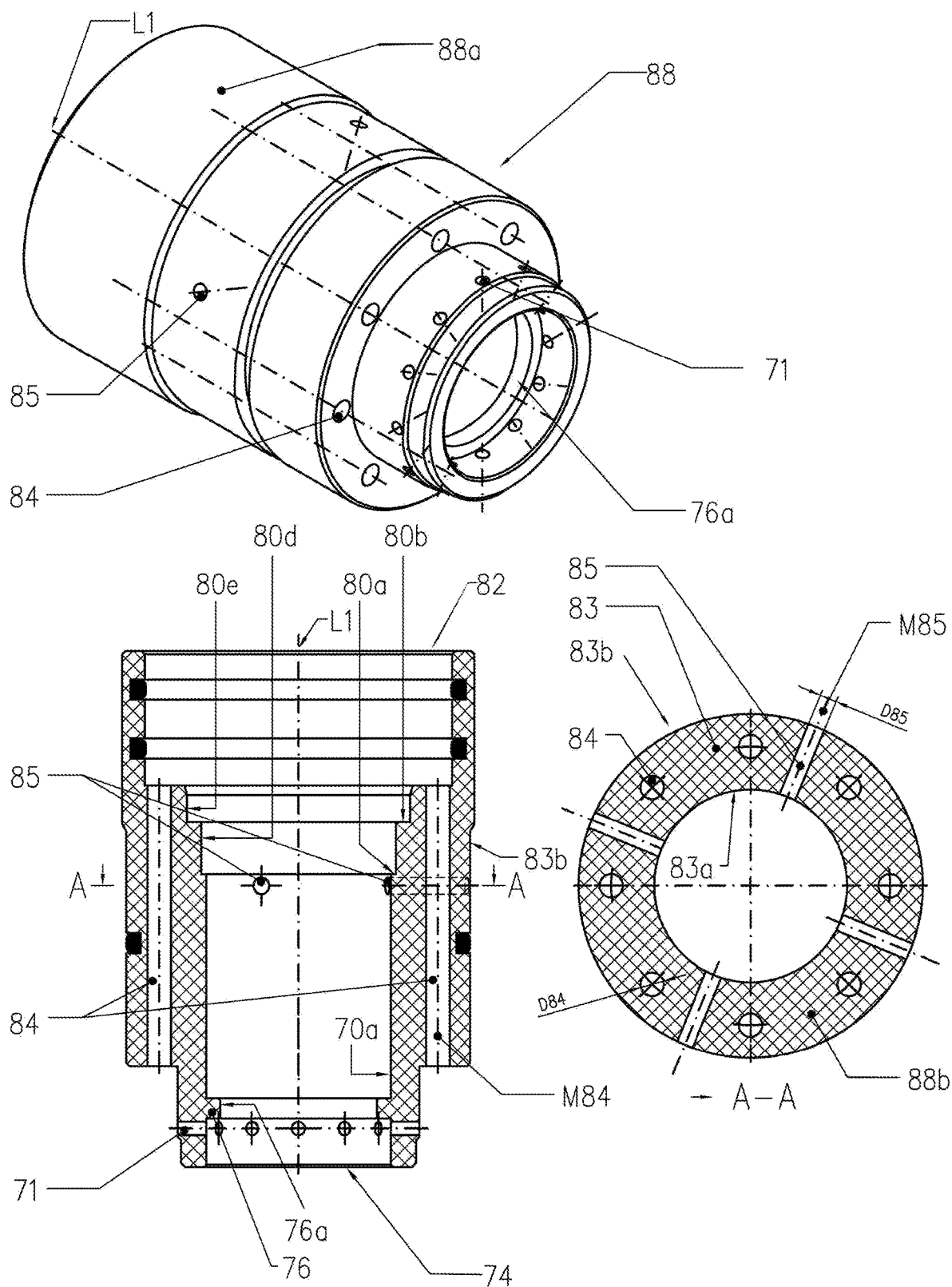
FIG. 8c shows a single-part gas-conducting unit for the plasma torch from FIG. 8.

It is also possible for the gas-conducting units 70 and 80 shown in FIGS. 2b and 8b to be produced from one part. FIG. 8c shows such a single-part gas-conducting unit 88, which has the features of said gas-conducting units 70 and 80.

Figure 9:
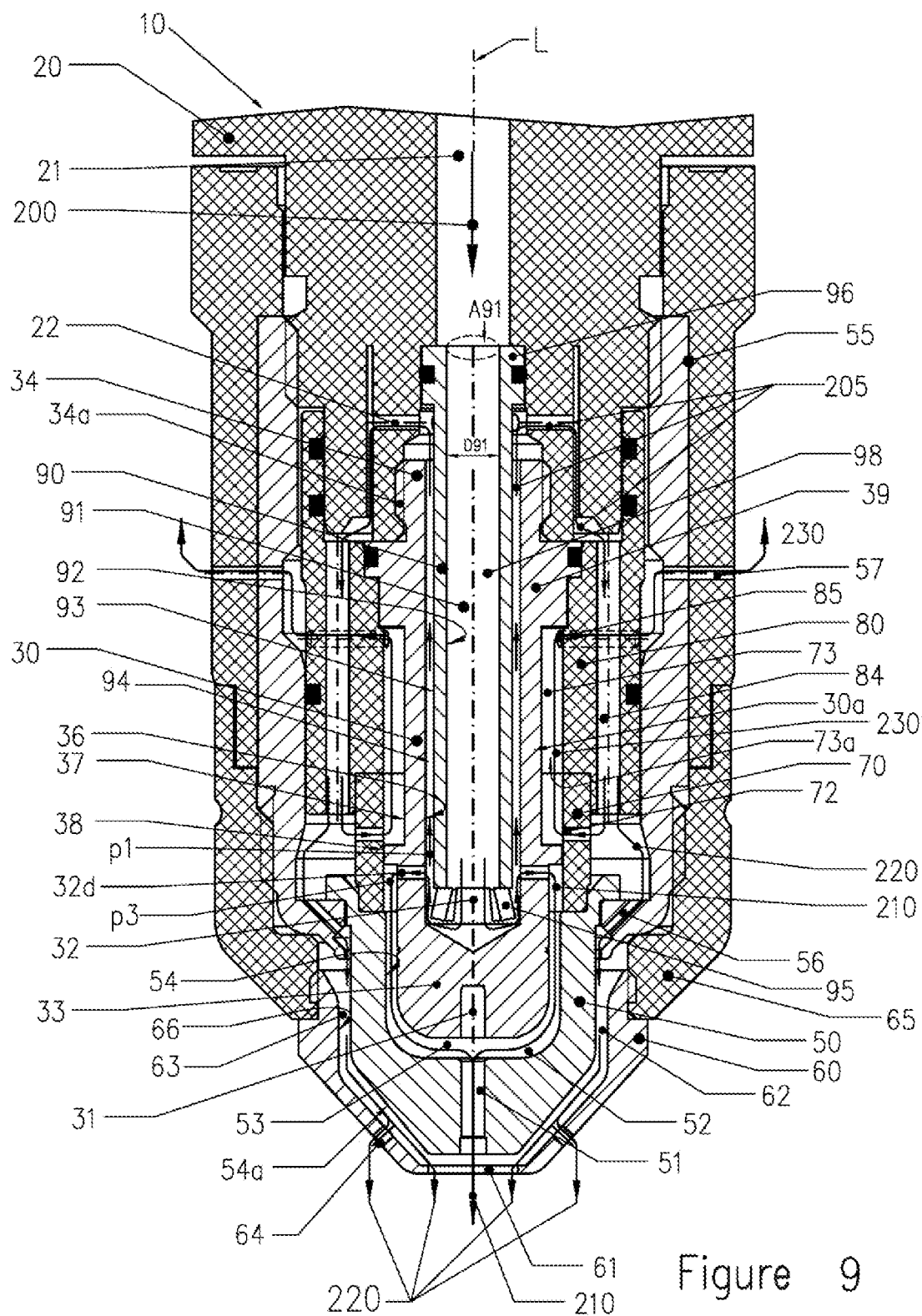
FIG. 9 shows a plasma torch according to a further particular embodiment of the present invention.
Figure 9A:
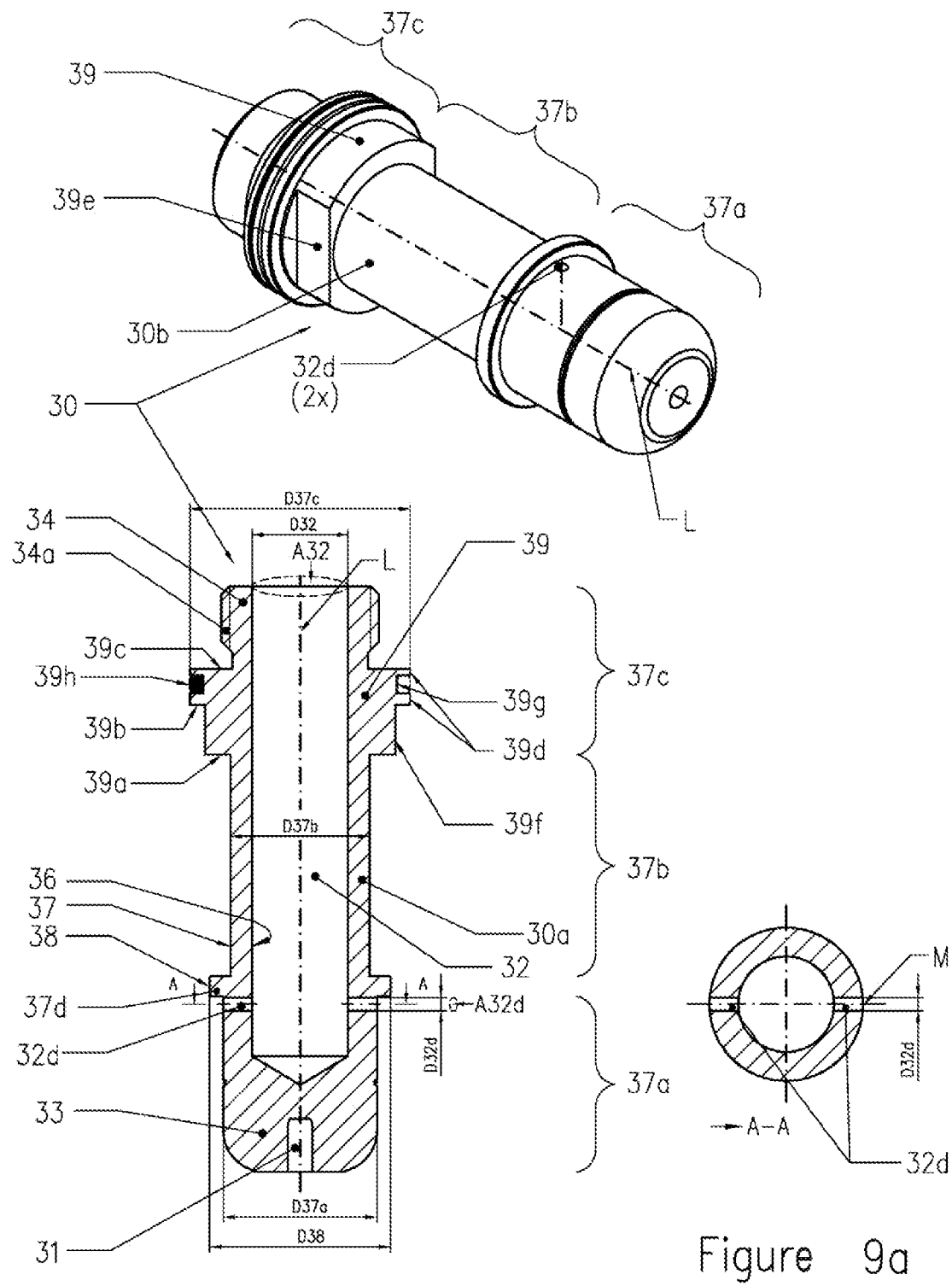
FIG. 9a shows an electrode of the plasma torch from FIG. 9.
Figure 9B:
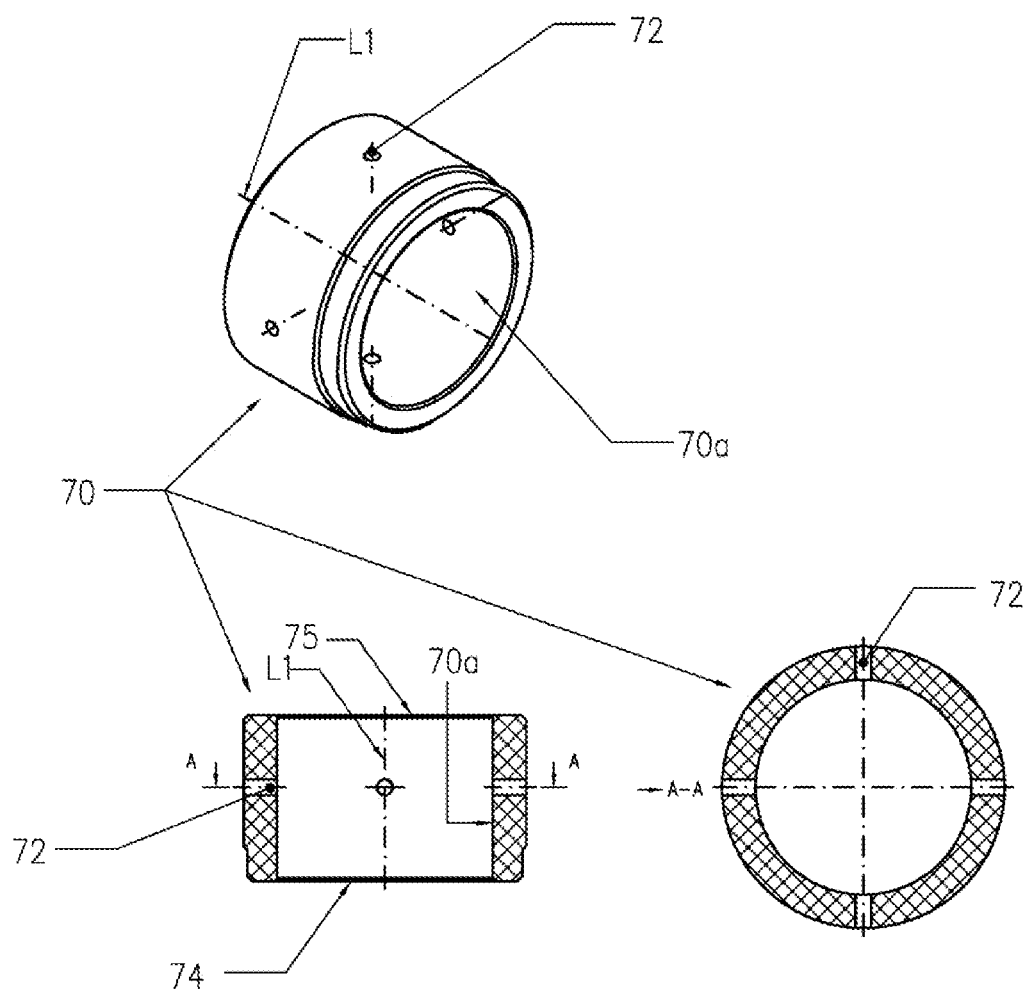
FIG. 9b shows a front gas-conducting unit of the plasma torch of FIG. 9.

FIG. 9 shows, by way of example, a further variant of a plasma torch according to the invention. FIG. 9a shows details of the electrode 30 used therein, and FIG. 9b shows details of the front gas-conducting unit 70 used therein. The rear gas-conducting unit 80 is identical to that shown in FIG. 2b.

The plasma torch shown differs from that shown in FIG. 2 by a different electrode 30 and a different front gas-conducting unit 70. Associated with this is the change in the conducting of the total gas stream 200 and of the first partial gas stream 210.

The cavity 32 of the electrode 30 extends along the longitudinal axis L beyond the transition between the first, front portion 37a and the second, central portion 37b. From the cavity 32 or the inner surface 36 of the electrode 30, in this case two openings 32d lead outward through the electrode wall 30a in the first, front portion 37a. The first partial gas stream 210 (plasma gas) flows through said openings. One opening, or more than two openings, is/are however also possible. The openings 32d are in this case arranged radially with respect to the longitudinal axis L. An offset with respect to the radial is also possible in order to enable the first partial gas stream 210 to rotate in the space 53 between the electrode 30, the front gas-conducting unit 70 and the nozzle 50. This improves the cooling action and the cutting quality.

In the plasma torch 10 that is shown, the total gas stream 200 is conducted through an opening 21 in the torch body 20 through the interior space 91 of a cooling tube 90 into the interior space 32 of an electrode 30. Said total gas stream impinges on the front, closed end 33 of the electrode 30, in which the emission insert 31 is also situated. This portion, at which the heat is generated by the arc (plasma jet) which makes contact with the emission insert, is thus cooled in an effective manner. The first partial gas stream 210 flows outward through the openings 32d through the electrode wall 30a.

The partial gas stream 205 that remains in the cavity 32 of the electrode 30 flows back in the space 94 formed by the outer surface 93 of the cooling tube 90 and the inner surface 36 of the electrode 30, and is conducted through openings or grooves or channels 22 in the plasma torch body 20 firstly in a radially outward direction with respect to the longitudinal axis L and then through openings 84 of the rear gas-conducting unit 80 in the direction of the nozzle 50 and nozzle protection cap 60. The partial gas stream 205 is subsequently divided up into the third partial gas stream 230 for the cooling gas, electrode 30, and the second partial gas stream 220, cooling gas, for the nozzle 50 and the nozzle protection cap 60.

The third partial gas stream 230, that is to say in this case the cooling gas for the electrode 30, flows through openings 72 in the gas-conducting unit 70 into the space 73 formed by the electrode 30, by the front gas-conducting unit 70 and by the rear gas-conducting unit 80, and flows through said space. The third partial gas stream 230 thus flows around the central, second portion 37b of the outer surface 37 of the electrode 30. In the vicinity of the rear, open end 34 of the electrode 30, the third partial gas stream 230 is conducted radially outward through openings 85 of the gas-conducting unit 80 and through the openings 57 of the nozzle holder 55.

The second partial gas stream 220, that is to say in this case the cooling gas for the nozzle 50 and the nozzle protection cap 60, flows through openings or grooves 56 of the nozzle holder 55 before flowing into the space 63 between the outer surface 54a of the nozzle 50 and the inner surface 66 of the nozzle protection cap 60 and then out of the nozzle protection cap opening 61 and the further openings 64 of the nozzle protection cap 60.

As already described in the preceding paragraph, the first partial gas stream 210, that is to say in this case the plasma gas, flows through the openings 32d of the electrode before flowing into the space 53 between the nozzle 50 and the electrode 30 and ultimately out of the nozzle bore 51. The first partial gas stream 210 flows around the first, front portion 37a of the outer surface 37 of the electrode 30.

Thus, the partial gas stream 205 cools the inner surface 36 and the third partial gas stream 230 cools the central, second portion 37b of the outer surface 37 of the electrode 30. The improvement in the cooling considerably lengthens the service life of the electrode 30. Additionally, the first partial gas stream 210 flowing through the openings 32d cools the electrode in said openings, and improves the cooling thereof. It is thus additionally possible to achieve good cutting quality over a longer period of time.

FIG. 9a shows the electrode 30 which is used in the plasma torch 10, wherein the upper image shows a perspective illustration and the lower left-hand image shows a sectional illustration (longitudinal section) and the lower right-hand image shows the section through the plane A-A. The electrode 30 differs from that described in FIG. 2a inter alia by the openings 32d which extend, radially with respect to the longitudinal axis L, between the inner surface 36 and the outer surface 37 through the electrode wall 30a in the first, front portion 37a. Gas can flow outward through said openings from the cavity 32 of the electrode 30.

In the installed state in the plasma torch 10, it is sought to attain as high a flow speed as possible for the first partial gas stream 210 through the openings 32d during the cutting process. For this purpose, in the presence of a flowing gas (total gas stream), a relatively small pressure drop on the flow path in the interior space 91 of the cooling tube 90 between the rear end 96 and the front end 95 of the cooling tube 90 and a relatively large pressure drop on the flow path of the openings 32d between the internal cavity 32 of the electrode 30 and the space 53 between the electrode 30, the nozzle 50 and the gas-conducting unit 70 are necessary. In the presence of a flowing first partial gas stream 210, the difference between the pressure p1 in the internal cavity 32 and the pressure p3 in the space 53, in each case in the immediate vicinity of the one or more openings 32d, advantageously amounts to at least 0.5 bar, but more preferably 1 bar.

This is achieved by virtue of the area A91, arising from the diameter D91 radially with respect to the longitudinal axis L, of the interior space 91 of the cooling tube 90 being larger than the sum of areas A32d, arising from the diameter D32d radially with respect to the central axis/axes M, of the openings 32d. The high flow speed improves in particular the cooling action in the openings 32d and also at the surfaces of the downstream space 53, through which the first partial gas stream 210 flows.

The diameter D91 of the cavity 91 of the cooling tube 90 in this case amounts to for example 3 mm, and the diameter D32d of the two openings 32d in this case amounts to 1.0 mm. Using $PI/4*D^2$, this yields, for the cavity 91, an area A91, formed radially with respect to the longitudinal axis L, of approximately 7 mm$^2$ and, for a bore 32d, an area A32d, formed radially with respect to the central axis M of the bore 32d, of approximately 0.8 mm$^2$. Two bores thus yield approximately 1.6 mm$^2$. In this example, the ratio between the area A91 and the sum of the two areas A32d amounts to 4.3.

Figure 10:
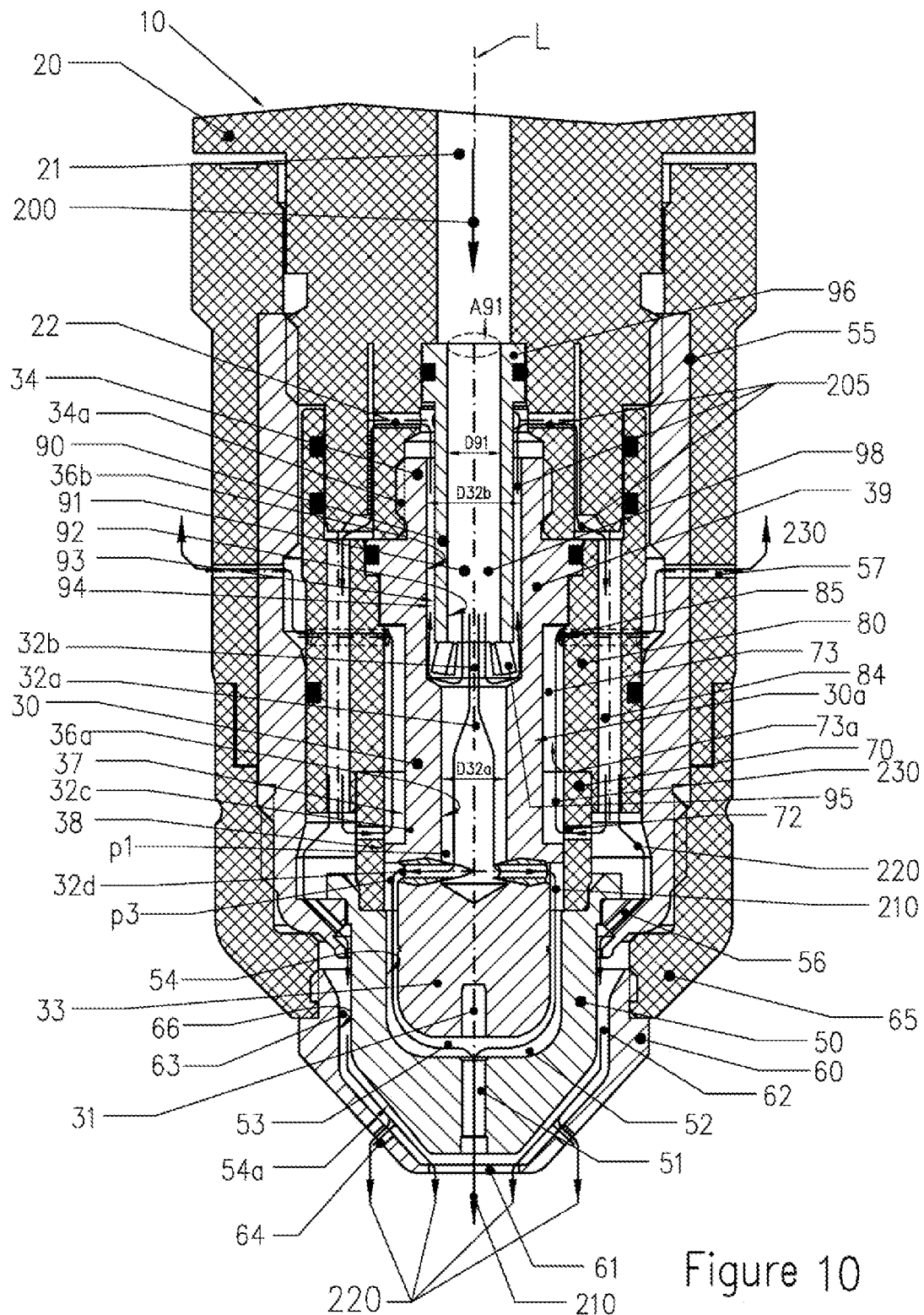
FIG. 10 is a sectional diagram of a plasma torch according to a further particular embodiment of the present invention.
Figure 11:
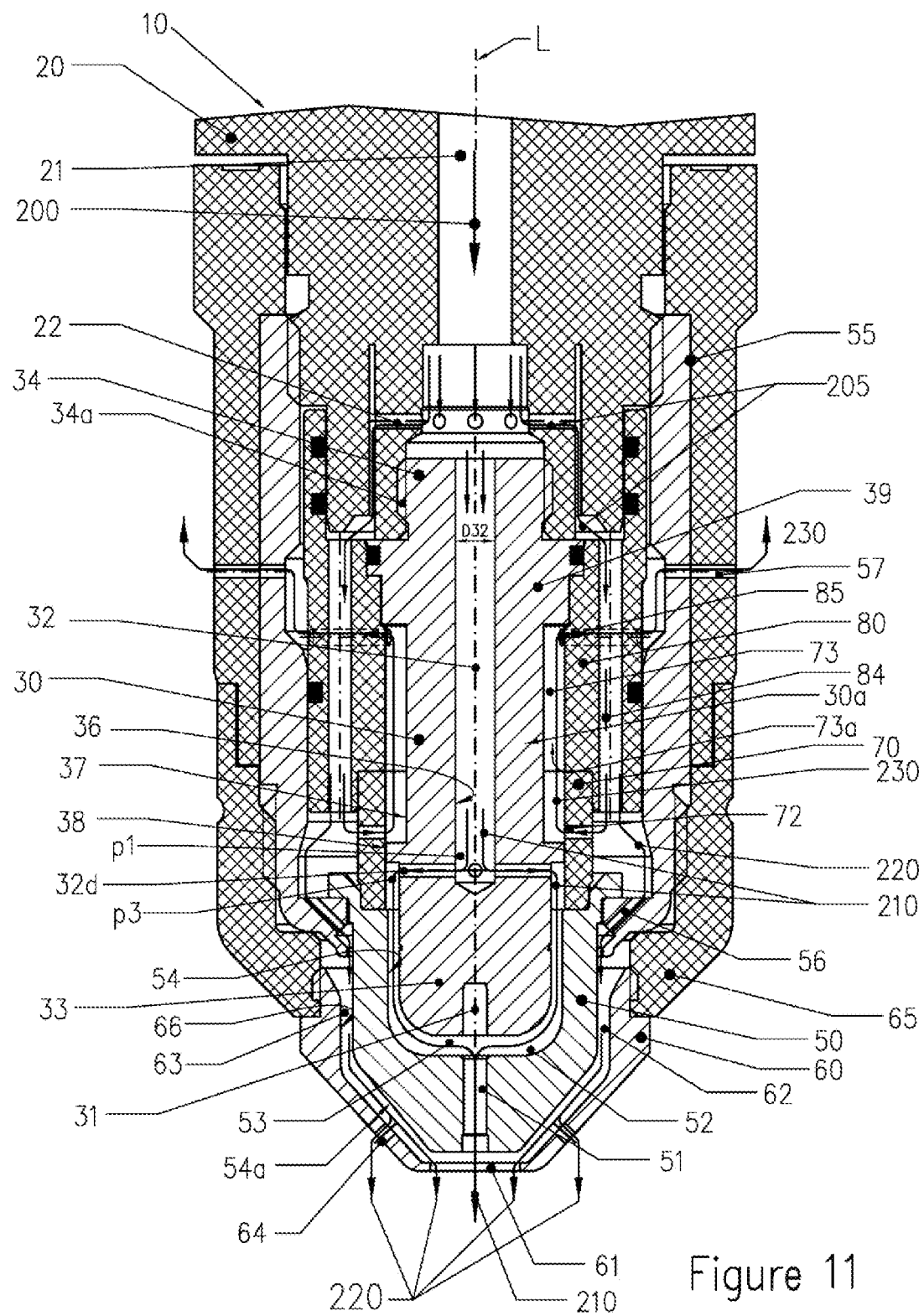
FIG. 11 is a sectional diagram of a plasma torch according to a further particular embodiment of the present invention.

FIG. 9b shows the front gas-conducting unit 70 of the plasma torch from FIGS. 9 to 11, wherein the upper image shows a perspective, the lower left-hand image shows the longitudinal section, and the lower right-hand image shows the section through the plane A-A. The front gas-conducting unit 70 differs from that described in FIG. 2c in that it has no openings 71 for the partial gas stream 210, plasma gas.

Figure 9C:
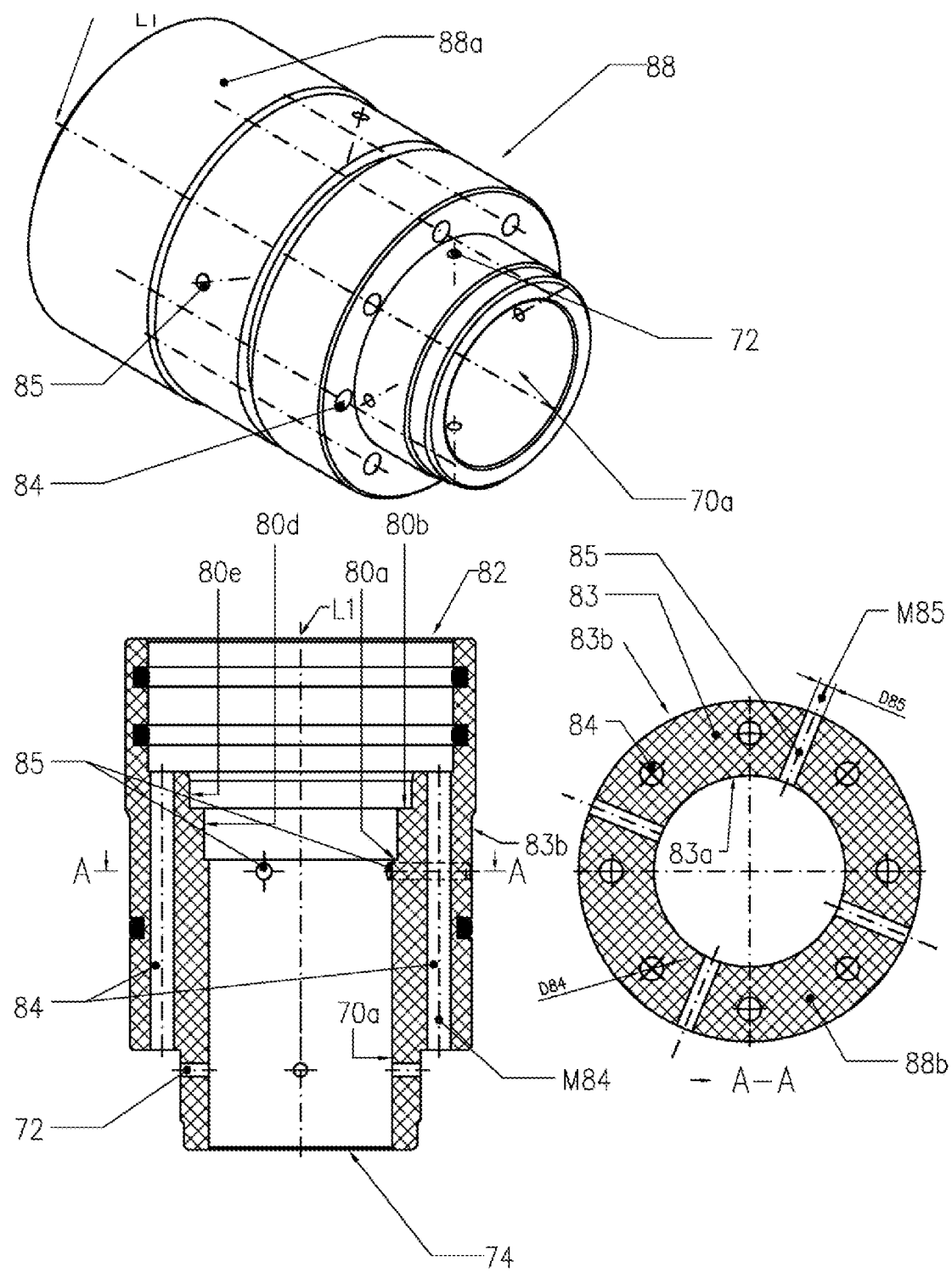
FIG. 9c shows a single-part gas-conducting unit for the plasma torch as per FIG. 9.

It is also possible for the gas-conducting units 70 and 80 in FIGS. 2b and 9b to be produced from one part. FIG. 9c shows such a single-part gas-conducting unit 88, which has the features of said gas-conducting units 70 and 80.

FIG. 10 shows, by way of example, a similar system to FIG. 9. Here, the cavity 32 of the electrode 30 is composed of two cavities, the front cavity 32a and the rear cavity 32b, which differ in terms of their diameter D32a and D32b. The rear cavity 32b has a larger diameter than the front cavity 32a. Further cavities with different diameters are also possible. The cooling tube 90 projects in with its front end 95 as far as into the vicinity of the transition, or as far as the transition, from the rear cavity 32b to the front cavity 32a, and may be supported there in order that it cannot slip any further forward.

By means of this arrangement, the thickness of the wall 30a of the electrode in the region of the front cavity 32a is larger, and can more effectively dissipate heat from the front end 33 of the electrode 30 in the direction of the rear end 34.

Figure 10A:
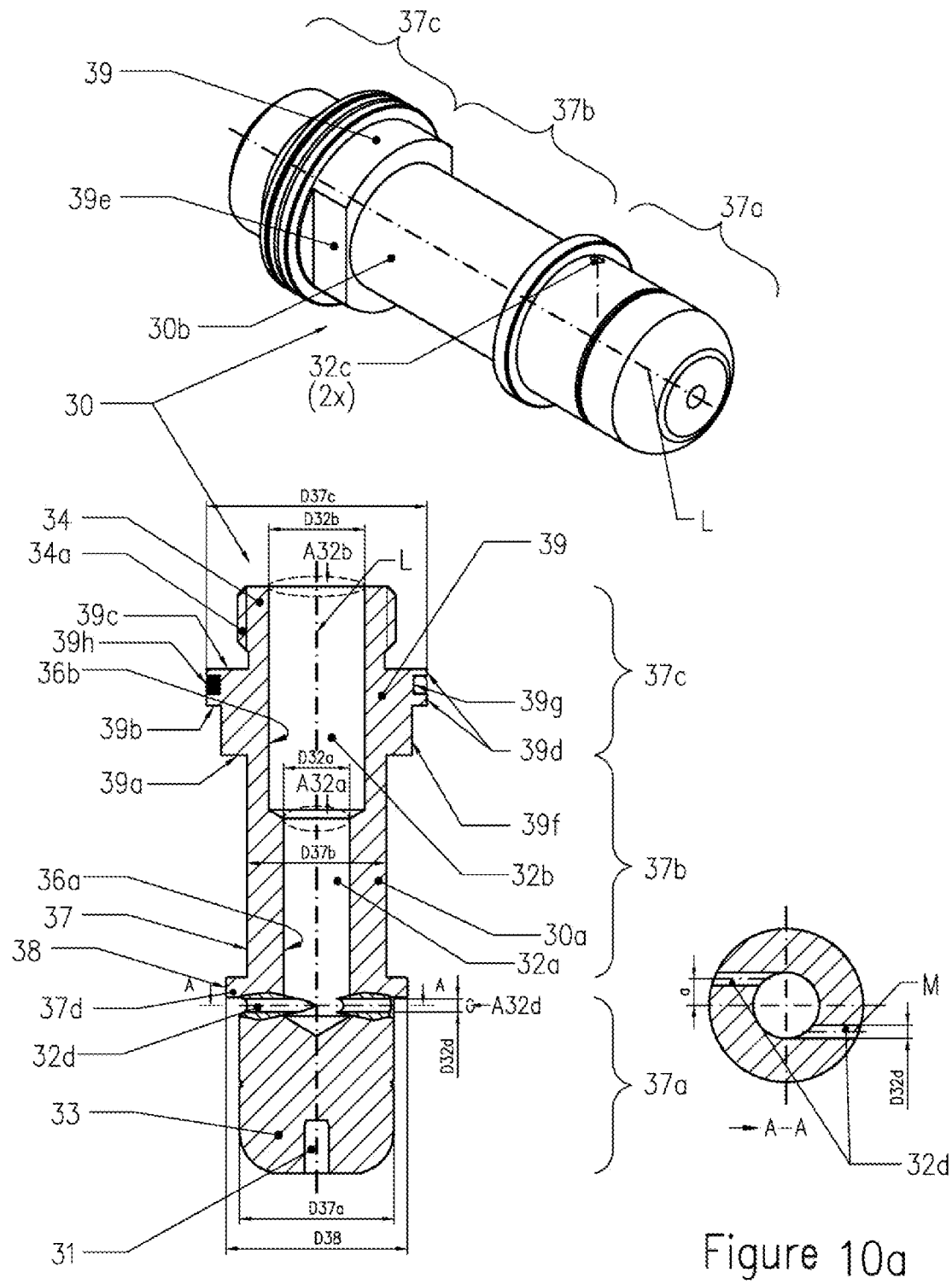
FIG. 10a shows an electrode of the plasma torch from FIG. 10.

FIG. 10a shows the electrode 30 which is used in the plasma torch 10 of FIG. 10, wherein the upper image is a perspective illustration and the lower left-hand image is a sectional illustration (longitudinal section) and the lower right-hand image is a section through the plane A-A. It differs from the electrode in FIG. 9a by the cavity 32, in this case composed of two cavities, the front cavity 32a and the rear cavity 32b, which differ in terms of their diameter D32a and D32b. The rear cavity 32b has a larger diameter than the front cavity 32a. Furthermore, the openings 32d in the first, front portion 37a are, as illustrated in the section A-A, arranged so as to be offset with respect to the radial to the longitudinal axis L by a. Gas can flow outward through said openings from the front cavity 32a of the electrode 30. Thus, the partial gas stream 210 flowing through the openings is, in the installed state, set in rotation in the space 53 between the electrode 30, the front gas-conducting unit 70 and the nozzle 50. This improves the cooling action and the cutting quality.

In the installed state in the plasma torch 10, it is sought to attain as high a flow speed as possible for the first partial gas stream 210 through the openings 32d during the cutting process. For this purpose, in the presence of a flowing gas, a relatively small pressure drop on the flow path in the interior space 91 of the cooling tube 90 between the rear end 96 and the front end 95 of the cooling tube 90 and a relatively large pressure drop on the flow path of the openings 32d between the internal cavity 32a of the electrode 30 and the space 53 between the electrode 30, the nozzle 50 and the gas-conducting units 70 are necessary. In the presence of a flowing first partial gas stream 210, the difference between the pressure p1 in the internal cavity 32a and the pressure p3 in the space 53, in each case in the immediate vicinity of the one or more openings 32d, advantageously amounts to at least 0.5 bar, but more preferably 1 bar.

This is achieved by virtue of the area A91, arising from the diameter D91 radially with respect to the longitudinal axis L, of the interior space 91 of the cooling tube 90 being larger than the sum of areas A32d, arising from the diameter D32d radially with respect to the central axis/axes M, of the openings 32d. The high flow speed improves in particular the cooling action in the openings 32d and also at the surfaces of the downstream space 53, through which the partial gas stream 210 flows.

Since the diameter D91 of the interior space 91 of the cooling tube 90 is smaller than the diameter D32a of the front cavity 32a of the electrode 30, the area A91 has a greater influence than the area A32a in determining the pressure drop.

The diameter D91 of the cavity 91 of the cooling tube 90 in this case amounts to for example 3 mm, and the diameter D32d of the two openings 32d in this case amounts to 1.0 mm. Using $PI/4*D^2$, this yields, for the cavity 91, an area A91, formed radially with respect to the longitudinal axis L, of approximately 7 mm$^2$ and, for a bore 32d, an area A32d, formed radially with respect to the central axis M of the bore 32d, of approximately 0.8 mm$^2$. Two bores thus yield approximately 1.6 mm$^2$. In this example, the ratio between the area A91 and the sum of the two areas A32d amounts to 4.3.

FIG. 11 shows a similar system to FIG. 9, but without a cooling tube. The cavity 32 of the electrode 30 has a smaller diameter D32 than that in FIG. 9. By means of this arrangement, the thickness of the electrode wall 30a is larger, and can more effectively dissipate the heat from the front, closed end 33 of the electrode 30 in the direction of the rear, open end 34.

The total gas stream 200 flows through the opening 21 in the plasma torch body 20 firstly in the direction of the cavity 32 of the electrode 30, but will in all likelihood not flow in its entirety through the entire cavity 32 because, upstream of the rear end 34 of the electrode 30, a partial gas stream 205 flows through the openings 22 of the torch body 20, and no conducting through a cooling tube, as shown in FIG. 9, occurs. At least the partial gas stream 210, plasma gas, flows through the cavity 32, which partial gas stream flows through the openings 32d of the electrode, as already discussed with regard to FIG. 9.

Figure 11A:
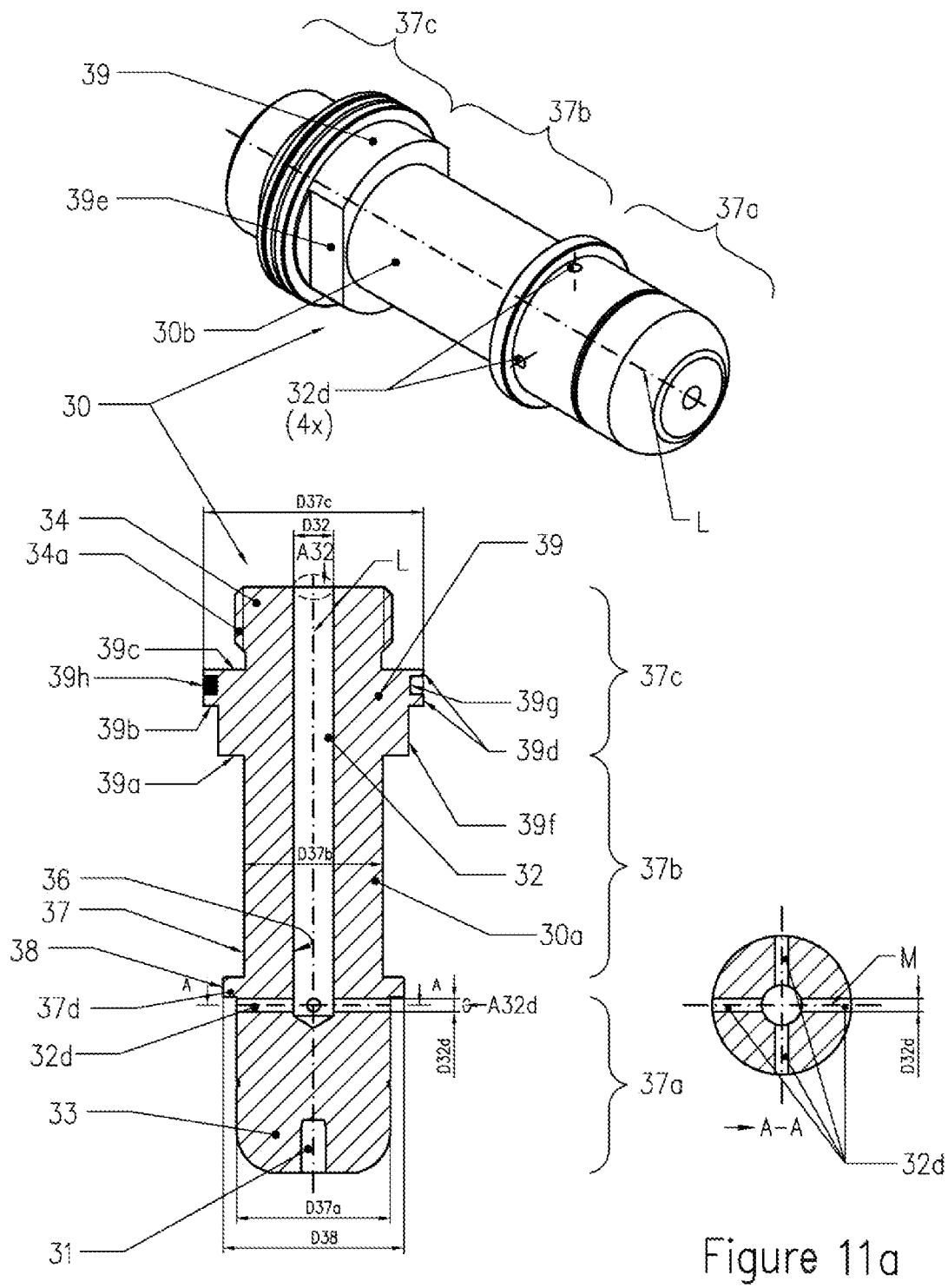
FIG. 11a shows an electrode of the plasma torch from FIG. 11.

FIG. 11a shows the electrode which is used in the plasma torch 10 of FIG. 11, wherein the upper image is a perspective illustration and the lower left-hand image is a sectional illustration (longitudinal section) and the lower right-hand image is a section through the plane A-A. Said electrode differs from that shown in FIG. 9a by the smaller diameter D32 of the cavity 32. Furthermore, in the first, front portion 37a, said electrode has, by way of example, four openings 32d which extend radially with respect to the longitudinal axis L and through which gas can flow outward from the cavity 32 of the electrode 30.

In the installed state in the plasma torch 10, it is sought to attain as high a flow speed as possible for the partial gas stream 210 through the openings 32d during the cutting process. For this purpose, in the presence of a flowing gas, a relatively small pressure drop on the flow path in the cavity 32 of the electrode 30 between the rear end 34 and the front end 33 of the electrode 30 and a relatively large pressure drop on the flow path of the openings 32d between the internal cavity 32 of the electrode 30 and the space 53 between the electrode 30, the nozzle 50 and the gas-conducting unit 70 are necessary. In the presence of a flowing partial gas stream 210, the difference between the pressure p1 in the internal cavity 32 and the pressure p3 in the space 53, in each case in the immediate vicinity of the one or more openings 32d, advantageously amounts to at least 0.5 bar, but more preferably 1 bar.

This is achieved by virtue of the area A32, arising from the diameter D32 radially with respect to the longitudinal axis L, of the cavity 32 of the electrode 30 being larger than the sum of the areas A32d, arising from the diameter D32d radially with respect to the central axis/axes M, of the openings 32d. The high flow speed improves in particular the cooling action in the openings 32d and also at the surfaces of the downstream space 53, through which the first partial gas stream 210 flows.

The diameter D32 of the interior space 32 of the electrode 30 in this case amounts to for example 2.5 mm, and the diameter D32d of the four openings 32d in this case amounts to 0.8 mm. Using $PI/4*D^2$, this yields, for the cavity 32, an area A32, formed radially with respect to the longitudinal axis L, of approximately 5 mm$^2$ and, for a bore 32d, an area A32d, formed radially with respect to the central axis M of the bore 32d, of approximately 0.5 mm$^2$. Four bores thus yield approximately 2 mm$^2$. In this example, the ratio between the area A32 and the sum of the four areas A32d amounts to approximately 2.5.

Figure 12:
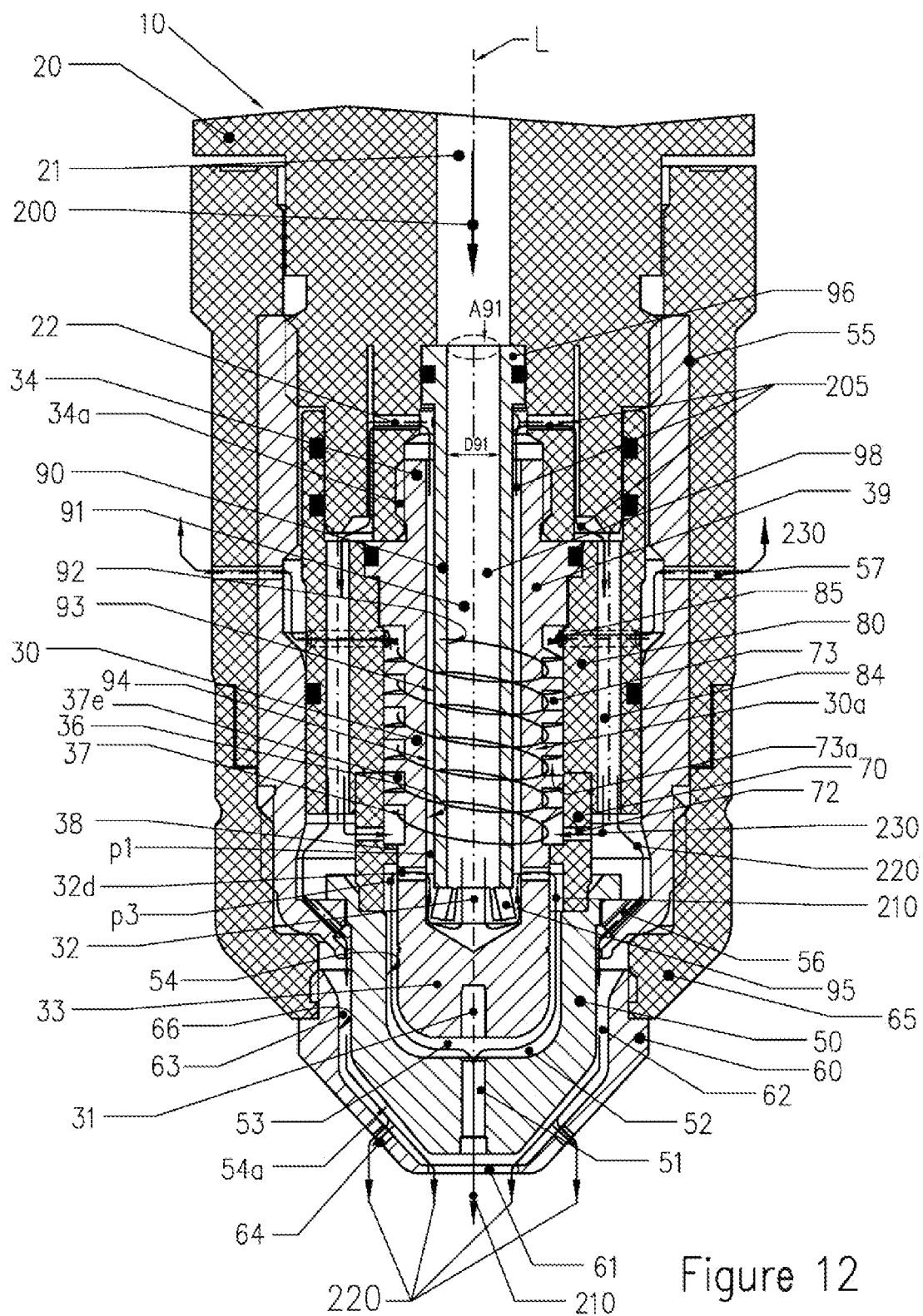
FIG. 12 is a sectional diagram of a plasma torch according to a further particular embodiment of the present invention.

FIG. 12 shows a further system similar to FIG. 9. To improve the cooling action, the second, central portion 37b of the outer surface 37 has been designed such that the third partial gas stream 230 is conducted through a spiral-shaped groove 37e and thus remains in contact with the surface of the second, central portion 37b for longer, and the cooling is thus further improved. The arrangement of two or more spiral-shaped grooves running parallel is also possible.

Furthermore, by contrast to FIG. 9, the electrode 30 has no projection 37d on the outer surface 37 between the first, front portion 37a and the second, central portion 37b of the outer surface 37 of the electrode 30. Here, the centering surface 38 is a constituent part of the first, front portion 37a.

Figure 12A:
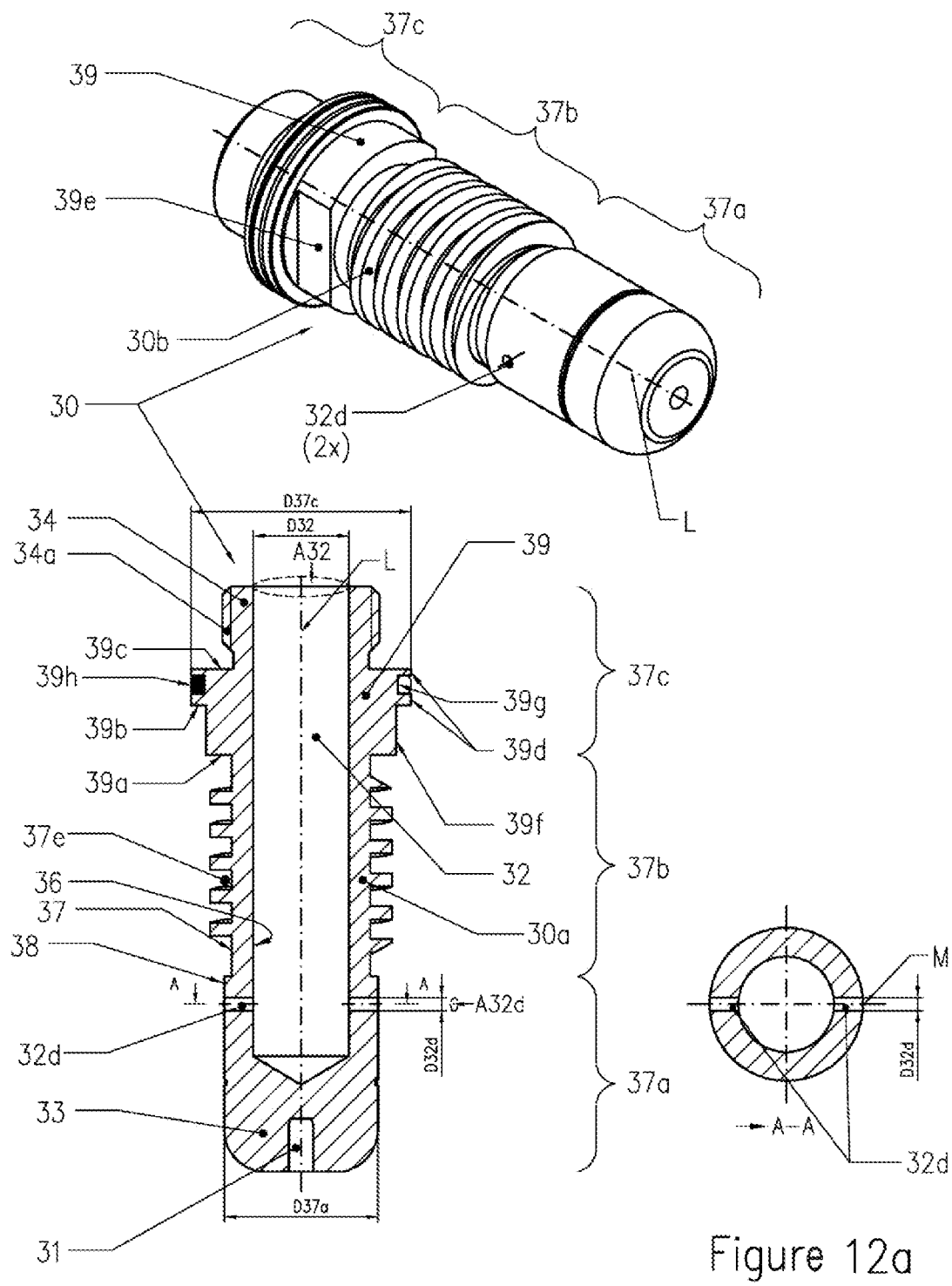
FIG. 12a shows an electrode of the plasma torch from FIG. 12.

FIG. 12a shows the electrode 30 which is used in the plasma torch 10, wherein the upper image is a perspective illustration and the lower left-hand image is a sectional illustration (longitudinal section) and the lower right-hand image is a section through the plane A-A.

By contrast to FIG. 9a, the central, second portion 37b of the outer surface 37 has been designed such that, in the installed state, the third partial gas stream 230 is conducted through a spiral-shaped groove 37e and thus remains in contact with the surface of the central, second portion 37b for longer, and the cooling is thus further improved. Furthermore, by contrast to FIG. 9a, the electrode 30 has no projection 37d on the outer surface 37 between the front, first portion 37a and the central, second portion 37b of the outer surface 37 of the electrode 30. Here, the centering surface 38 is a constituent part of the front, first portion 37a.

The electrode 30 has two openings 32d which extend, radially with respect to the longitudinal axis L, between the inner surface 36 and the outer surface 37 through the wall 30a in the front, first portion 37a. Gas can flow outward through said openings from the cavity 32 of the electrode 30.

The statements made with regard to FIG. 9a apply for the diameters D32 and D32d, the resulting areas A32 and A32d and the pressures p1 and p3.

Figure 12B:
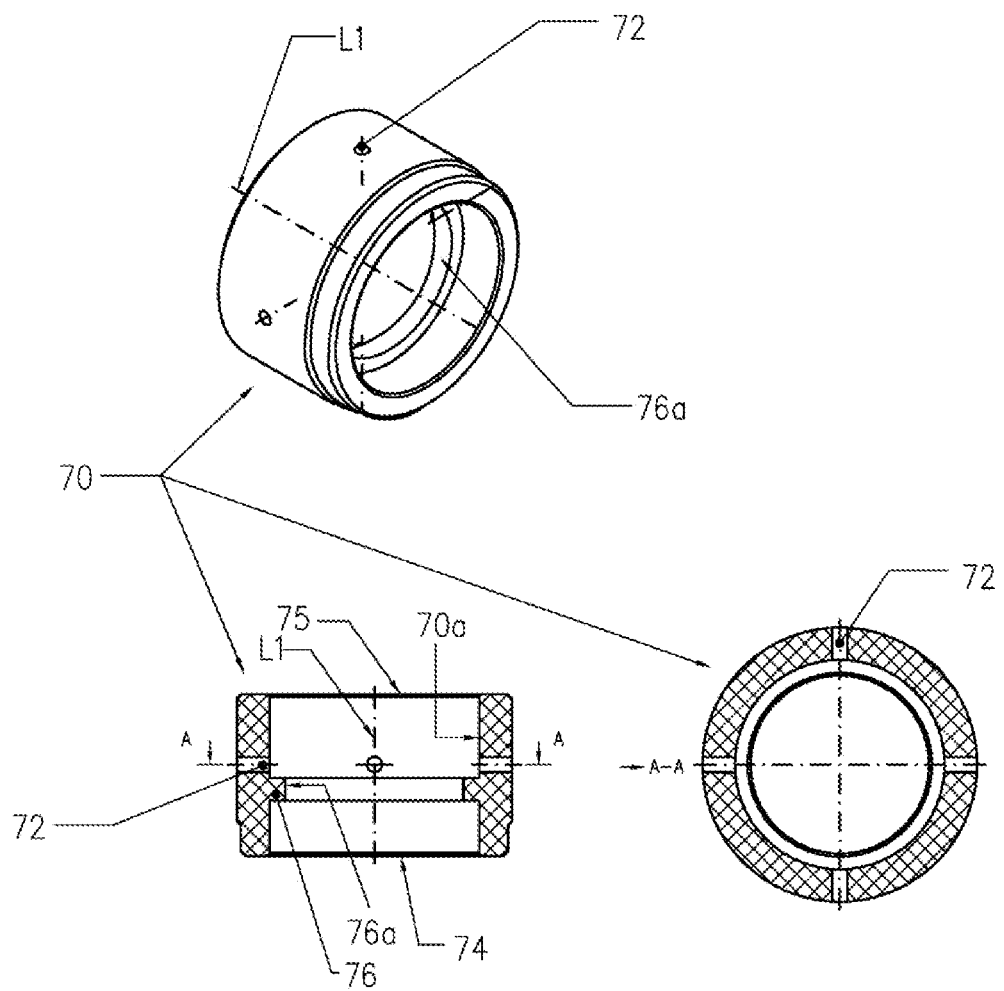
FIG. 12b shows a front gas-conducting unit of the plasma torch from FIG. 12.

FIG. 12b shows the front gas-conducting unit 70, wherein the upper image shows a perspective image, the lower left-hand image shows the longitudinal section, and the lower right-hand image shows the section through the plane A-A. Said front gas-conducting unit differs from the gas-conducting unit shown in FIG. 9b by the projection 76 which is present on the inner surface 70a and which has the inner surface 76a. In the installed state, said inner surface 76a faces the outer surface 38, which is a constituent part of the first, front portion 37a of the electrode 30. By means of these two centering surfaces, the gas-conducting unit 70 and the electrode 30 are aligned and centered relative to one another radially with respect to the longitudinal axis.

Figure 12C:
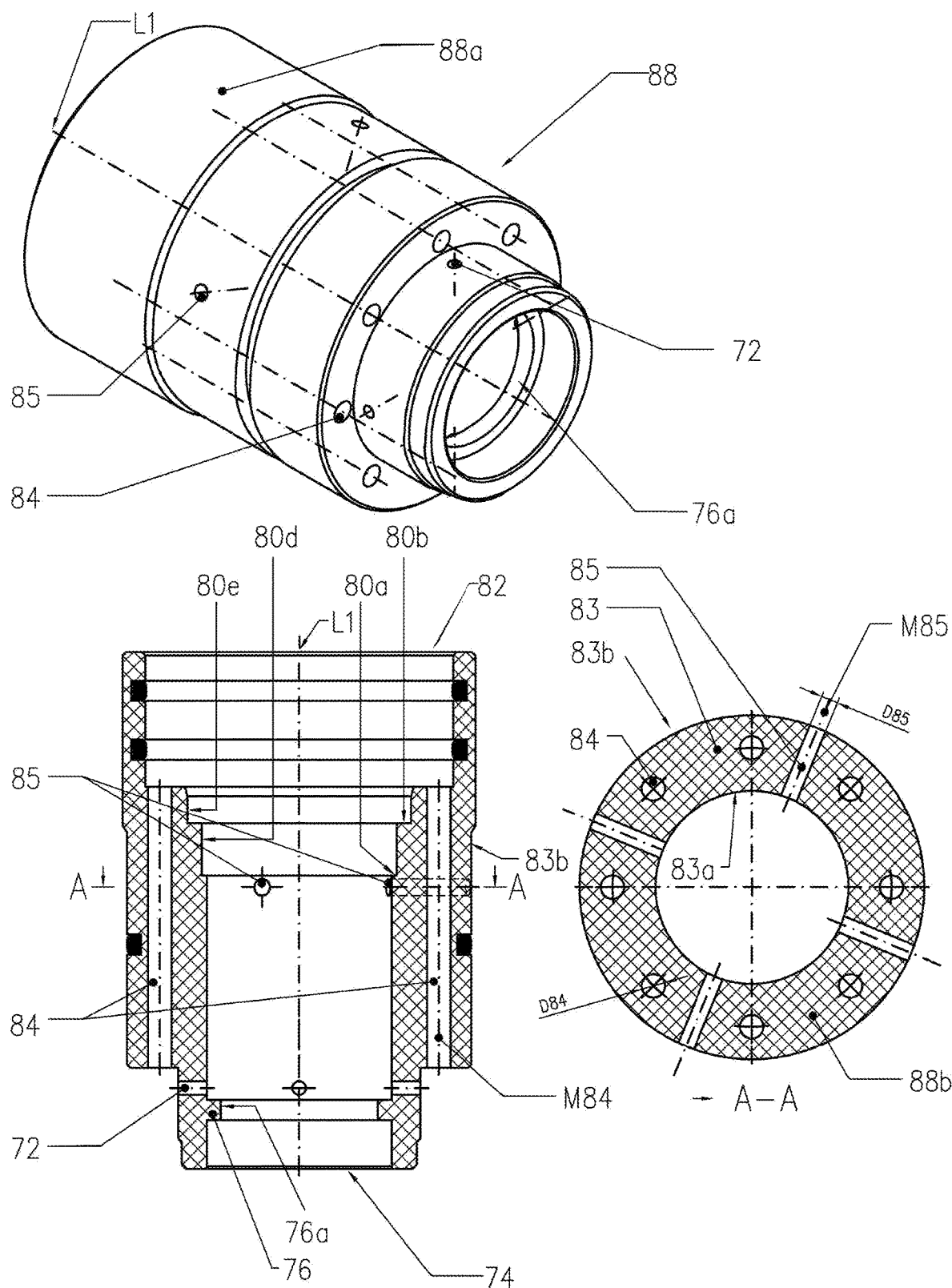
FIG. 12c shows a single-part gas-conducting unit for the plasma torch as per FIG. 12.

It is also possible for the gas-conducting units 70 and 80 in FIGS. 2b and 12b to be produced from one part. FIG. 12c shows such a single-part gas-conducting unit 88, which has the features of said gas-conducting units 70 and 80.

The systems shown in FIGS. 9 to 12 may be equipped with electrodes 30 which have different surfaces in the portion 37b, as shown by way of example in FIG. 3.

Figure 13:
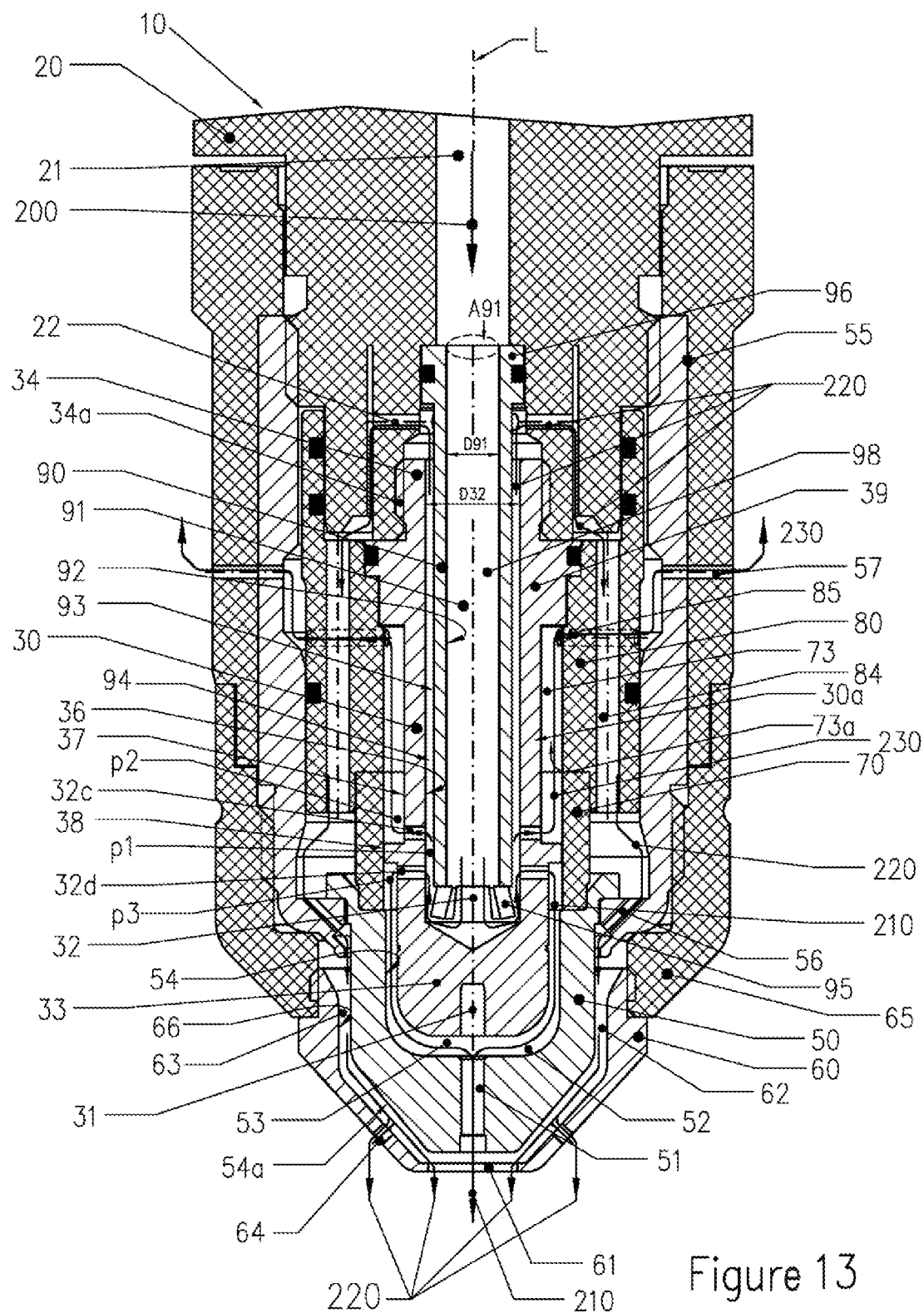
FIG. 13 is a sectional diagram of a plasma torch according to a further particular embodiment of the present invention.
Figure 13A:
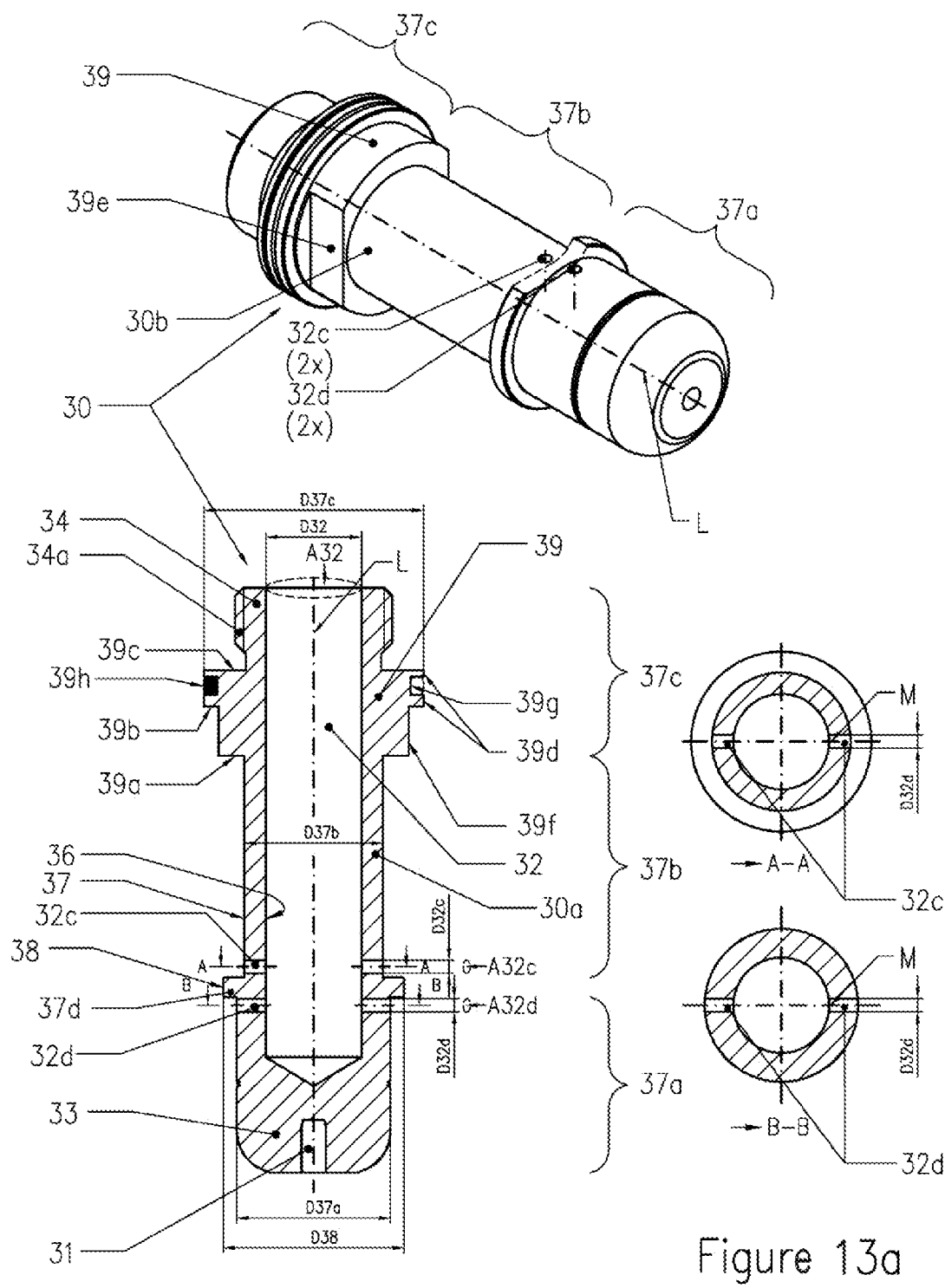
FIG. 13a shows an electrode of the plasma torch from FIG. 13.
Figure 13B:
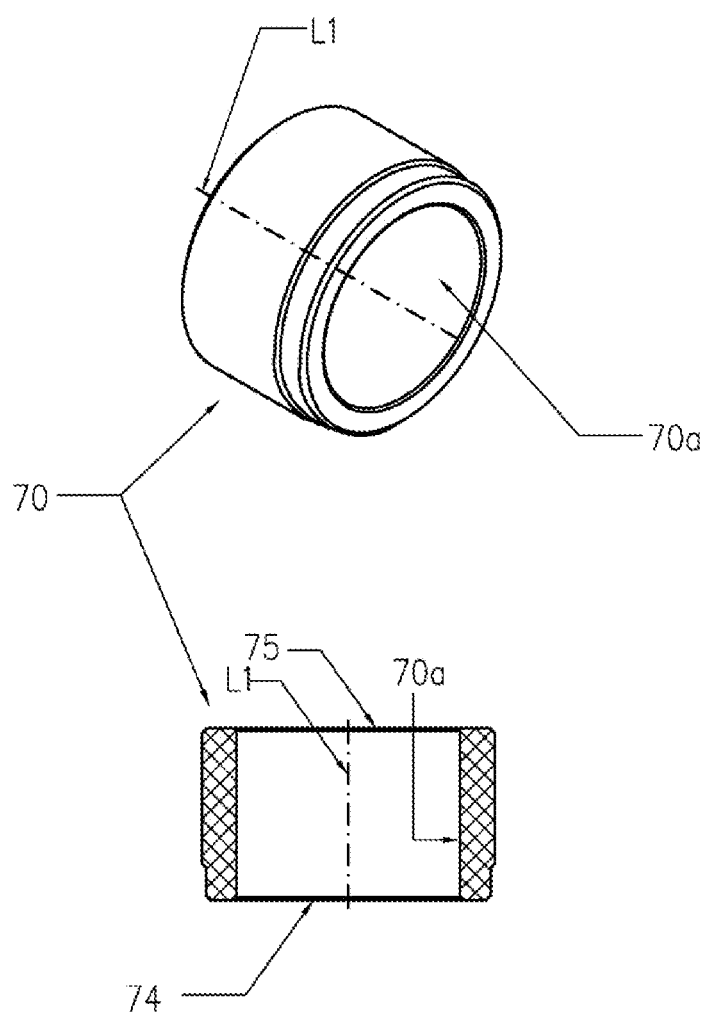
FIG. 13b shows a front gas-conducting unit of the plasma torch of FIG. 13.

FIG. 13 shows, by way of example, a variant of a plasma torch 10 according to the invention. FIG. 13a shows details of the electrode 30 used therein, and FIG. 13b shows details of the front gas-conducting unit 70 used therein. The rear gas-conducting unit 80 is identical to that shown in FIG. 2b.

The plasma torch shown differs from that shown in FIG. 2 by a different electrode 30 and a different front gas-conducting unit 70. Associated with this is the change in the conducting of the total gas stream 200 and the division into the first to third partial gas streams 210, 220 and 230.

The cavity 32 of the electrode 30 extends along the longitudinal axis L beyond the transition between the first, front portion 37a and the second, central portion 37b. From the cavity 32 or the inner surface 36 of the electrode 30, in this case two openings 32d lead outward through the electrode wall 30a in the first, front portion 37a and two openings 32c lead outward through the electrode wall 30a in the second, central portion 37b. The partial gas stream 210, plasma gas, flows through the openings 32d, and the partial gas stream 230, cooling gas, electrode, flows through the openings 32c. One opening, or more than two openings, is/are however also possible. The openings 32d and 32c are in this case arranged radially with respect to the longitudinal axis L. An offset of the openings 32d with respect to the radial is also possible in order to enable the partial gas stream 210 to rotate in the space 53 between the electrode 30, the front gas-conducting unit 70 and the nozzle 50. This improves the cooling action and the cutting quality. Likewise, an offset of the openings 32c with respect to the radial is also possible in order to enable the partial gas stream 230 to rotate in the space 73 between the electrode 30 and the front gas-conducting unit 70 and the rear gas-conducting unit 80. This in turn improves the cooling action.

In the plasma torch 10 that is shown, the total gas stream 200 is conducted through an opening 21 in the torch body 20 through the interior space 91 of a cooling tube 90 into the interior space 32 of an electrode 30. Said total gas stream impinges on the front, closed end 33 of the electrode 30, in which the emission insert 31 is also situated. This portion, at which the heat is generated by the arc (plasma jet) which makes contact with the emission insert, is thus cooled in an effective manner. The third partial gas stream 230 flows outward through the openings 32c through the wall 30a, and the first partial gas stream 210 flows outward through the openings 32d through the electrode wall 30a. The second partial gas stream 220 that remains in the cavity of the electrode flows back in the space 94 formed by the outer surface 93 of the cooling tube 90 and the inner surface 36 of the electrode 30, and is conducted through openings or grooves or channel 22 in the plasma torch body 20 firstly in a radially outward direction with respect to the longitudinal axis L and then through openings 84 of the rear gas-conducting unit 80 in the direction of the nozzle 50 and nozzle protection cap 60.

The second partial gas stream 220, that is to say in this case the cooling gas for the nozzle 50 and the nozzle protection cap 60, flows through openings or grooves 56 of the nozzle holder 55 before flowing into the space 63 between the nozzle 50 and the nozzle protection cap 60 and then out of the nozzle protection cap opening 61 and the further openings 64 of the nozzle protection cap 60.

As already described above, the third partial gas stream 230, that is to say in this case the cooling gas for the electrode 30, flows through the openings 32c of the electrode into the space 73 formed by the central, second portion 37b of the outer surface 37 of the electrode 30, by the front gas-conducting unit 70 and by the rear gas-conducting unit 80, and flows through said space. The third partial gas stream 230 thus flows around the second, central portion 37b of the outer surface 37 of the electrode 30. In the vicinity of the rear, open end 34 of the electrode 30, the third partial gas stream 230 is conducted radially outward through openings 85 of the gas-conducting unit 80 and the openings 57 of the nozzle holder 55.

As already described above, the first partial gas stream 210, that is to say in this case the plasma gas, flows through the openings 32d of the electrode before flowing into the space 53 between the nozzle 50 and the electrode 30 and ultimately out of the nozzle bore 51. The first partial gas stream 210 flows around the front, first portion 37a of the outer surface 37 of the electrode 30.

Since the second partial gas stream 220 cools the inner surface 36 and the third partial gas stream 230 cools the outer surface 37b of the electrode 30 and the first partial gas stream 210 cools the outer surface 37a of the electrode 30, the service life of the electrode 30 is considerably lengthened as a result of the improvement in the cooling action.

It is thus additionally possible to achieve good cutting quality over a longer period of time.

FIG. 13a shows the electrode 30 which is used in the plasma torch 10, wherein the upper image is a perspective illustration and the lower left-hand image is a sectional illustration (longitudinal section) and the lower right-hand images are the sections through the planes A-A and B-B. The electrode 30 differs from that described in FIG. 2a by the openings 32c which extend, radially with respect to the longitudinal axis L, between the inner surface 36 and the outer surface 37 through the electrode wall 30a in the central, second portion 37b and by the openings 32d which extend, radially with respect to the longitudinal axis L, likewise between the inner surface 36 and the outer surface 37 through the electrode wall 30a in the front, first portion 37a. Gas can flow outward through said openings from the cavity 32 of the electrode 30.

In the installed state in the plasma torch 10, it is sought to attain as high a flow speed as possible for the third partial gas stream 230 through the openings 32c and for the first partial gas stream 210 through the openings 32d during the cutting process. For this purpose, in the presence of a flowing gas (total gas stream), a relatively small pressure drop on the flow path in the interior space 91 of the cooling tube 90 between the rear end 96 and the front end 95 of the cooling tube 90 and a relatively large pressure drop on the flow path of the openings 32c between the internal cavity 32 of the electrode 30 and the space 73 between the electrode 30 and the gas-conducting units 70 and 80 and also a likewise relatively large pressure drop on the flow path of the openings 32d between the internal cavity 32 of the electrode 30 and the space 53 between the electrode 30, the nozzle 50 and the gas-conducting unit 70 are necessary. In the presence of flowing first and third partial gas streams 210 and 230, the difference between the pressure p1 in the internal cavity 32 and the pressure p2 in the space 73 and between the pressure p1 in the internal cavity 32 and the pressure p3 in the space 53, in each case in the immediate vicinity of the one or more openings 32c and 32d, advantageously amounts to at least 0.5 bar, but more preferably 1 bar.

This is achieved by virtue of the area A91, arising from the diameter D91 radially with respect to the longitudinal axis L, of the interior space 91 of the cooling tube 90 being larger than the sum of areas A32c and A32d arising from the diameter D32c, radially with respect to the central axis/axes M, of the openings 32c and also from the diameter D32d, radially with respect to the central axis/axes M, of the openings 32d. The high flow speed improves in particular the cooling action in the openings 32c and also at the surfaces of the downstream space 73 through which the third partial gas stream 230 flows, and also the cooling action in the openings 32d and also at the surfaces of the downstream space 53 through which the first partial gas stream 210 flows.

The diameter D91 of the cavity 91 of the cooling tube 90 in this case amounts to for example 3 mm, and the diameter D32c of the two openings 32c in this case amounts to 1.0 mm. Using $PI/4*D^2$, this yields, for the cavity 91, an area A91, formed radially with respect to the longitudinal axis L, of approximately 7 mm$^2$ and, for a bore 32c and a bore 32d, an area A32c, A32d, formed radially with respect to the central axis M of the bore 32c, 32c of approximately 0.8 mm$^2$. Two bores 32c thus yield approximately 1.6 mm$^2$, two bores 32d thus yield approximately 1.6 mm$^2$. In this example, the ratio between the area A91 and the sum of the two areas A32c amounts to approximately 2.2.

FIG. 13b shows the front gas-conducting unit 70 of the plasma torch from FIGS. 13 to 17, wherein the upper image shows a perspective and the lower left-hand image shows the longitudinal section. The front gas-conducting unit 70 differs from that described in FIG. 2c in that it has neither openings 72 for the third partial gas stream 230 (cooling gas, electrode) nor openings 71 for the first partial gas stream 210 (plasma gas).

Figure 13C:
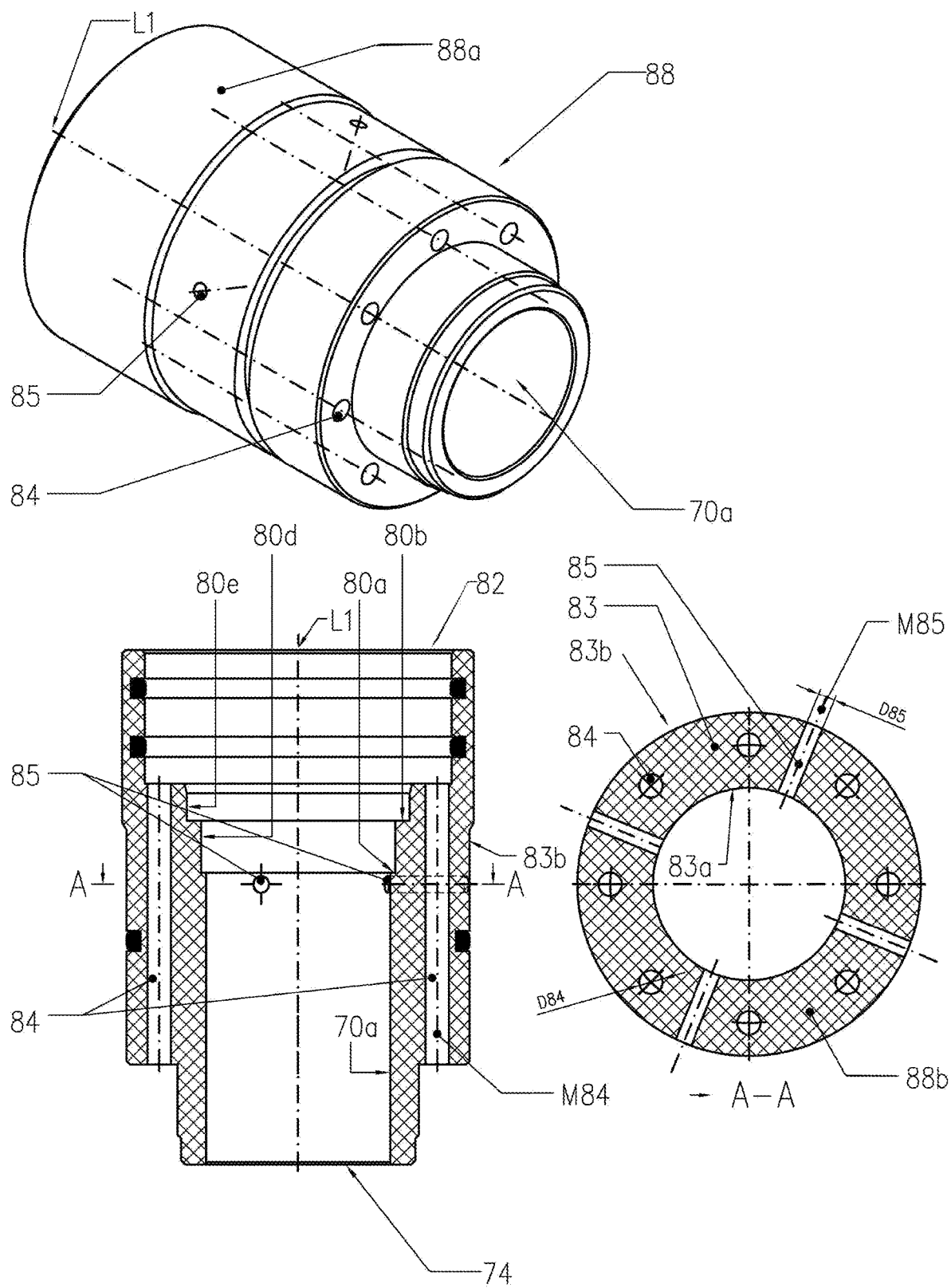
FIG. 13c shows a single-part gas-conducting unit for the plasma torch of FIG. 13.

It is also possible for the gas-conducting units 70 and 80 shown in FIGS. 2b and 13b to be produced from one part. FIG. 13c shows such a single-part gas-conducting unit 88, which has the features of said gas-conducting units 70 and 80.

Figure 14:
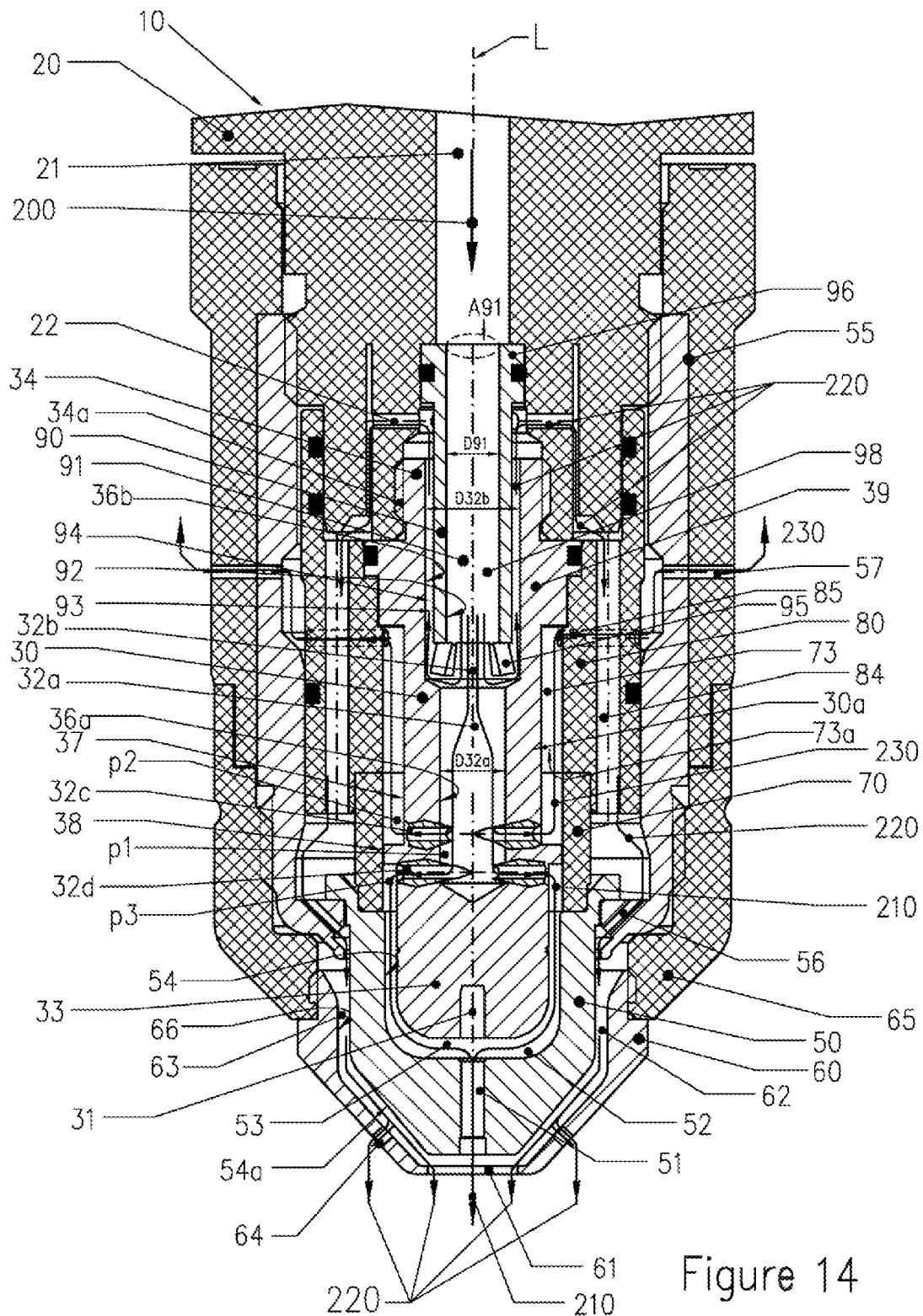
FIG. 14 is a sectional diagram of a plasma torch according to a further particular embodiment of the present invention.

FIG. 14 shows, by way of example, a similar system to FIG. 13. Here, the cavity 32 of the electrode 30 is composed of two cavities, the front cavity 32a and the rear cavity 32b, which differ in terms of their diameter D32a and D32b. The rear cavity 32b has a larger diameter than the front cavity 32a. Further cavities with different diameters are also possible. The cooling tube 90 projects in with its front end 95 as far as into the vicinity of or as far as the transition, from the rear cavity 32b to the front cavity 32a, and may be supported there in order that it cannot slip any further forward.

By means of this arrangement, the thickness of the electrode wall 30a in the region of the front cavity 32a is larger than that of the rear cavity 32b, and can more effectively dissipate heat from the front, closed end 33 of the electrode 30 in the direction of the rear, closed end 34.

Figure 14A:
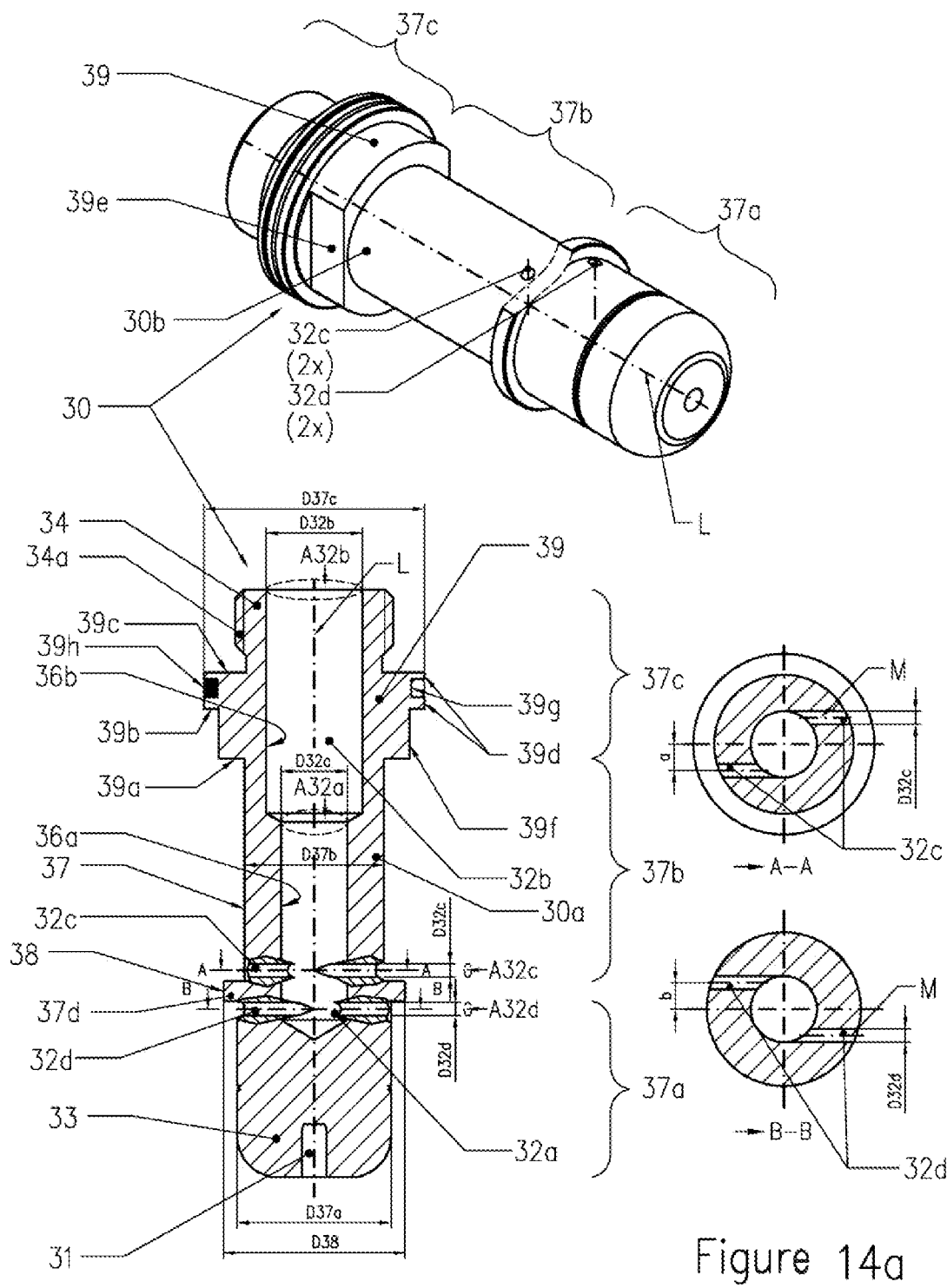
FIG. 14a shows an electrode of the plasma torch from FIG. 14.

FIG. 14a shows the electrode 30 which is used in the plasma torch 10 of FIG. 14, wherein the upper image is a perspective illustration and the lower left-hand image is a sectional illustration (longitudinal section) and the lower right-hand images are the sections through the planes A-A and B-B. It differs from the electrode in FIG. 13a by the cavity 32, in this case composed of two cavities, the front cavity 32a and the rear cavity 32b, which differ in terms of their diameter D32a and D32b. The rear cavity 32b has a larger diameter than the front cavity 32a. Furthermore, the openings 32d in the first, front portion 37a are, as illustrated in the section B-B, arranged so as to be offset with respect to the radial to the longitudinal axis L by the dimension b. Gas can flow outward through said openings from the cavity 32a of the electrode 30. Thus, the first partial gas stream 210 flowing through the openings is, in the installed state, set in rotation in the space 53 between the electrode 30, the front gas-conducting unit 70 and the nozzle 50.

Likewise, the openings 32c in the second, central portion 37b are, as illustrated in the section A-A, arranged so as to be offset with respect to the radial to the longitudinal axis L by the dimension a. Gas can flow outward through said openings from the cavity 32a of the electrode 30. Thus, in the installed state, the partial gas stream 230 flowing through the openings is set in rotation in the space 73 and cools the surface of the portion 37b of the electrode 30 more effectively. This improves the cooling action and the cutting quality.

The offset a with respect to the radial to the longitudinal axis L of the bores 32c for the third partial gas stream 230 and the offset b of the bores 32d for the first partial gas stream 210 are mutually opposite, such that the first and third partial gas streams rotate oppositely to one another when the electrode 30 is installed in the plasma torch 10. In this way, the influence of the first and third partial gas streams 210 and 230 on one another is reduced, which has a positive effect on the cutting quality and the cooling.

In the installed state in the plasma torch 10, it is sought to attain as high a flow speed as possible for the third partial gas stream 230 through the openings 32c and for the first partial gas stream 210 through the openings 32d during the cutting process. For this purpose, in the presence of a flowing gas, a relatively small pressure drop on the flow path in the interior space 91 of the cooling tube 90 between the rear end 96 and the front end 95 of the cooling tube 90 and a relatively large pressure drop on the flow path of the openings 32c between the internal cavity 32 of the electrode 30 and the space 73 between the electrode 30 and the gas-conducting units 70 and 80 and also a likewise relatively large pressure drop on the flow path of the openings 32d between the internal cavity 32 of the electrode 30 and the space 53 between the electrode 30, the nozzle 50 and the front gas-conducting unit 70 are necessary. In the presence of flowing first and third partial gas streams 210 and 230, the difference between the pressure p1 in the internal cavity 32 and the pressure p2 in the space 73 and between the pressure p1 in the internal cavity 32 and the pressure p3 in the space 53, in each case in the immediate vicinity of the one or more openings 32c and 32d, advantageously amounts to at least 0.5 bar, but more preferably 1 bar.

This is achieved by virtue of the area A91, arising from the diameter D91 radially with respect to the longitudinal axis L, of the interior space 91 of the cooling tube 90 being larger than the sum of areas A32c and A32d arising from the diameter D32c, radially with respect to the central axis/axes M, of the openings 32c and also from the diameter D32d, radially with respect to the central axis/axes M, of the openings 32d. The high flow speed improves in particular the cooling action in the openings 32c and also at the surfaces of the downstream space 73 through which the third partial gas stream 230 flows, and also the cooling action in the openings 32d and also at the surfaces of the downstream space 53 through which the first partial gas stream 210 flows.

Since the diameter D91 of the interior space 91 of the cooling tube 90 is smaller than the diameter D32a of the front cavity 32a of the electrode 30, the area A91 has a greater influence than the area A32a in determining the pressure drop.

The diameter D91 of the cavity 91 of the cooling tube 90 in this case amounts to for example 3 mm, and the diameter D32c of the two openings 32c and the diameter D32d of the openings 32d in this case amount to 1.0 mm. Using $PI/4*D^2$, this yields, for the cavity 91, an area A91, formed radially with respect to the longitudinal axis L, of approximately 7 mm² and, for a bore 32c and a bore 32d, an area A32c, A32d, formed radially with respect to the central axis M of the bores 32c, 32d, of approximately 0.8 mm². Two bores 32c thus yield approximately 1.6 mm², two bores 32d thus yield approximately 1.6 mm², and 3.2 mm² in total. In this example, the ratio between the area A91 and the sum of the two areas A32c amounts to approximately 2.2.

Figure 15:
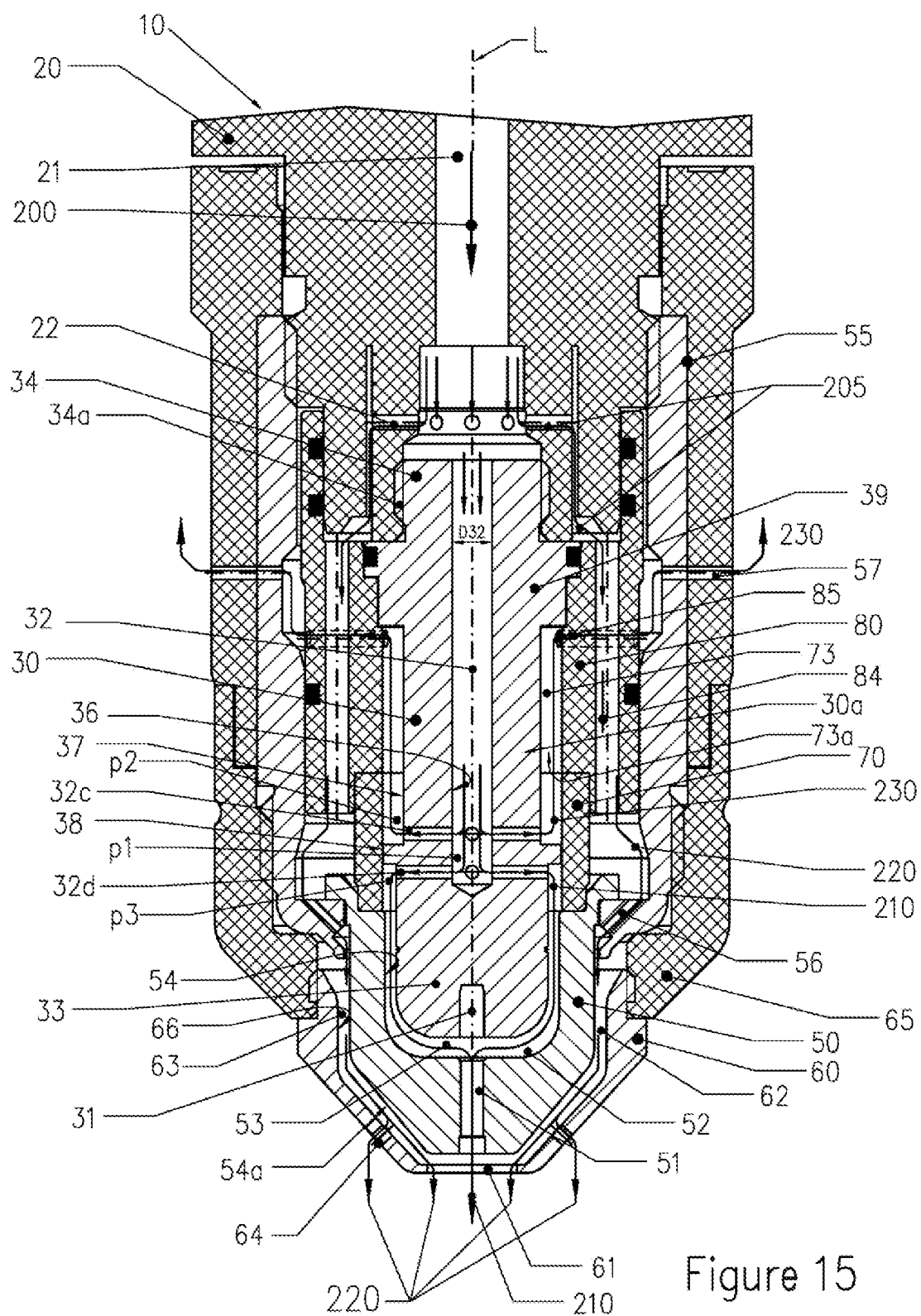
FIG. 15 is a sectional diagram of a plasma torch according to a further particular embodiment of the present invention.

FIG. 15 shows a similar system to FIG. 13, but without a cooling tube. The cavity 32 of the electrode 30 has a smaller diameter D32 than that in FIG. 13. By means of this arrangement, the thickness of the electrode wall 30a is larger, and can more effectively dissipate the heat from the front end 33 of the electrode 30 in the direction of the rear end 34.

The total gas stream 200 flows through the opening 21 in the plasma torch body firstly in the direction of the cavity 32 of the electrode 30, but will in all likelihood not flow in its entirety through the entire cavity 32 because, upstream of the rear end 34 of the electrode 30, a partial gas stream 205 flows through the openings 22 of the torch body and, by contrast to FIGS. 13 and 14, no conducting through a cooling tube occurs. At least the sum of the first and third partial gas streams 210 (plasma gas) and 230 (cooling gas, electrode) flows through the cavity 32. Subsequently, as already discussed in FIG. 14, the third partial gas stream 230 flows through the openings 32c, and the first partial gas stream 210 flows through the openings 32d.

Since both the sum of the first and third partial gas streams 210 and 230 cools the inner surface 36 and the third partial gas stream 230 cools the outer surface 37b of the electrode 30, the service life of the electrode 30 is considerably lengthened as a result of the improvement in the cooling action.

Figure 15A:
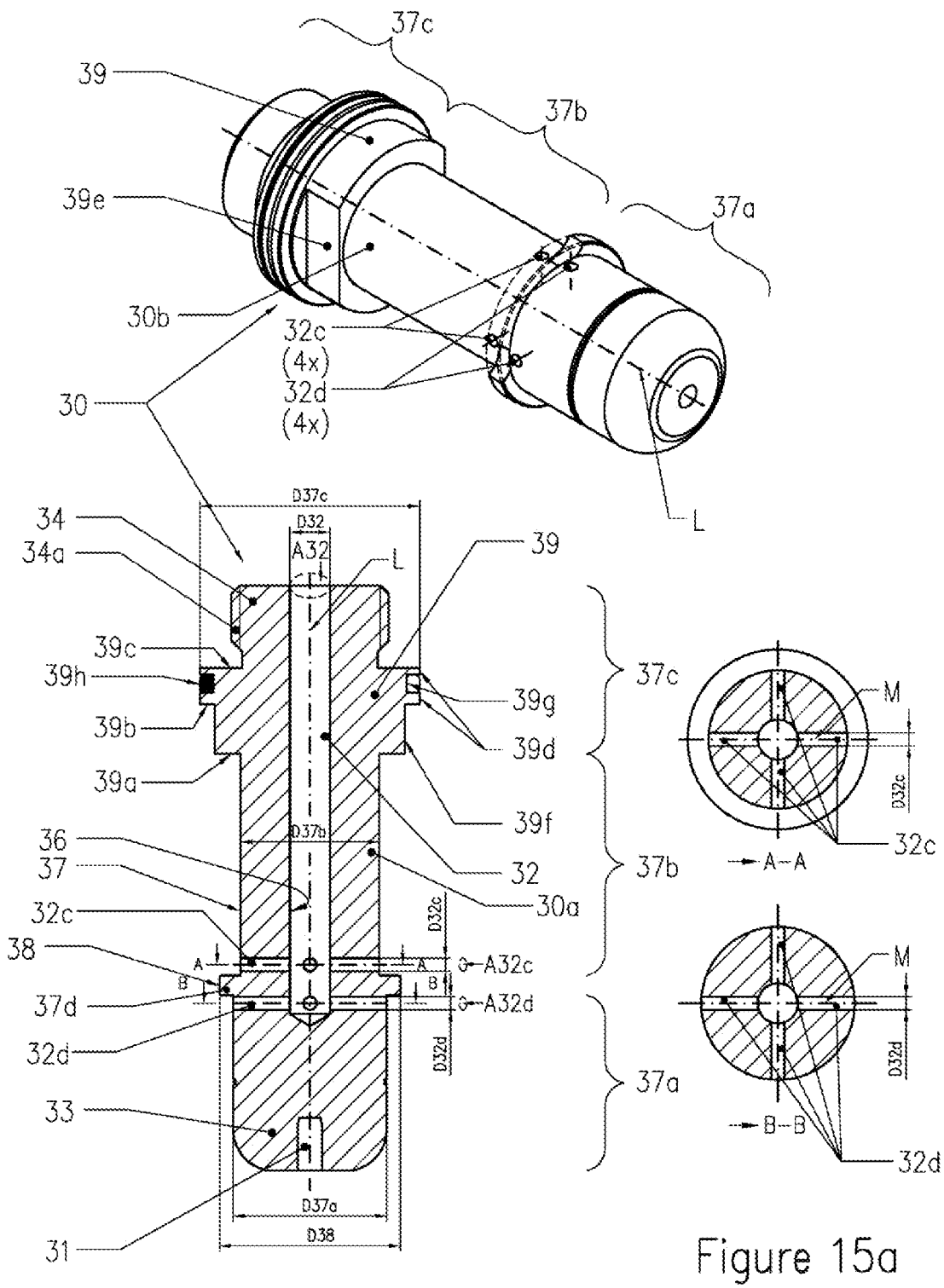
FIG. 15a shows an electrode of the plasma torch from FIG. 15.

FIG. 15a shows the electrode used in the plasma torch 10 of FIG. 15. It differs from that shown in FIG. 13a by the relatively small diameter D32 of the cavity 32 and the number of openings 32c and 32d, in each case four here by way of example.

In the installed state in the plasma torch 10, it is sought to attain as high a flow speed as possible for the third partial gas stream 230 through the openings 32c and for the first partial gas stream 210 through the openings 32d during the cutting process. For this purpose, in the presence of a flowing gas, a relatively small pressure drop on the flow path in the cavity 32 of the electrode 30 between the rear, open end 34 and the front, closed end 33 of the electrode 30 and a relatively large pressure drop on the flow path of the openings 32c between the internal cavity 32 of the electrode 30 and the space 73 between the electrode 30 and the gas-conducting units 70 and 80 and also a likewise relatively large pressure drop on the flow path of the openings 32d between the internal cavity 32 of the electrode 30 and the space 53 between the electrode 30, the nozzle 50 and the gas-conducting unit 70 are necessary. In the presence of flowing first and third partial gas streams 210 and 230, the difference between the pressure p1 in the internal cavity 32 and the pressure p2 in the space 73 and between the pressure p1 in the internal cavity 32 and the pressure p3 in the space 53, in each case in the immediate vicinity of the one or more openings 32c and 32d, advantageously amounts to at least 0.5 bar, but more preferably 1 bar.

This is achieved by virtue of the area A32, arising from the diameter D32 radially with respect to the longitudinal axis L, of the cavity 32 of the electrode 30 being larger than the sum of areas A32c and A32d arising from the diameter D32c, radially with respect to the central axis/axes M, of the openings 32c and also from the diameter D32d, radially with respect to the central axis/axes M, of the openings 32d. The high flow speed improves in particular the cooling action in the openings 32c and also at the surfaces of the downstream space 73 through which the third partial gas stream 230 flows, and also the cooling action in the openings 32d and also at the surfaces of the downstream space 53 through which the first partial gas stream 210 flows.

The diameter D32 of the interior space 32 of the electrode 30 in this case amounts to for example 2.5 mm, and the diameter D32c of the four openings 32c and the diameter D32d of the four openings 32d in this case amount to 0.6 mm. Using $PI/4*D^2$, this yields, for the cavity 32, an area A32, formed radially with respect to the longitudinal axis L, of approximately 5 mm² and, for a bore 32c and a bore 32d, an area A32c, A32d, formed radially with respect to the central axis M of the bore 32c, 32d, of approximately 0.3 mm². Four bores 32c thus yield approximately 1.2 mm², four bores 32*d* thus yield approximately 1.2 mm², that is to say 2.4 mm² in total. In this example, the ratio between the area A32 and the sum of the two areas A32*c* and A32*d* amounts to approximately 2.2.

Figure 16:
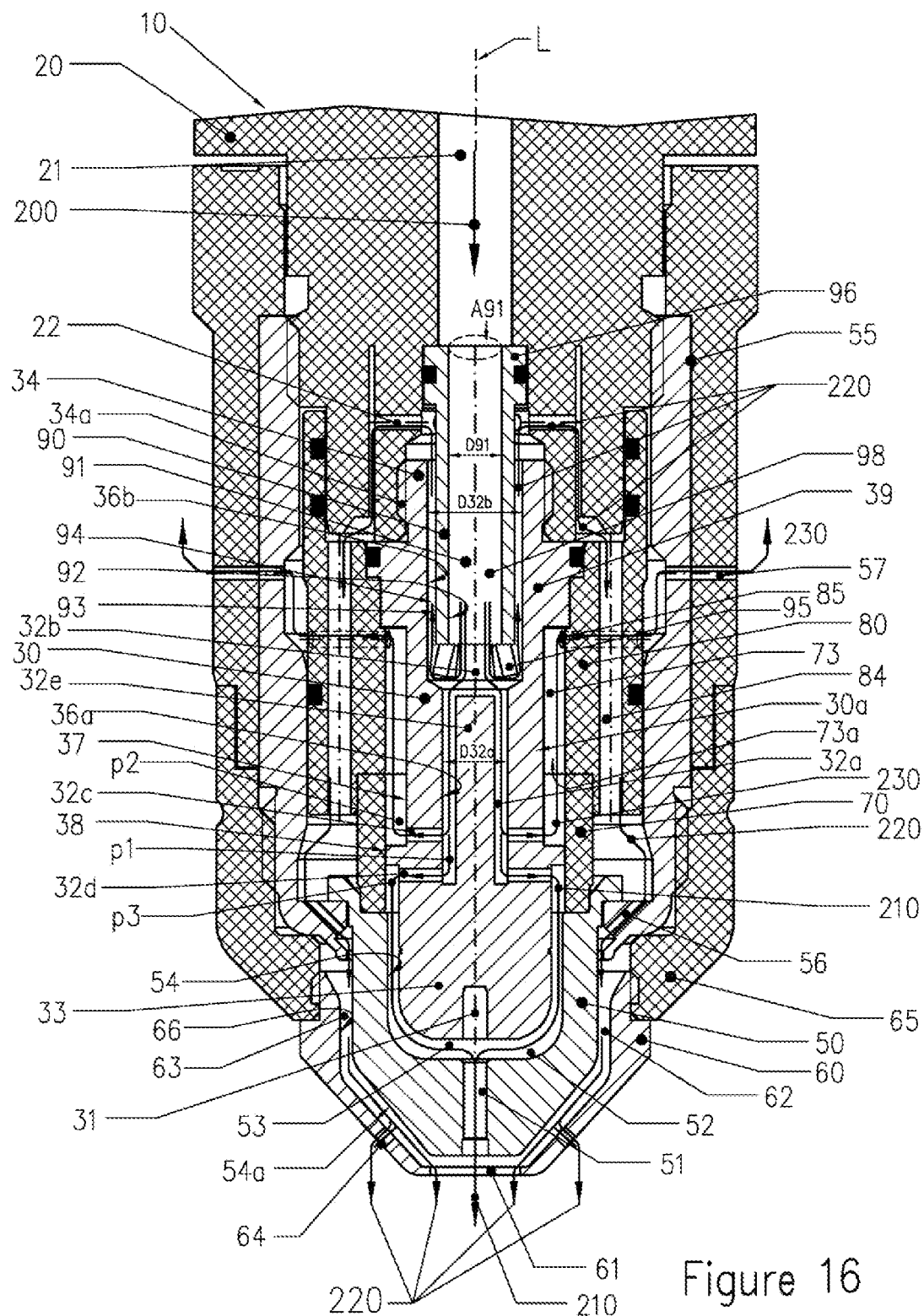
FIG. 16 is a sectional diagram of a plasma torch according to a further particular embodiment of the present invention.

FIG. 16 shows, by way of example, a similar system to FIG. 14. The cavity 32 is also in this case composed of two cavities, the front cavity 32*a* and the rear cavity 32*b*, which differ by the fact that a for example cylindrical, solid body 32*e* extends into the front cavity 32*a* proceeding from the front end 33 of the electrode 30 and is connected to the front end 33. This may, as shown in FIG. 16, be of single-part form, that is to say both are manufactured from one and the same part, or each is composed of a separate part and they are connected to one another by positive locking or non-positive locking or cohesion, in order that they are in physical contact with one another. For example, the cooling tube 90 may press the body 32*e* against the inner surface of the front end 33 (non-positive locking). The body 32*e* may for example also be welded to the front end 33 (cohesion). As viewed from the, open rear end 34, the cavity 32*a* has a circular annular appearance. Here, the diameters D32*a* and D32*b* are of different size. The rear cavity 32*b* has a diameter D32*b* larger than the diameter D32*a* of the front cavity 32*a*. Further cavities with different diameters are also possible. The cooling tube 90 projects in with its front end 95 as far as the transition from the rear cavity 32*b* to the front cavity 32*a*, and may be supported there in order that it cannot slip any further forward. It is also possible for the two diameters D32*a* and D32*b* to have the same size.

By means of this arrangement, the heat can be dissipated more effectively from the front, closed end 33 of the electrode 30 in the direction of the rear, open end 34 by means of the body 32*e* in addition to the wall 30*a* of the electrode 30. Furthermore, the sum of the first and third partial gas streams 210 and 230 flows both on the inner surface 36*a* of the front cavity 32*a* of the electrode 30 and on the outer surface of the body 32*e* and thus dissipates the heat more effectively. Additionally, the second partial gas stream 220 also flows on the inner surface 36*b* of the rear cavity 32*b*, and thus cools the electrode. Furthermore, the third partial gas stream 230 flows along, and cools once again, outer surface of the second, central region 37*b* of the electrode 30.

Figure 16A:
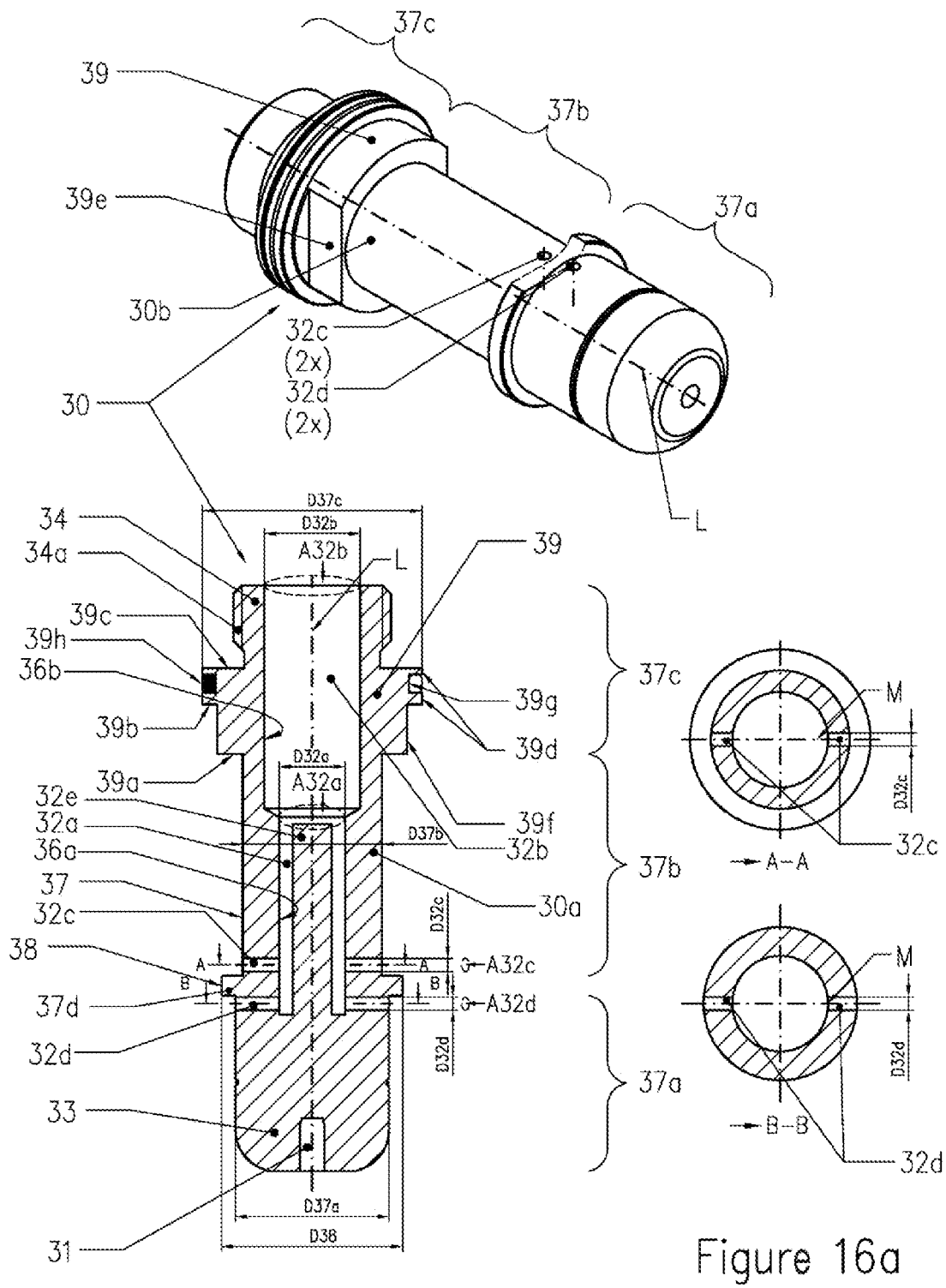
FIG. 16a shows an electrode of the plasma torch from FIG. 16.

FIG. 16*a* shows the electrode used in the plasma torch 10 of FIG. 16, similarly to FIG. 14*a*. The cavity 32 is also composed here of two cavities, the front cavity 32*a* and the rear cavity 32*b*, which differ by the fact that a for example cylindrical, solid body 32*e* extends into the front cavity 32*a* proceeding from the front end 33 of the electrode 30 and is connected to the front, closed end 33. Likewise, in each case two openings 32*c* and 32*d* are shown, but these in this case have no offset with respect to the radial to the longitudinal axis L.

Figure 17:
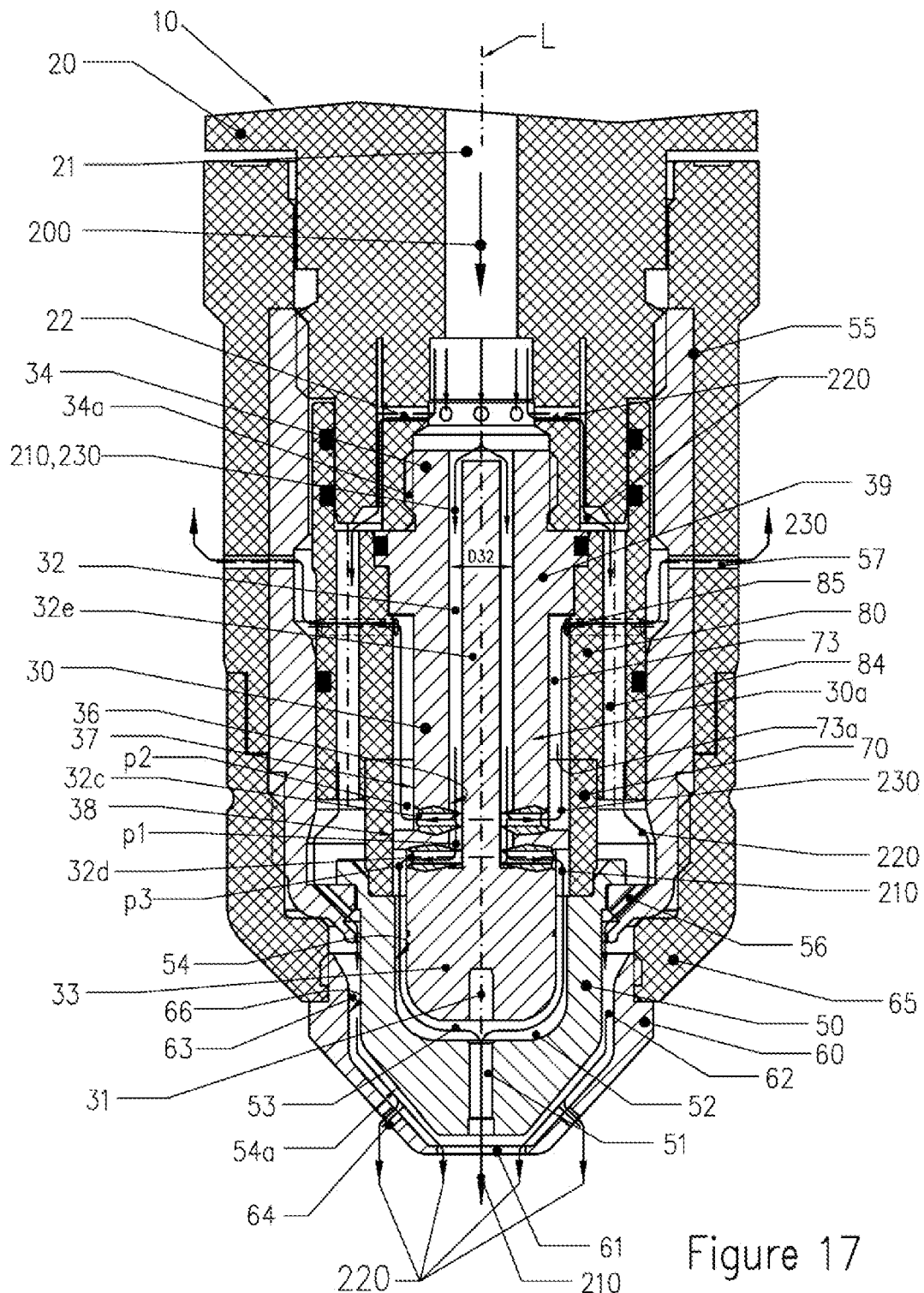
FIG. 17 is a sectional diagram of a plasma torch according to a further particular embodiment of the present invention.

FIG. 17 shows a similar system to FIG. 16, but without a cooling tube. In the cavity 32, a for example cylindrical, solid body 32*e* extends proceeding from the front, closed end 33 of the electrode 30, which body is connected to the rear, open end 34. The body 32*e* extends further in the direction of the rear, open end 34 than that in FIG. 16, and may extend as far as the rear, open end 34 or even extend beyond. In this way, the outer surface of the body 32*e* is enlarged yet further, and the heat is dissipated even more effectively by the sum of the first and third partial gas streams 210 and 230.

Figure 17A:
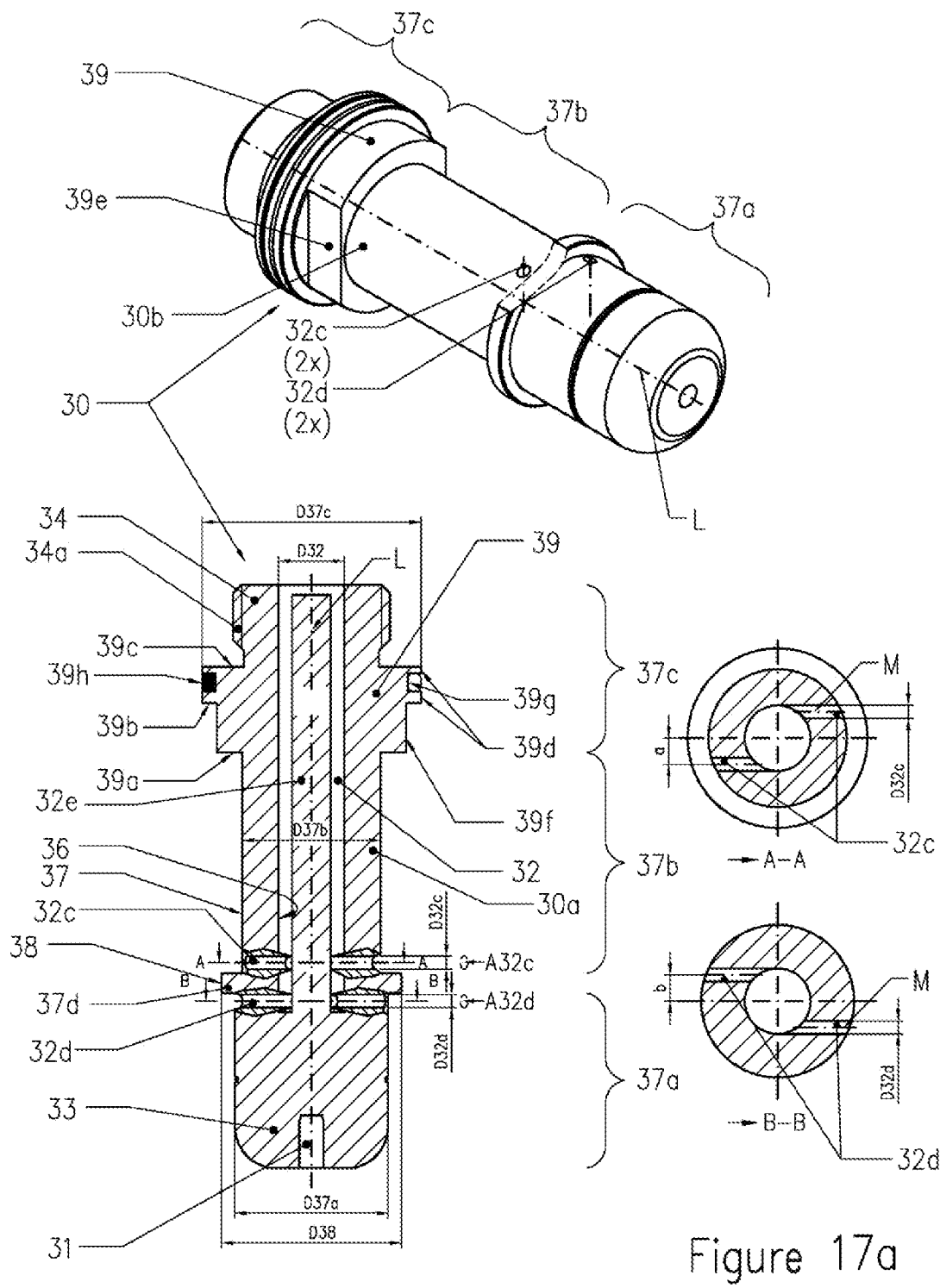
FIG. 17a shows an electrode of the plasma torch from FIG. 17.

FIG. 17*a* shows the electrode used in the plasma torch 10 of FIG. 17, similarly to FIG. 16*a*. In the cavity 32*e*, a for example cylindrical, solid body 32*e* extends proceeding from the front, closed end 33 of the electrode 30, which body is connected to the rear, open end 34. The body 32 extends further in the direction of the rear, open end 34 than that in FIG. 16*a*. It may extend as far as the rear, open end 34 or even beyond. Likewise, in each case two openings 32*c* and 32*d* are shown, but these in this case have an offset a and b respectively with respect to the radial to the longitudinal axis L. The effect of the offset has already been described in the context of FIG. 14*a*.

Figure 18:
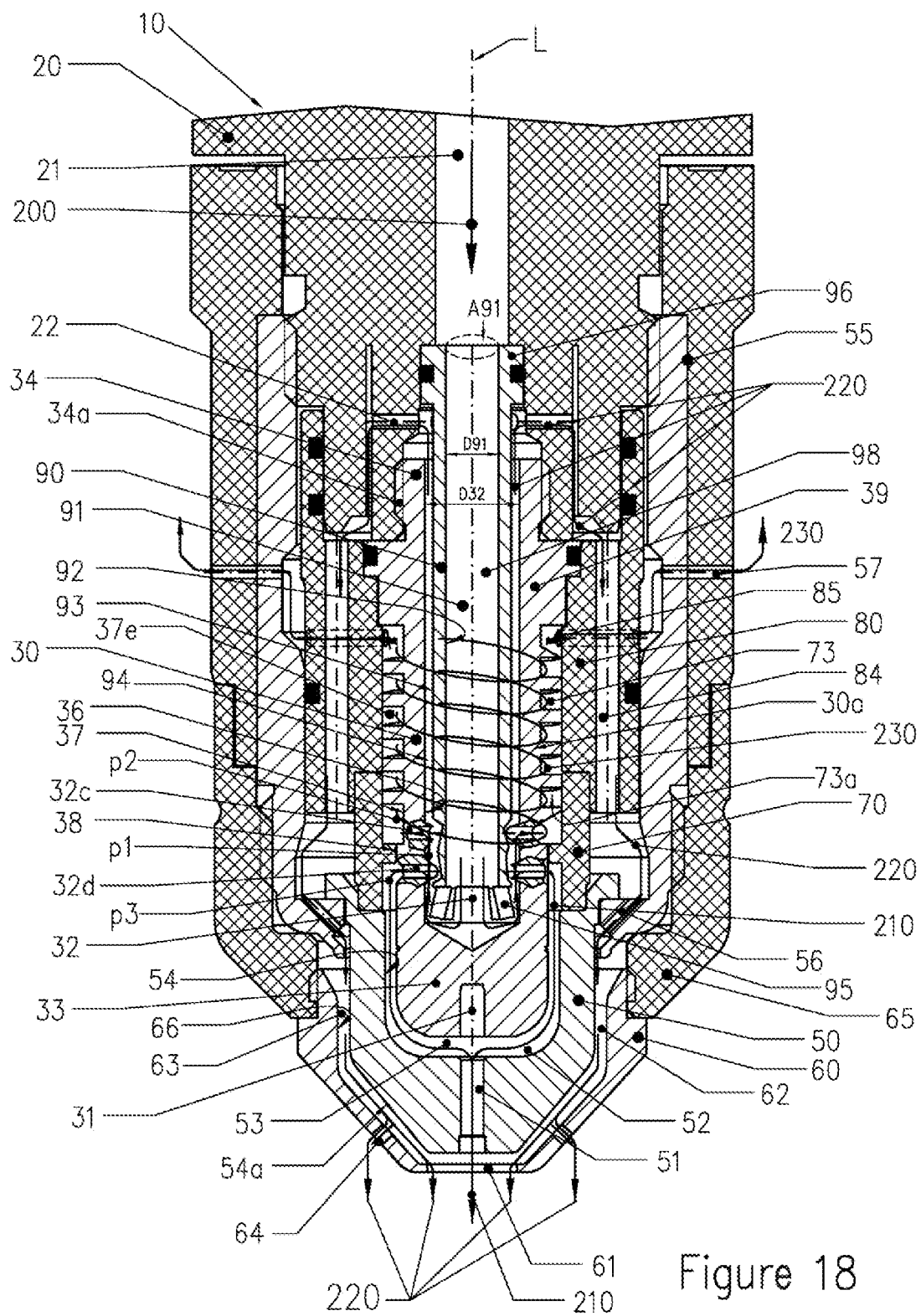
FIG. 18 is a sectional diagram of a plasma torch according to a further particular embodiment of the present invention.

FIG. 18 shows a further system similar to FIG. 13. To improve the cooling action, the central, second portion 37*b* of the outer surface 37 has been designed such that the third partial gas stream 230 is conducted through a spiral-shaped groove 37*e* and thus remains in contact with the surface of the central, second portion 37*b* for longer, and the cooling is thus further improved. The arrangement of two or more spiral-shaped grooves running parallel is also possible.

Furthermore, by contrast to FIG. 13, the electrode 30 has no projection 37*d* on the outer surface 37 between the front, first portion 37*a* and the central, second portion 37*b* of the outer surface 37 of the electrode 30. Here, the centering surface 38 is a constituent part of the front, first portion 37*a*.

Figure 18A:
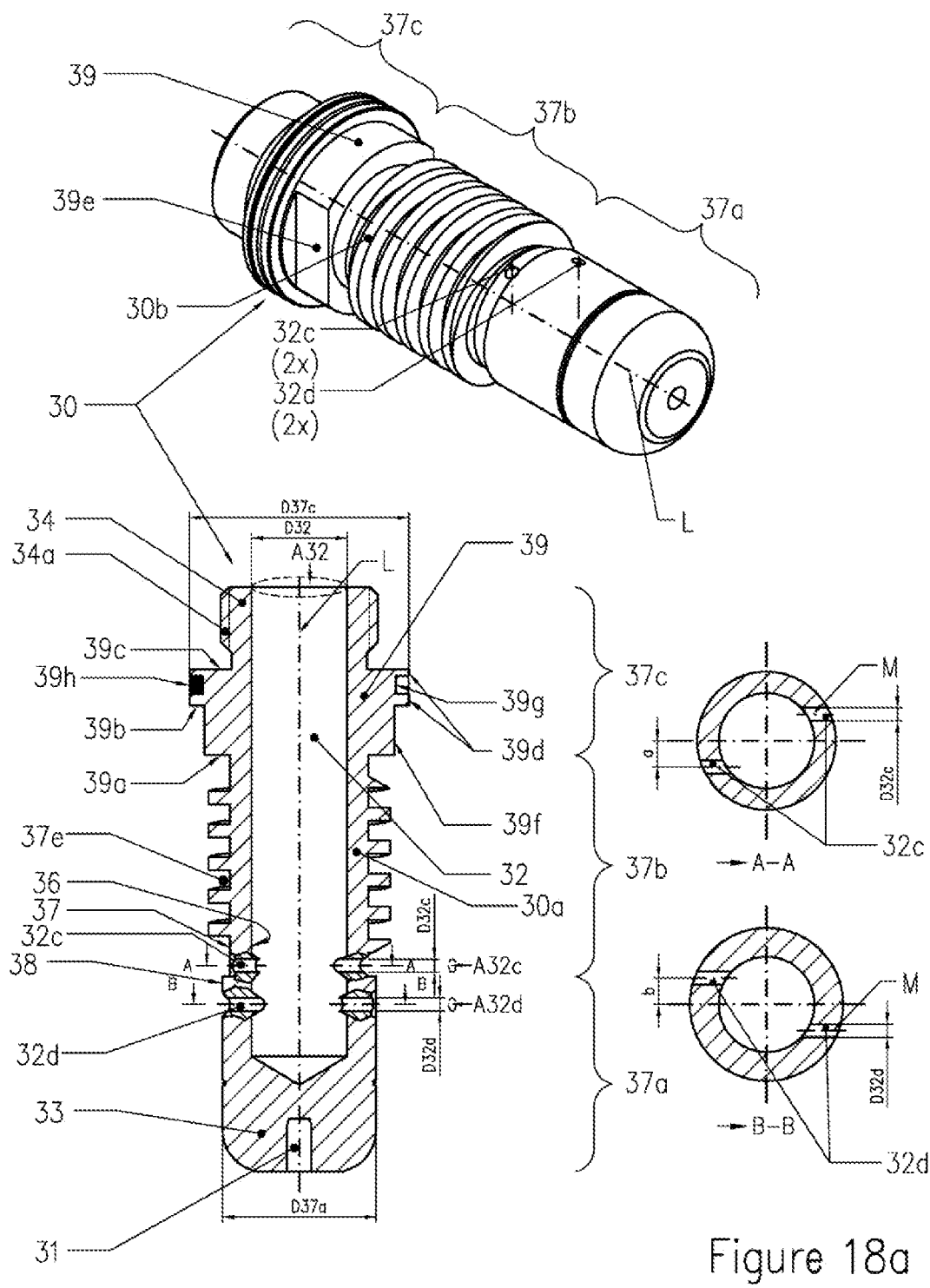
FIG. 18a shows an electrode of the plasma torch from FIG. 18.

FIG. 18*a* shows the electrode 30 used in the plasma torch 10 of FIG. 18, which is similar to the electrode in FIG. 13*a*. The upper image shows a perspective, the lower left-hand image shows a sectional illustration (longitudinal section) and the lower right-hand images show the sections through the planes A-A and B-B.

Furthermore, the openings 32*d* in the front, first portion 37*a* are, as illustrated in the section B-B, arranged so as to be offset with respect to the radial to the longitudinal axis L by the dimension b. Gas can flow outward through said openings from the cavity 32 of the electrode 30. Thus, the first partial gas stream 210 flowing through the openings is, in the installed state, set in rotation in the space 53 between the electrode 30, the front gas-conducting unit 70 and the nozzle 50.

Furthermore, the openings 32*c* in the central, second portion 37*b* are, as illustrated in the section A-A, arranged so as to be offset with respect to the radial to the longitudinal axis L by the dimension a. Gas can flow outward through said openings from the cavity 32 of the electrode 30. Thus, the third partial gas stream 230 flowing through the openings is, in the installed state, set in rotation in the space 73 between the electrode 30, the front gas-conducting unit 70 and the rear gas-conducting unit 80.

The offset a with respect to the radial to the longitudinal axis L of the bores 32*c* for the third partial gas stream 230 and the offset b with respect to the radial to the longitudinal axis L of the bores 32*d* for the first partial gas stream 210 are mutually opposite, such that the first and third partial gas streams rotate oppositely to one another. In this way, the influence of the first and third partial gas streams 210 and 230 on one another is reduced, which has a positive effect on the cutting quality and the cooling.

The statements made with regard to FIG. 13*a* apply for the diameters D91, D32*c* and D32*d*, the resulting areas A91, A32*c* and A32*d* and the pressures p1, p2 and p3.

Figure 18B:
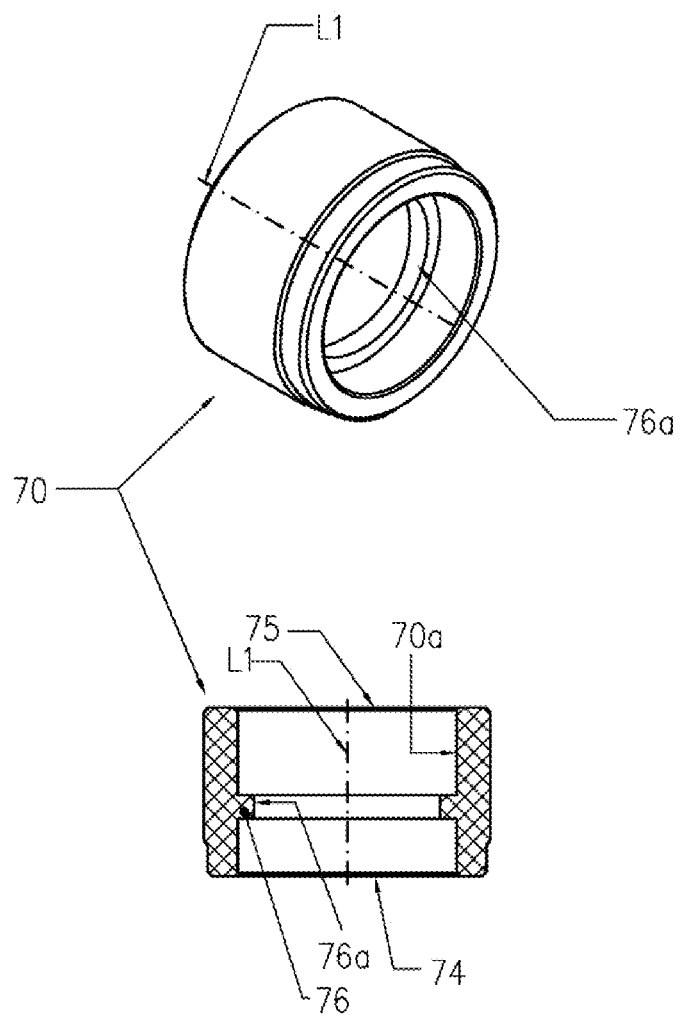
FIG. 18b shows a front gas-conducting unit of the plasma torch from FIG. 18.

FIG. 18*b* shows the front gas-conducting unit 70, wherein the upper image shows a perspective and the lower image shows the longitudinal section. Said front gas-conducting unit differs from the gas-conducting unit shown in FIG. 13*b* by the projection 76 which is present on the inner surface 70*a* and which has the inner surface 76*a*. In the installed state, said inner surface 76*a* faces the outer surface 38, which is a constituent part of the first, front portion 37*a* of the electrode 30. By means of these two centering surfaces, the gas-conducting unit 80 and the electrode 30 are aligned and centered relative to one another radially with respect to the longitudinal axis.

Figure 18C:
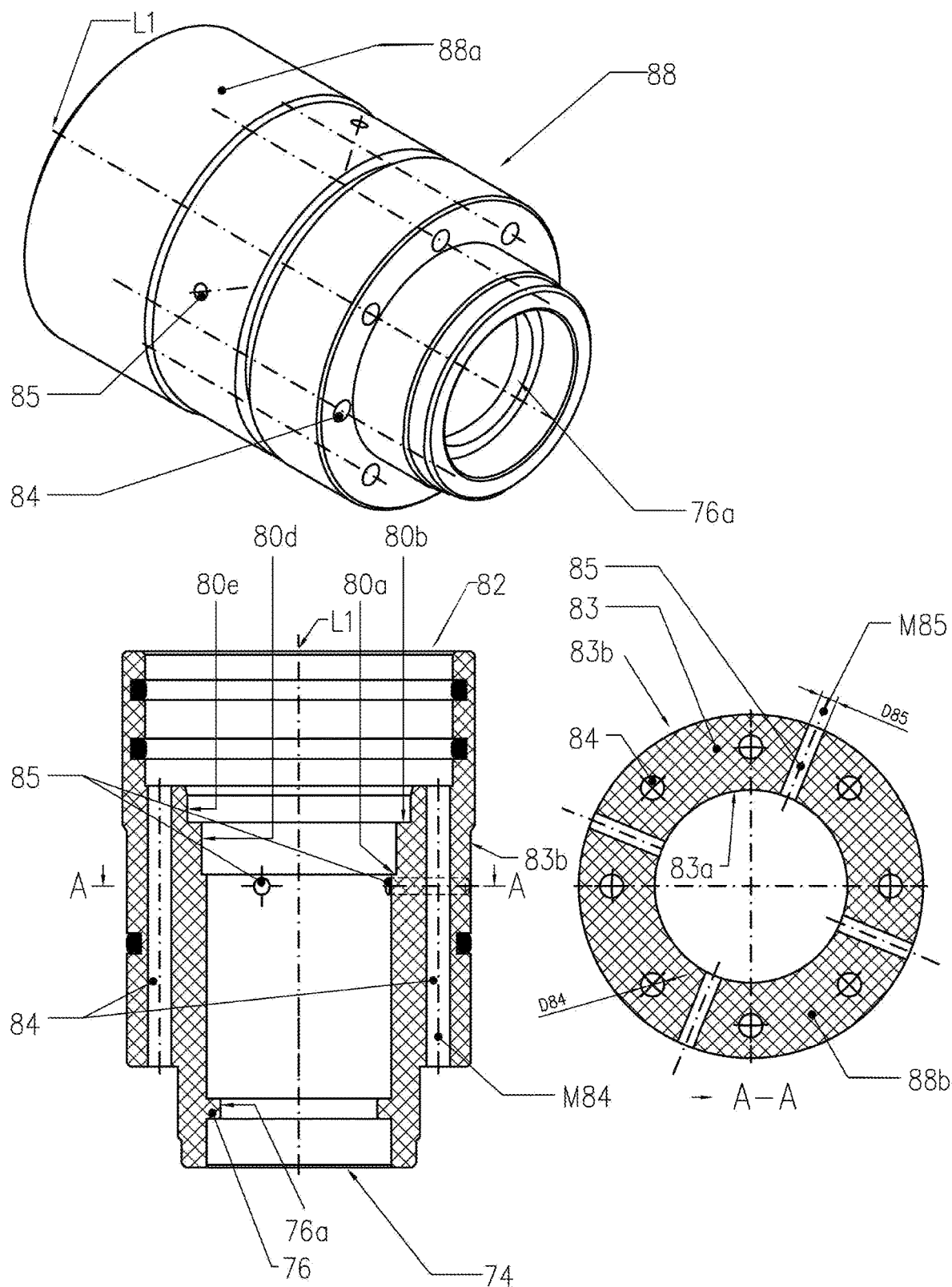
FIG. 18c shows a single-part gas-conducting unit for the plasma torch from FIG. 18.

It is also possible for the gas-conducting units 70 and 80 shown in FIGS. 2b and 18b to be produced from one part. FIG. 18c shows a single-part gas-conducting unit 88 of said type.

Figure 18D:
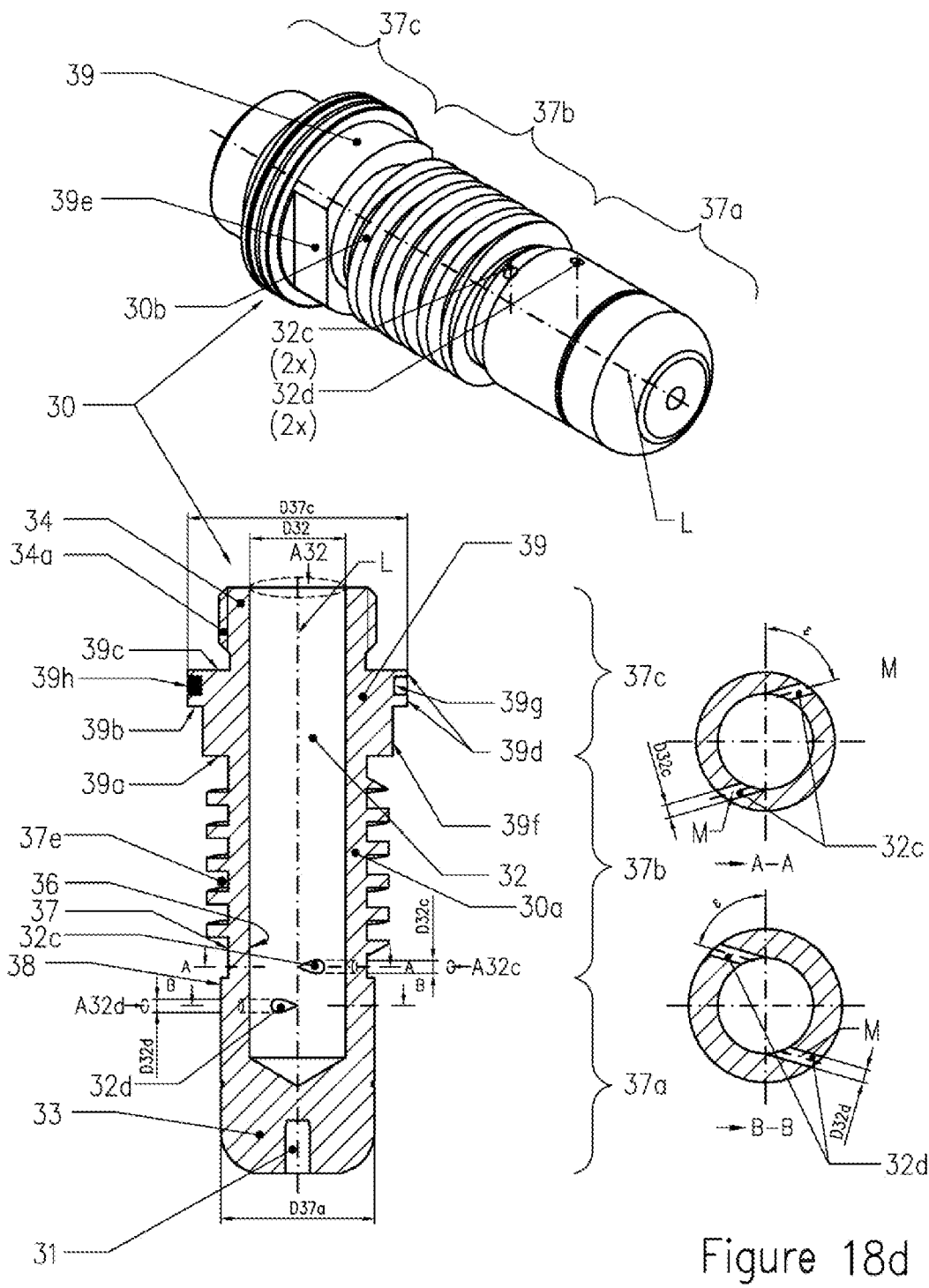

FIG. 18d shows an electrode 30 similar to the electrode in FIG. 18a. The upper image shows a perspective, the lower left-hand image shows a sectional illustration (longitudinal section) and the lower right-hand images show the sections through the planes A-A and B-B.

By contrast to FIG. 18a, the openings 32d in the front, first portion 37a are, as illustrated in the section B-B, arranged not so as to be offset by a but so as to be inclined by the angle ε with respect to the radial to the longitudinal axis L. Gas can flow outward through said openings from the cavity 32 of the electrode 30. Thus, the first partial gas stream 210 flowing through the openings is, in the installed state, set in rotation in the space 53 between the electrode 30, the front gas-conducting unit 70 and the nozzle 50.

By contrast to FIG. 18a, the openings 32c in the central, second portion 37b are, as illustrated in the section A-A, arranged not so as to be offset by a but so as to be inclined by the angle ε with respect to the radial to the longitudinal axis L. Gas can flow outward through said openings from the cavity 32 of the electrode 30. Thus, the third partial gas stream 230 flowing through the openings is, in the installed state, set in rotation in the space 73 between the electrode 30, the front gas-conducting unit 70 and the rear gas-conducting unit 80.

Figure 19:
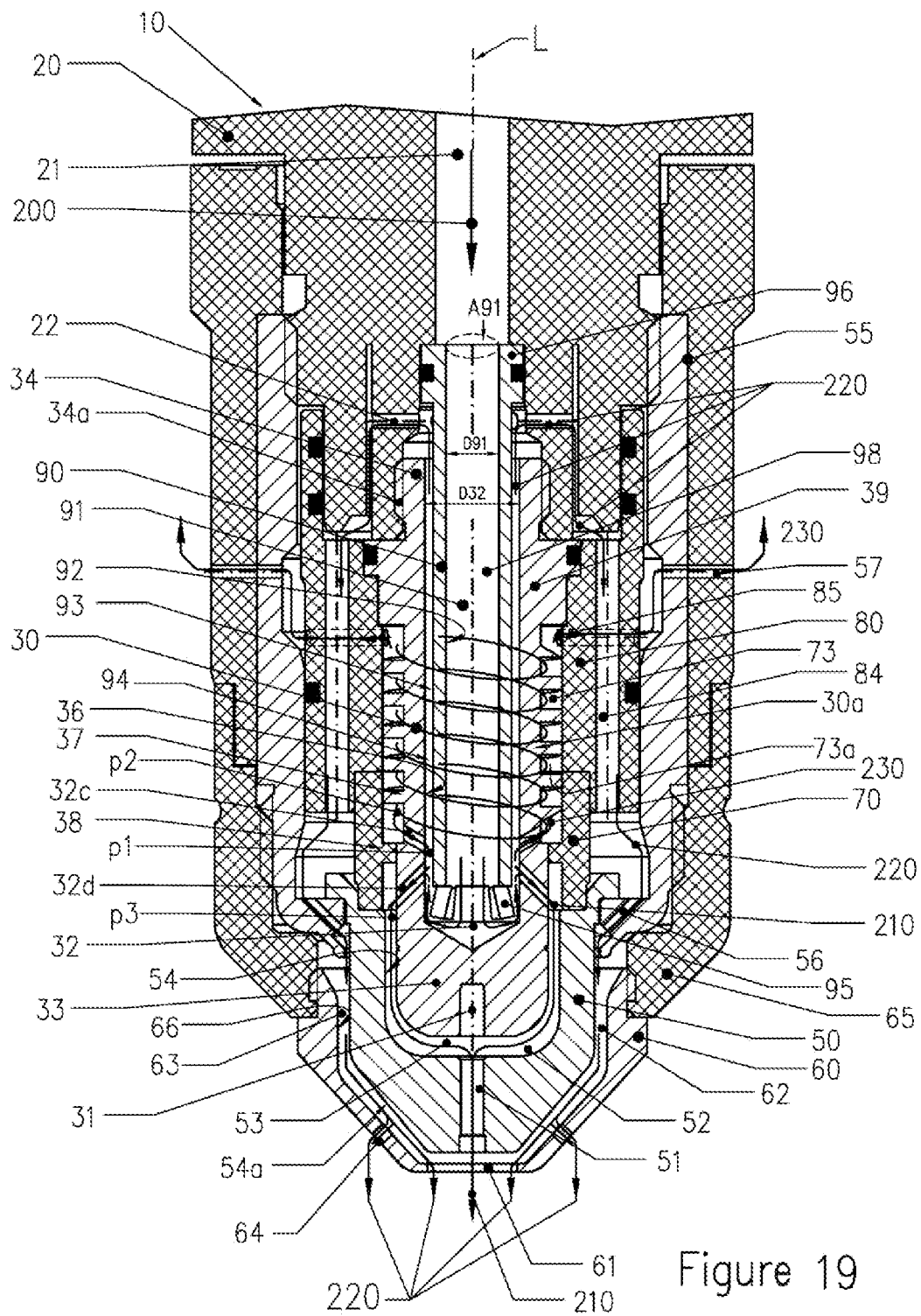
FIG. 19 is a sectional diagram of a plasma torch according to a further particular embodiment of the present invention.
Figure 19A:
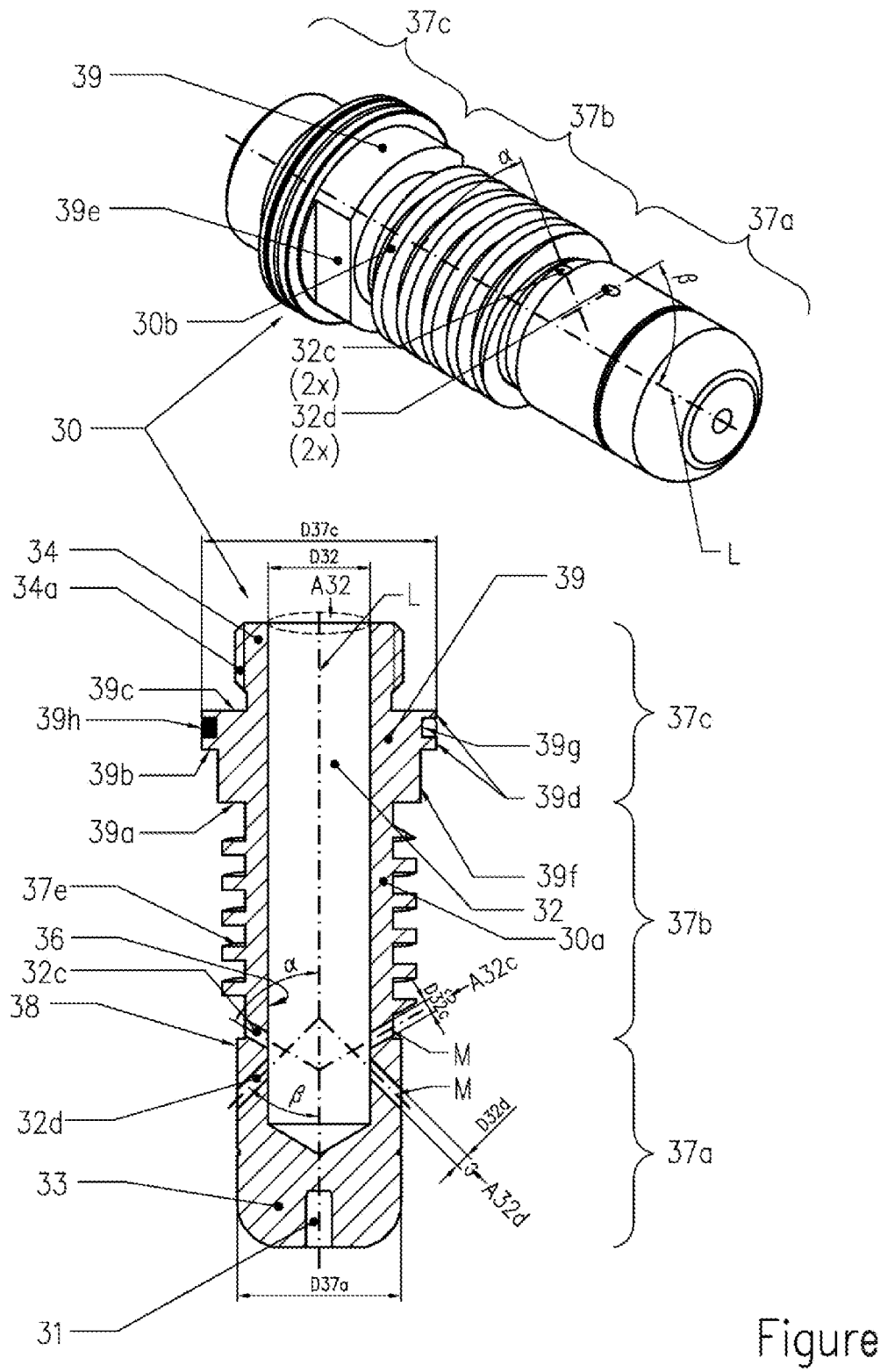
FIGS. 19a, 19b and 19c show further examples for embodiments of openings in the associated electrode in a perspective illustration and in longitudinal section and in some cases also in a side view.
Figure 19B:
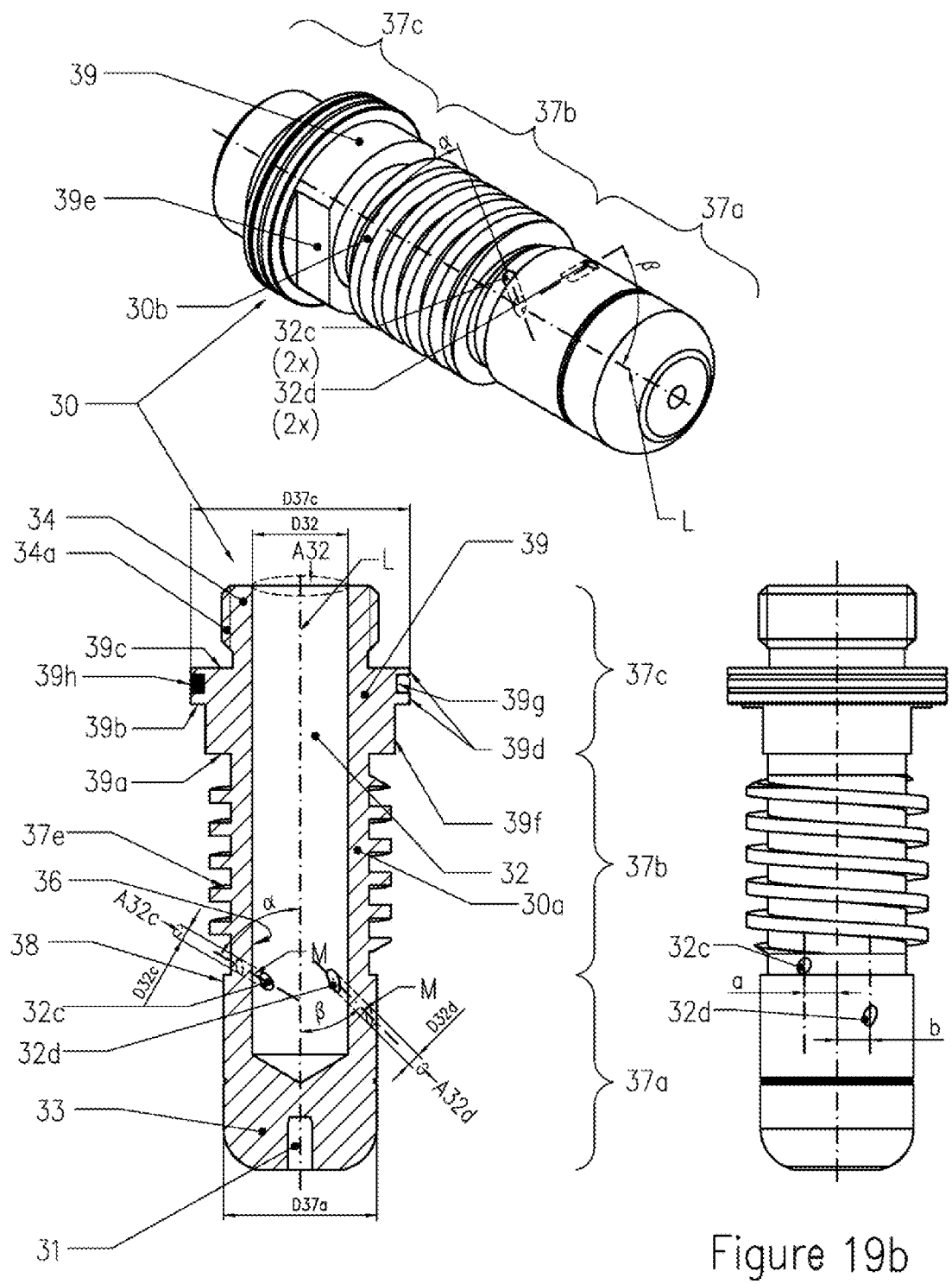
Figure 19C:
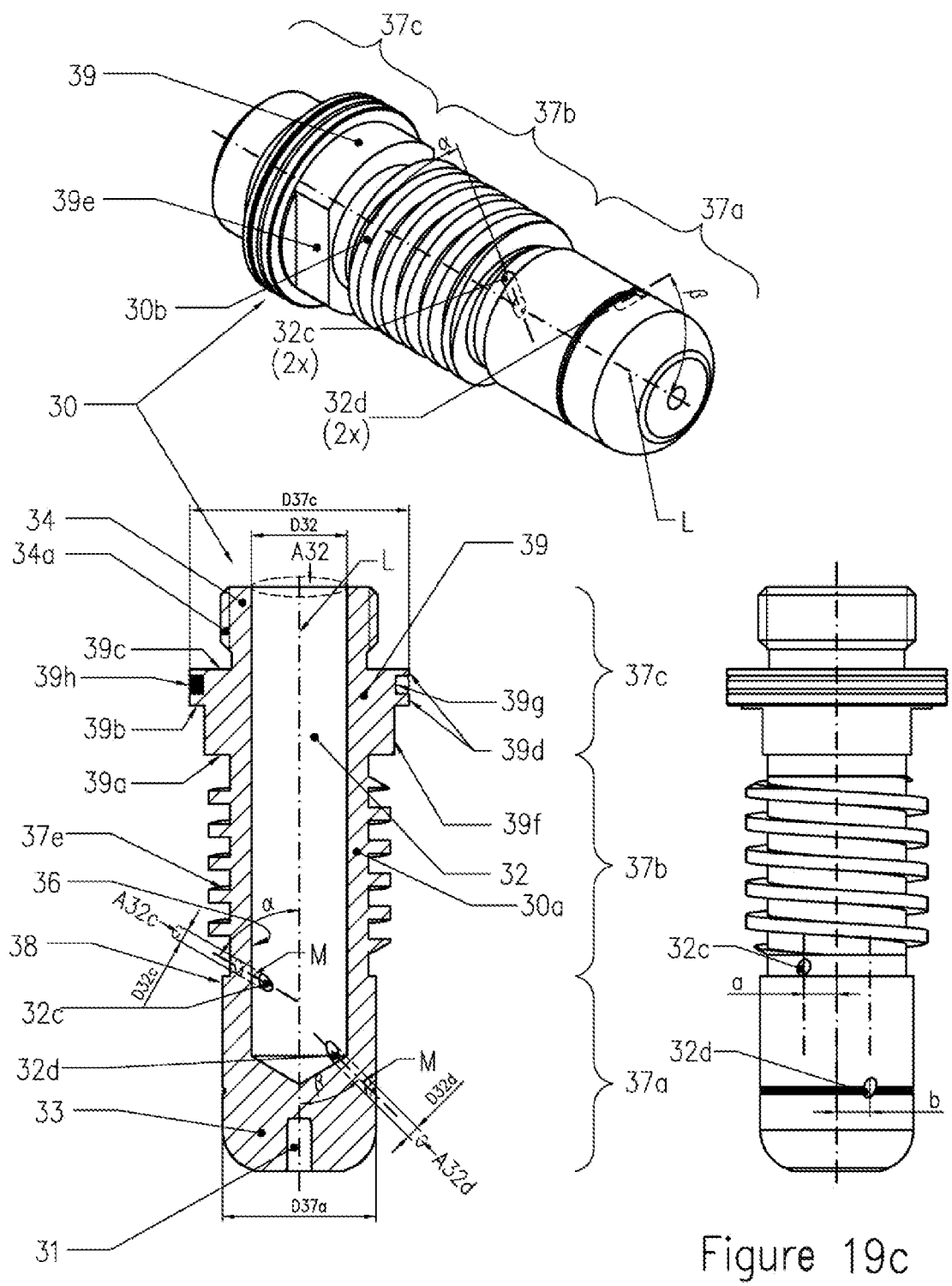

FIG. 19a shows a further plasma torch 10 in which the electrode 30 from FIG. 19a is used. FIGS. 19a, 19b and 19c show further examples of the embodiments of the openings 32c and 32d in the electrode 30.

FIG. 19a shows, at the top, a perspective illustration and, at the bottom, the longitudinal section of an electrode 30. The openings 32c have, between the longitudinal axis L and the central axis M of the openings 32c, an angle α which is open in the direction of the rear end 34. Said angle in this case amounts to 60° by way of example, and the expedient minimum amounts to 45°. It may however also have a greater angle up to 90°. In the installed state in the plasma torch, the third partial gas stream 230 is directed straight in the direction of the rear end of the electrode. The influence on the partial gas stream 210 is thus reduced.

The openings 32d have, between the longitudinal axis L and the central axis M of the openings 32d, an angle β which is open in the direction of the front end 33. Said angle in this case amounts to 45° by way of example, which simultaneously corresponds to its minimum. It may however also have a greater angle up to 90°. In the installed state in the plasma torch, the partial gas stream 210 is directed straight in the direction of the front end of the electrode. The influence on the partial gas stream 230 is thus reduced.

FIG. 19b shows a perspective illustration at the top, shows the longitudinal section at the bottom left, and shows the non-sectional side view of an electrode 30 at the bottom right. The openings 32c and 32d have, in addition to the angles α and β, an offset a and b with respect to the radial to the longitudinal axis L of the electrode. The first partial gas stream 210 and the third partial gas stream 230 are thus also set in rotation.

FIG. 19c shows a perspective illustration at the top, shows a longitudinal section at the bottom left, and shows a side view of an electrode 30 at the bottom right. The openings 32d form, with the longitudinal axis L, an angle β which is open in the direction of the front end 33, wherein the openings 32d run through the solid portion of the front, closed end 33.

Figure 20:
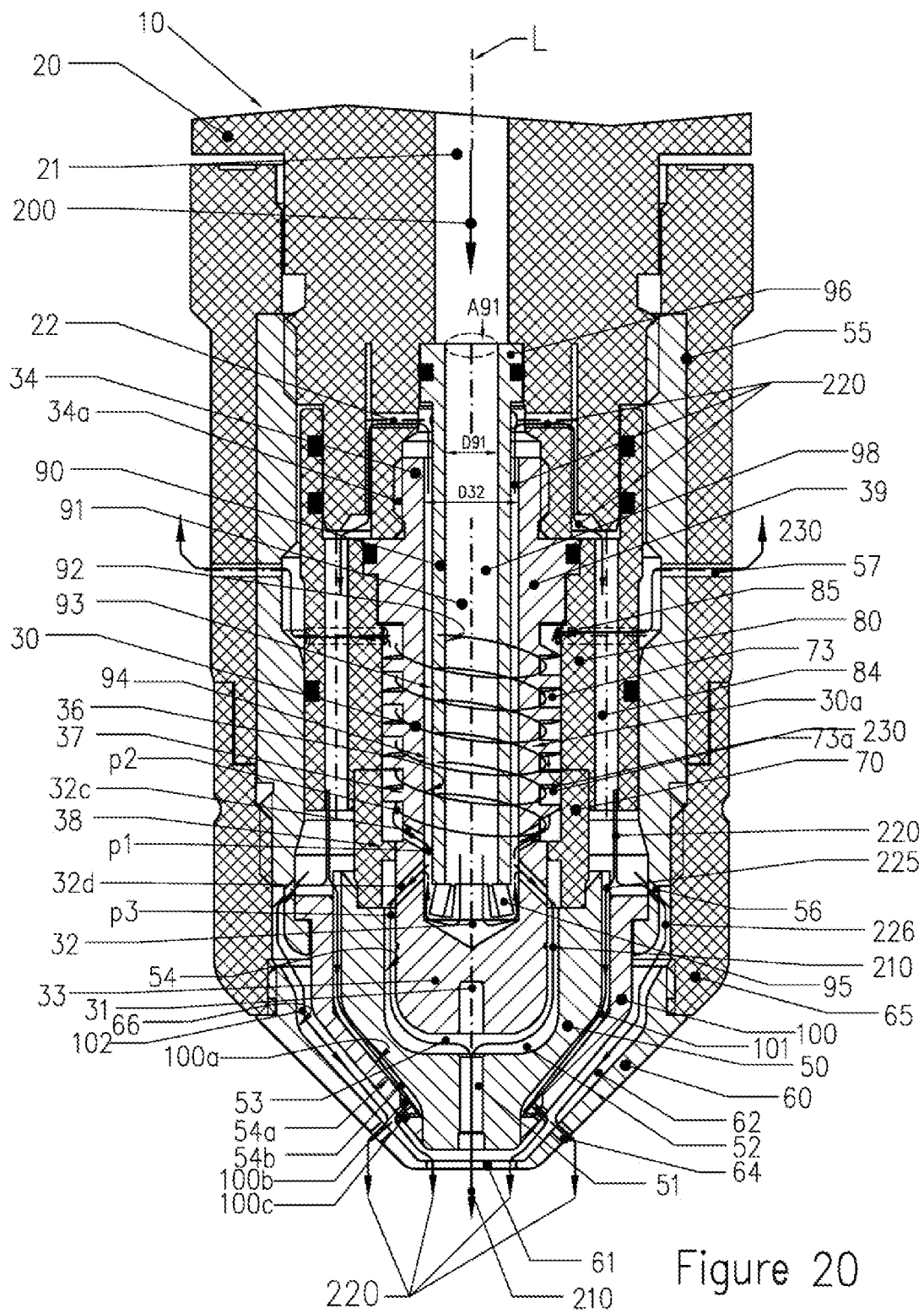
FIG. 20 is a sectional diagram of a plasma torch according to a further particular embodiment of the present invention.

The embodiment shown in FIG. 20 has a very large amount of similarity with the embodiment shown by way of example in FIG. 19. After exiting the openings 84 of the rear gas-conducting unit 80, the second partial gas stream 220 is divided into the partial gas streams 225 and 226. Also, between the nozzle 50 and the nozzle protection cap 60, there is provided a nozzle cap 100 which can improve the cooling of the nozzle from the outside. The partial gas stream 225 flows in the space 101 formed by the nozzle 50 and the nozzle cap 100. The cooling gas flows forward through grooves (longitudinal grooves) or cavities 54b arranged all the way around, for example similarly to the situation in an autogenous nozzle, and is collected in an encircling groove 100b and released outward via openings 100c and subsequently via the openings 64 and/or the opening 61 of the nozzle protection cap 60. The partial gas stream 226 flows in the space 102 formed by the nozzle cap 100 and the nozzle protection cap 60. Said partial gas stream cools the nozzle cap 100 and the nozzle protection cap 60 and is conducted outward to the outside via the openings 64 or the opening 61.

In the preceding figures, a further or alternative feature that is claimed both additionally and alternatively or separately has been merely schematically indicated in the figures but not discussed in the description. This will now be discussed in more detail with reference to FIGS. 21, 21a, 21b and 22, 22b and 22c. As can be seen in the figures, encircling "grooves" are provided on the outer surface 2 in the front region 33, in particular in the front third of the longitudinal extent of the electrode 30. Said grooves have the aim of improving the ignition of the pilot arc and/or ensuring that the pilot arc instigated by high-voltage ignition begins to form there. In particular, it is sought to prevent said pilot arc from igniting in the vicinity of the gas-conducting unit and the gas-conducting unit thus being damaged. It is furthermore thereby sought for less ignition energy to be required. The "grooves" may therefore also be referred to as an "ignition edge" and are expedient not only for gas-cooled plasma torches and electrodes but also for water-cooled or generally liquid-cooled plasma torches and electrodes.

Figure 21:
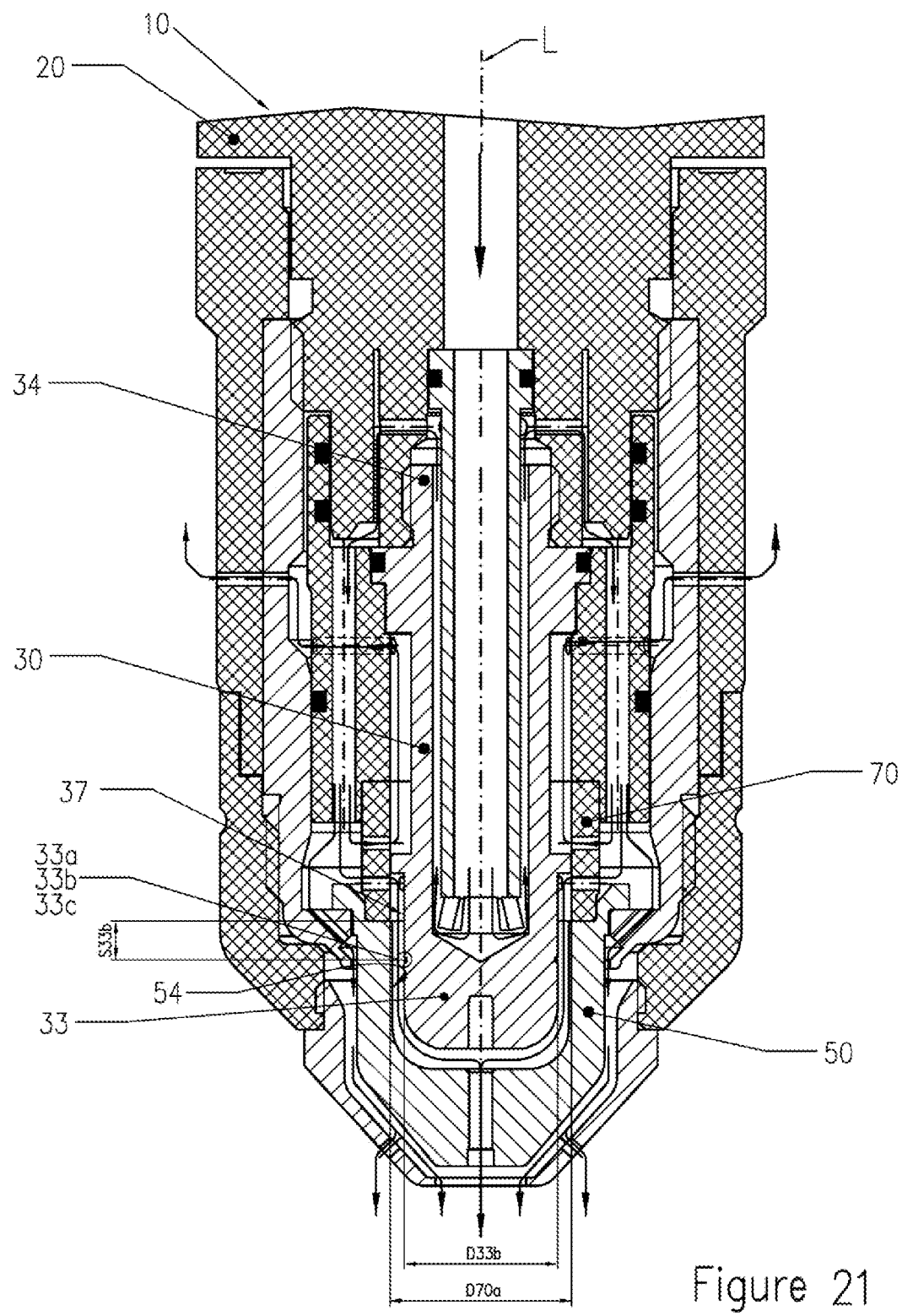
FIG. 21 is a sectional diagram of a plasma torch according to a further particular embodiment of the present invention.
Figure 21A:
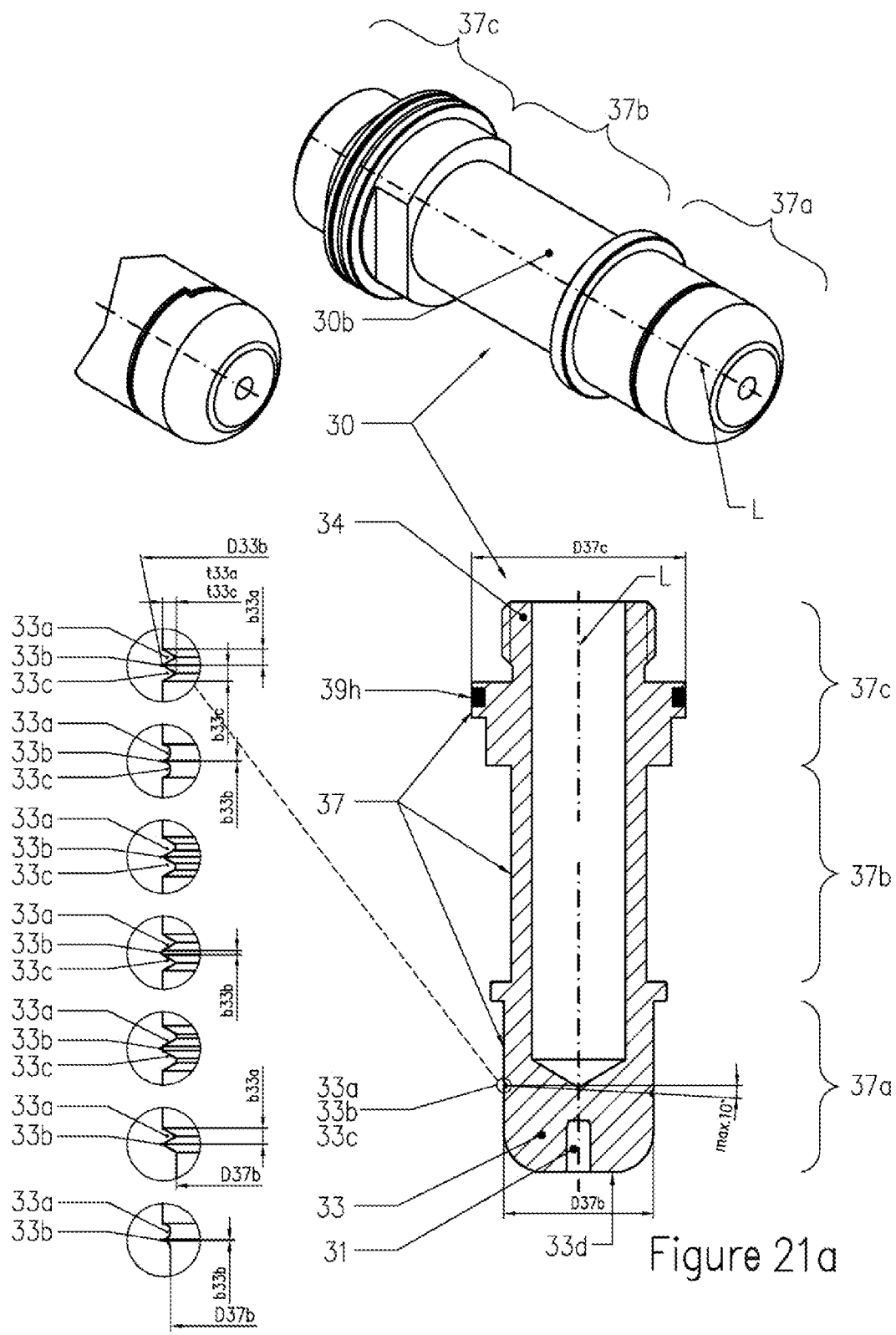
FIG. 21a shows an electrode of the plasma torch from FIG. 21 according to a particular embodiment.
Figure 21B:
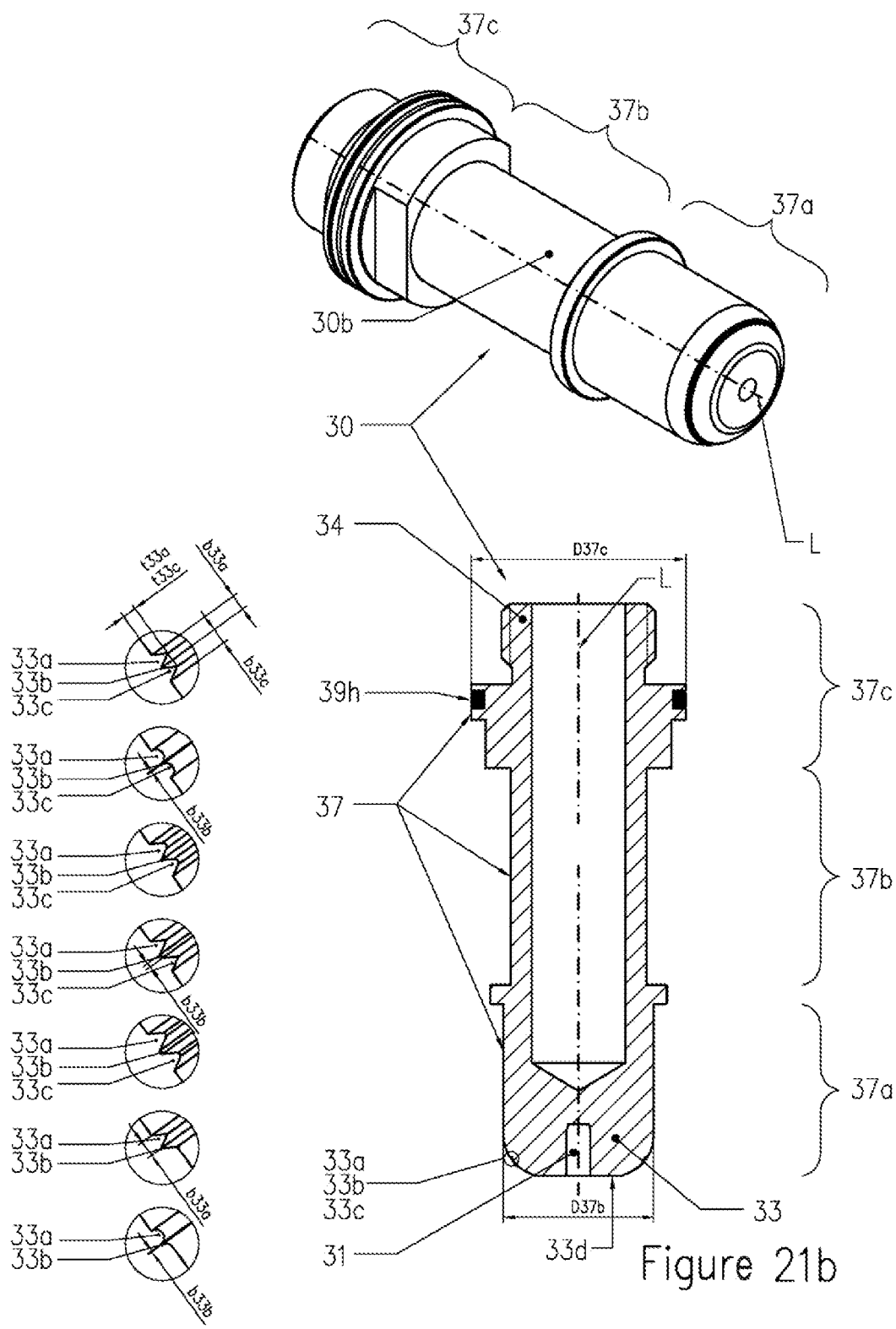
FIG. 21b shows an electrode of the plasma torch from FIG. 21 according to a further particular embodiment.

FIG. 21 shows the sectional image of a corresponding plasma torch 10 (corresponds substantially to FIG. 2), FIG. 21a show a possible design of the electrode 30 (corresponds substantially to FIG. 2a), and FIG. 21b show a possible design of the front gas-conducting unit 70 (corresponds substantially to FIG. 2c).

Examples of conceivable designs of the "grooves" are illustrated one below the other on the left in FIG. 21a. The "ignition edge" may comprise a sequence of depressions 33a, 33c and/or elevations 33b. The "ignition edge" is situated in this case at the level of the lowest point of the cavity 32 or 32b in the electrode 30. It may for example also be situated between the lowest point of the cavity 32, 32a and the emission insert 31. It furthermore lies at or in the space 53 by the nozzle 50 and the electrode 30.

FIG. 21b shows an electrode similar to FIG. 21a, but the "ignition edge" is situated further in the direction of the closed end 33 or of the front end surface 33d in the region which tapers to the closed end 33.

Figure 21C:
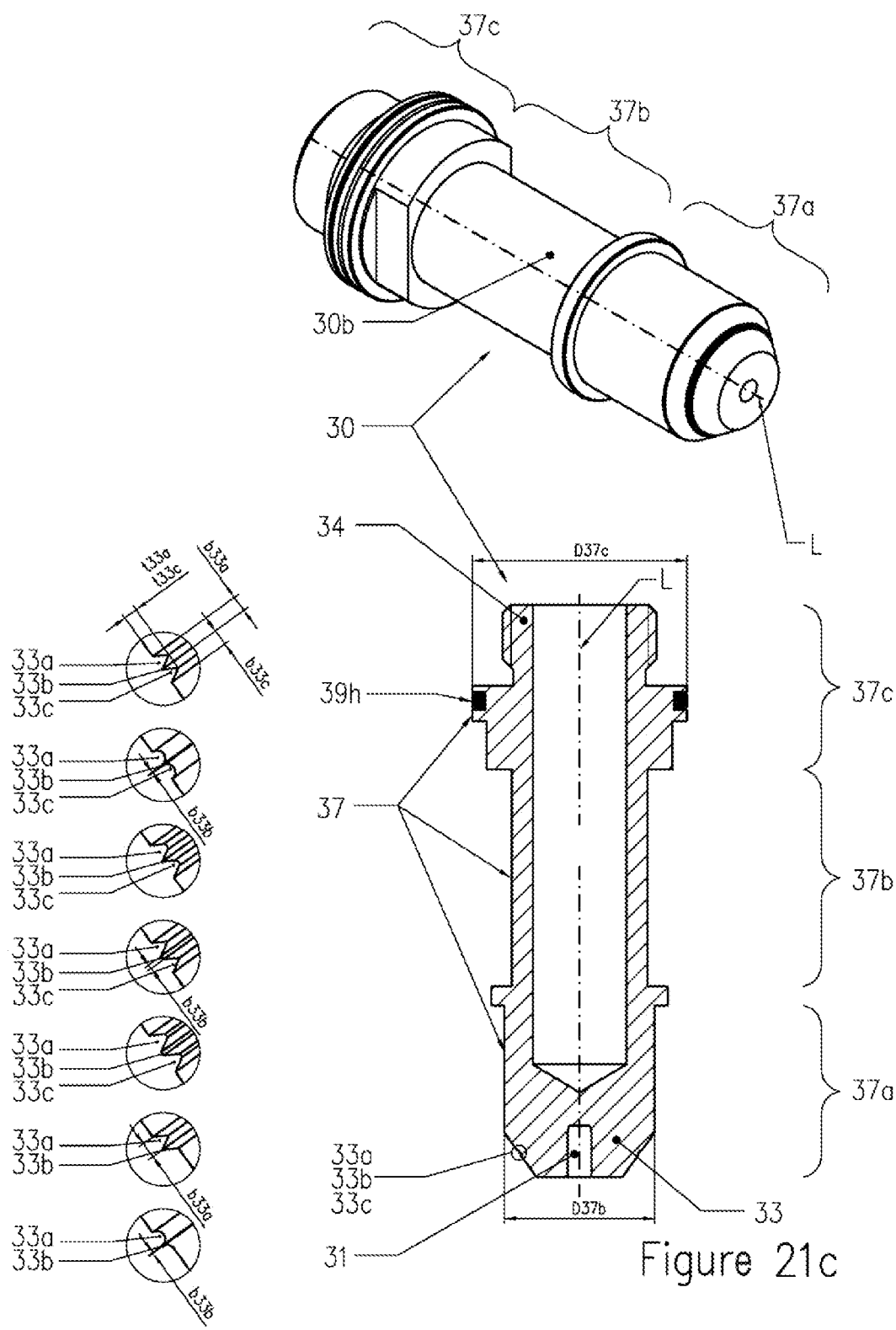
FIG. 21c shows an electrode of the plasma torch from FIG. 21 according to a further particular embodiment.

FIG. 21c shows an electrode similar to FIG. 21b, the "ignition edge" likewise in the region which tapers to the closed end 33, which region however tapers conically.

Figure 21D:
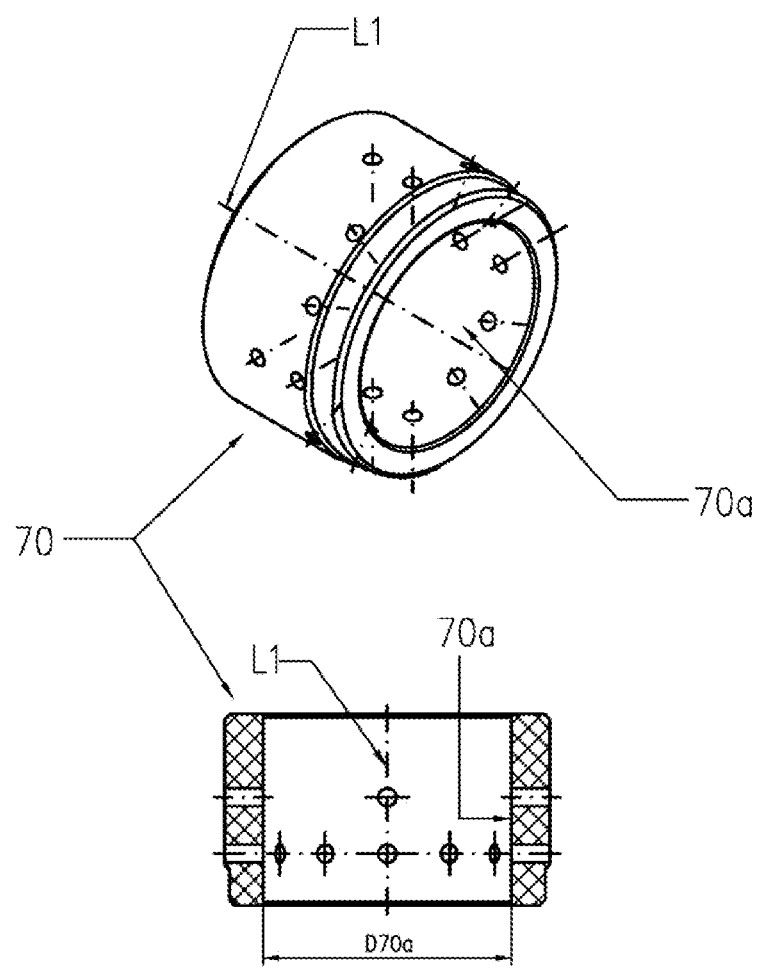
FIG. 21d shows a front gas-conducting unit 70 of the plasma torch from FIG. 21.

FIG. 21d shows the gas-conducting unit which is installed in the plasma torch 30 of FIG. 21.

Figure 22:
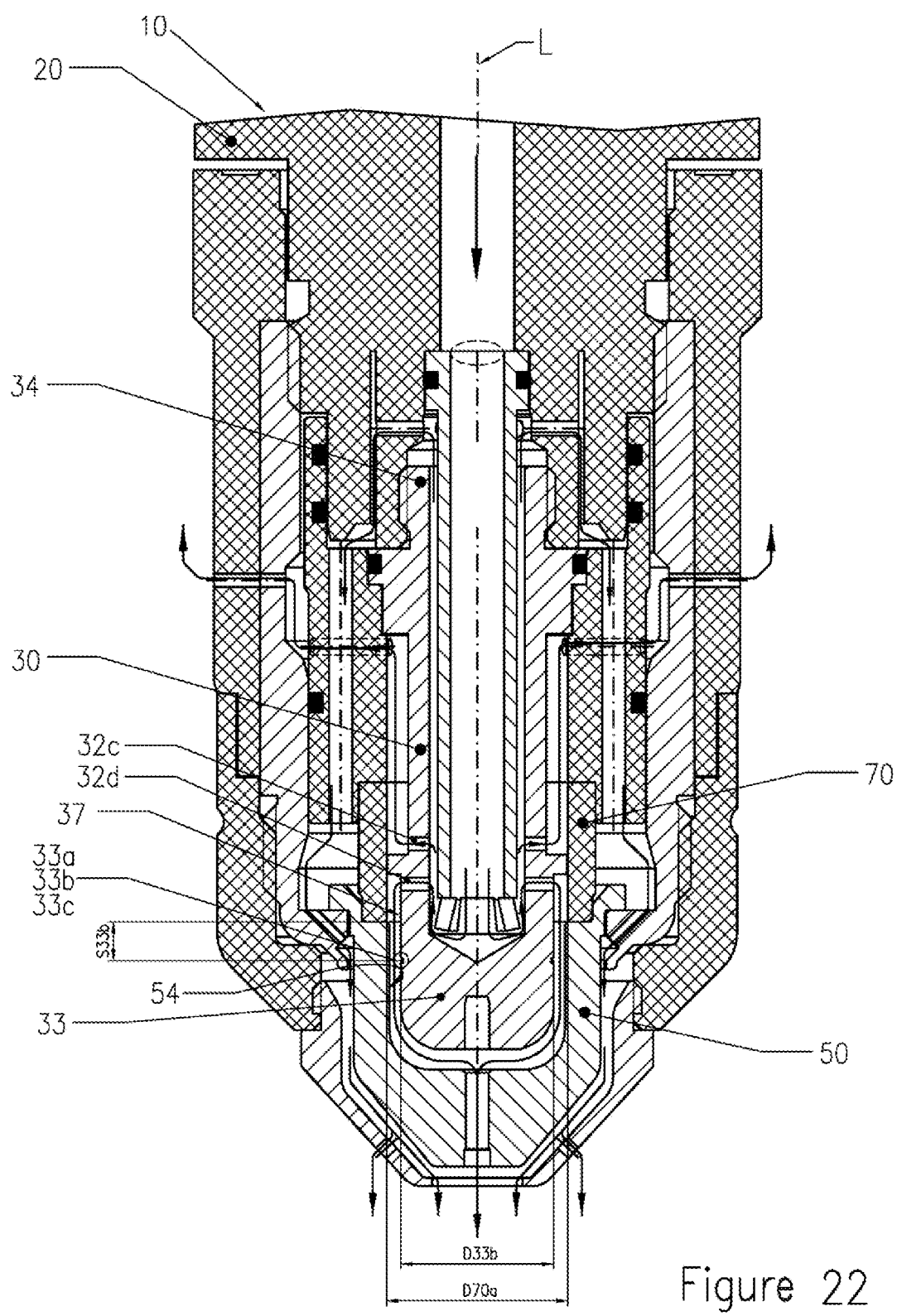
FIG. 22 is a sectional diagram of a plasma torch according to a further particular embodiment of the present invention.
Figure 22A:
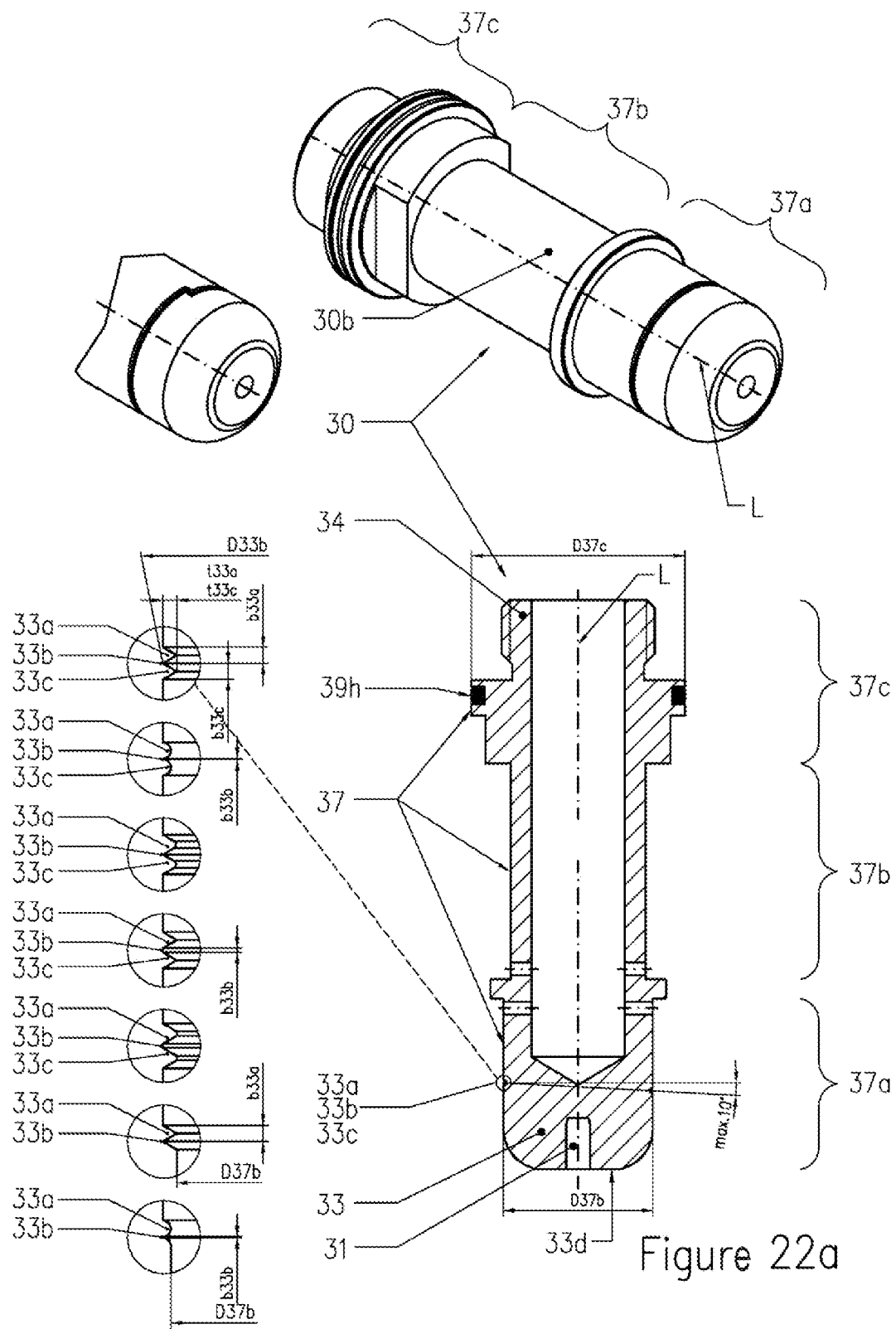
FIG. 22a shows an electrode of the plasma torch from FIG. 22.
Figure 22B:
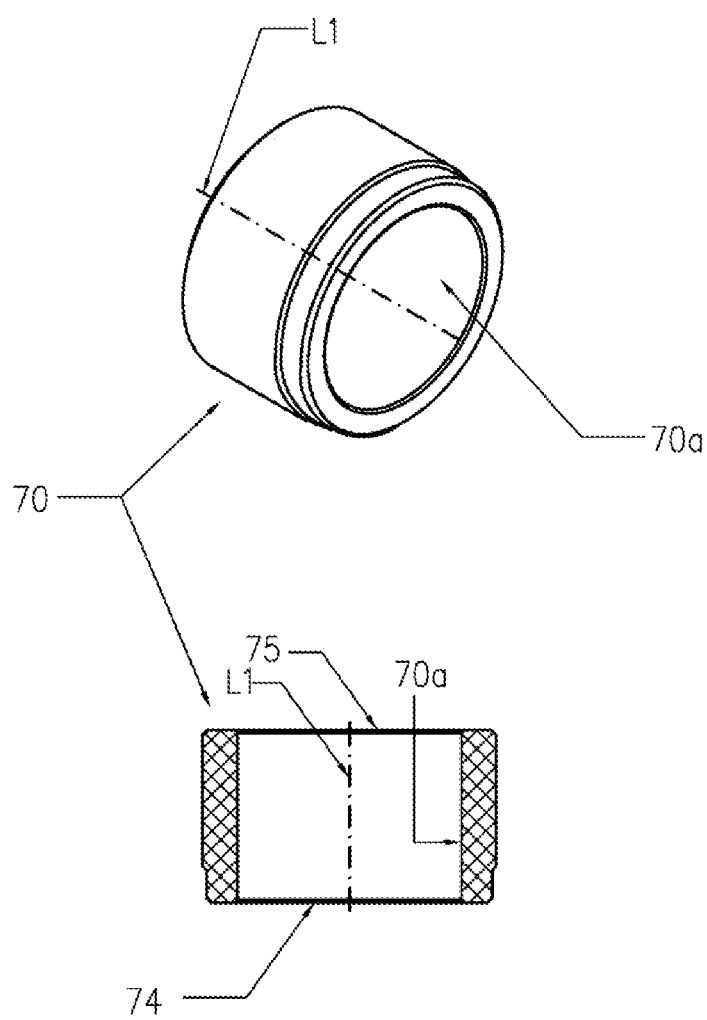
FIG. 22b shows a front gas-conducting unit 70 of the plasma torch from FIG. 22.
Figure 22C:
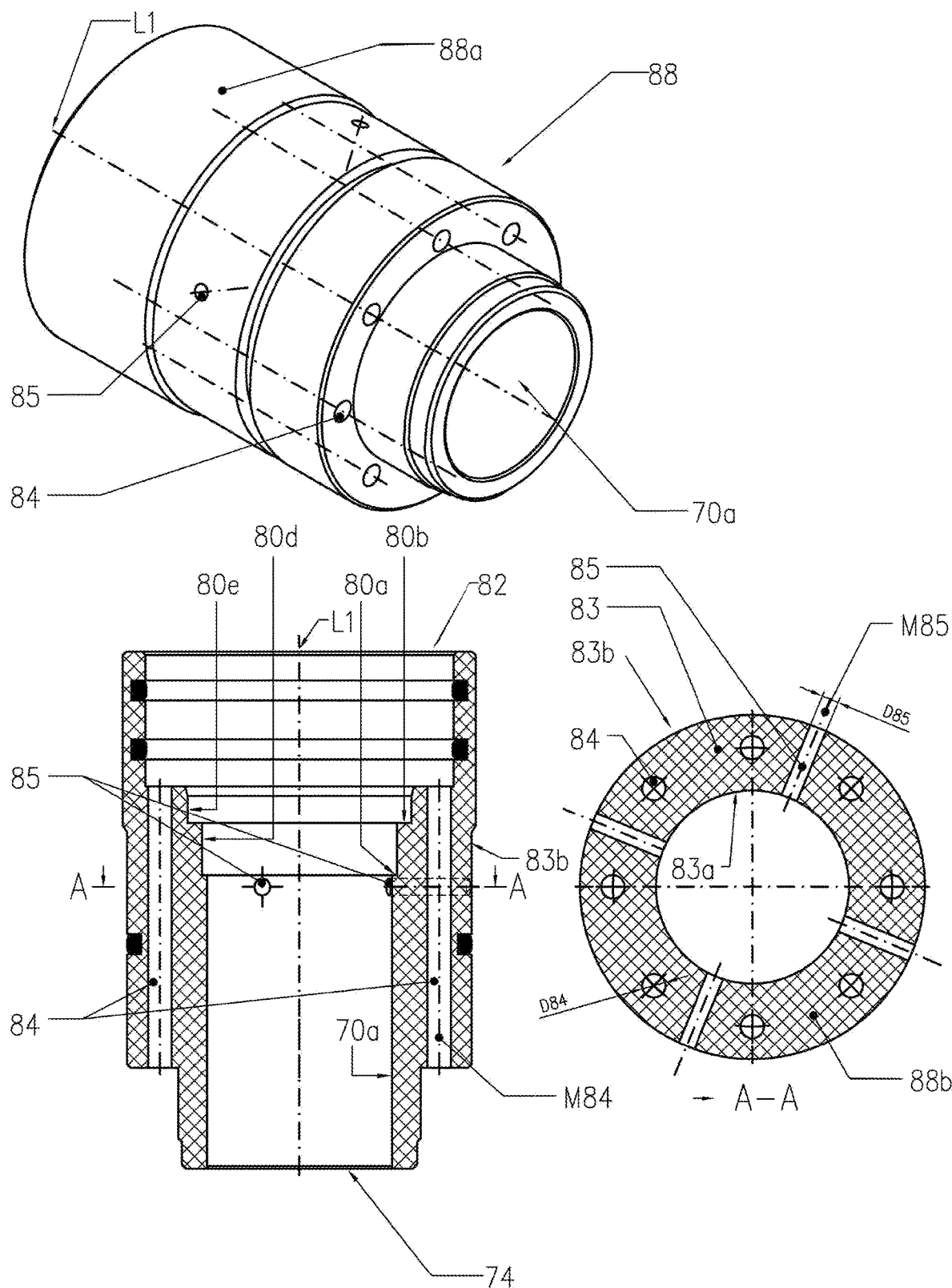
FIG. 22c shows a gas-conducting unit 88 of the plasma torch from FIG. 22.

FIGS. 22 and 22*a* show, additionally to FIGS. 21 and 21*a*, openings 32*c* and 32*d* in the electrode 30 for the partial gas streams 210 and 230 (corresponds substantially to FIGS. 13 and 13*a*). It is likewise possible for only the openings 32*c* or 32*d* to be situated in the electrode 30. It is important that the sequence of depression 33*a*, elevation 33*b* and depression 33*c* is situated on the outer surface 37 of the electrode 30 between the opening(s) 32*c* and/or 32*d* and the front end surface 33*d* of the front end 33 and/or the emission insert 31. This is also furthermore shown in FIGS. 5, 5*a*, 6, 6*a*, 7, 7*a*, 8, 8*a*, 9, 9*a*, 10, 10*a*, 11, 11*a*, 12, 12*a*, 13, 13*a*, 14, 14*a*, 15, 15*a*, 16, 16*a*, 17, 17*a*, 18, 18*a*, 19, 19*a*, 20 and 20*a*. FIG. 22*b* shows a gas-conducting unit (corresponds substantially to FIG. 13*b*). FIG. 22*c* shows a gas-conducting unit (corresponds substantially to FIG. 13*c*).

The features of the invention disclosed in the above description, in the drawings and in the claims may be essential both individually and in the various combinations for the realization of the invention in its various embodiments.

LIST OF DESIGNATIONS

- 10 Plasma torch
- 15 Plasma jet
- 20 Plasma torch body
- 21 Opening for gas feeder
- 22 Opening, groove, channel
- 23 Gas feeder
- 30 Electrode
- 30*a* Electrode wall
- 30*b* Electrode body
- 31 Emission insert
- 32 Cavity
- 32*a* Front cavity
- 32*b* Rear cavity
- 32*c* Opening(s) between cavity/inner surface and outer surface of the electrode for partial gas stream 230
- 32*d* Opening(s) between cavity/inner surface and outer surface of the electrode for partial gas stream 210
- 32*e* Body
- 33 Front end, closed end
- 33*a* Depression
- 33*b* Elevation
- 33*c* Depression
- 33*d* End surface of the electrode
- b33*a* Width of the depression 33*a*
- b33*b* Width of the elevation 33*b*
- b33*c* Width of the depression 33*c*
- D33*b* Diameter of the elevation 33*b*
- S33*b* Spacing
- t33*a* Depth of the depression 33*a*
- t33*c* Depth of the depression 33*c*
- 34 Rear end
- 34*a* Thread
- 36 Inner surface
- 36*a* Inner surface a
- 36*b* Inner surface b
- 37 Outer surface of the electrode
- 37*a* First portion of the outer surface of the electrode
- 37*b* Second portion of the outer surface of the electrode
- 37*c* Third portion of the outer surface of the electrode
- 37*d* Projection on outer surface
- 37*e* Spiral-shaped groove
- 38 Outer centering surface
- 39 Region of the electrode
- 39*a* Stop surface
- 39*b* Stop surface
- 39*c* Stop surface
- 39*d* Outer centering surface
- 39*e* Surface
- 39*f* Outer surface
- 39*g* Groove
- 39*h* Round ring
- 50 Nozzle
- 51 Nozzle bore
- 52 Cavity of the nozzle
- 53 Space between electrode and nozzle
- 54 Inner surface of the nozzle
- 54*a* Outer surface of the nozzle 50
- 54*b* Cavity (groove)
- 55 Nozzle holder
- 56 Openings or grooves in the nozzle holder
- 57 Openings or grooves in the nozzle holder
- 60 Nozzle protection cap
- 61 Nozzle protection cap opening
- 62 Cavity of the nozzle protection cap
- 63 Space between nozzle and nozzle protection cap
- 64 Openings in the nozzle protection cap
- 65 Nozzle protection cap bracket
- 66 Inner surface of the nozzle protection cap
- 70 Front gas-conducting unit
- 70*a* Inner surface of the gas-conducting unit 70
- 70*b* Gas-conducting unit body
- 70*c* Wall
- 71 Openings for first partial gas stream 210/plasma gas
- 72 Openings for third partial gas stream 230/cooling gas, electrode
- 73 Space between electrode and gas-conducting units
- 73*a* Annular gap
- 74 Front end of the front gas-conducting unit 70
- 75 Rear end of the front gas-conducting unit 70
- 76 Projection
- 76*a* Inner surface of the projection 76
- 80 Rear gas-conducting unit
- 80*a* Stop surface
- 80*b* Stop surface
- 80*d* Inner centering surface
- 80*e* Inner sealing surface
- 80*f* Gas-conducting unit body
- 80*g* Wall
- 81 Front end of the gas-conducting unit 80
- 82 Rear end of the gas-conducting unit 80
- 83 Wall of the gas-conducting unit 80
- 83*a* Inner surface of the wall of the gas-conducting unit 80
- 83*b* Outer surface of the wall of the gas-conducting unit 80
- 84 (Axial) openings and/or channels in the gas-conducting unit 80
- 85 (Radial) openings and/or channels in the gas-conducting unit 80
- 88 Gas-conducting unit
- 88*a* Gas-conducting unit body
- 88*b* Wall of the gas-conducting unit
- 90 Cooling tube
- 91 Interior space of the cooling tube
- 92 Inner surface of the cooling tube
- 93 Outer surface of the cooling tube
- 94 Cavity between electrode and cooling tube
- 94 Cooling tube body
- 95 Front end of the cooling tube
- 96 Rear end of the cooling tube
- 98 Coolant channel
- 100 Nozzle cap 100a Inner surface
100b Collecting groove (cavity)
100c Openings
101 Space between nozzle and nozzle cap
102 Space between nozzle cap and nozzle protection cap
200 Total gas stream
205 Partial gas stream
210 First partial gas stream, plasma gas
220 Second partial gas stream, cooling gas, nozzle-nozzle protection cap
225 Partial gas stream, cooling gas, nozzle-nozzle cap
226 Partial gas stream, cooling gas, nozzle cap-nozzle protection cap
230 Third partial gas stream, cooling gas, electrode
300 Plasma cutting installation
310 Electrical current source
320 High-voltage ignition device
330 Control unit
335 Gas supply
340 Pilot resistor
350 Nozzle contactor
360 Lines and hoses
361 Gas hose
362 Electrical line
363 Electrical line
370 Electrical line
400 Workpiece
A32 Area of the cavity 32
A32a Area of the front cavity 32a
A32b Area of the rear cavity 32b
A32c Area of the opening 32c
A32d Area of the opening 32d
D32 Diameter
D32a Diameter
D32b Diameter
L Longitudinal axis
L1 Longitudinal axes
M Central axis
α Angle
β Angle
δ Angle
γ Angle
ε Angle
a, b Offset with respect to the radial

The invention claimed is:

1. A method for conducting gas in a gas-cooled plasma torch, wherein the plasma torch has a plasma torch body which holds an electrode with an open end and a closed end, wherein a cavity extends from the open end in the direction of the closed end, and which, with a spacing in an axial direction, holds a nozzle by means of a nozzle holder, wherein the nozzle has a central opening with an upstream inlet end, into which the electrode projects, and with an outlet end with a nozzle bore and is surrounded by a nozzle cap and/or a nozzle protection cap, wherein the plasma torch body has an opening for a gas feeder, which opening is fluidically connected to a cooling tube which projects into the open end of the electrode, wherein the method comprises:

conducting a total gas stream through the opening of the gas feeder;
conducting the total gas stream through the cooling tube into the electrode in the direction of the closed end of the electrode;
conducting the total gas stream out of the electrode via an annular gap between the cooling tube and the electrode either only via a gas channel in the plasma torch body, which gas channel is fluidically connected to the annular gap via the open end of the electrode, or additionally via at least one opening in the wall of the electrode; and
conducting the first partial gas stream of the total gas stream through the first space formed between the electrode and the nozzle and through the nozzle bore, conducting a second partial gas stream of the total gas stream through a second space formed by the nozzle and the nozzle cap and/or through a space formed by the nozzle cap and the nozzle protection cap or through a second space formed by the nozzle and the nozzle protection cap and possibly also outward through one or more openings in the nozzle protection cap, and conducting a third partial gas stream of the total gas stream through a third space formed between the electrode and a gas-conducting unit and through one or more openings in the gas-conducting unit to the outer side of the plasma torch.

2. The method of claim 1, wherein the third partial gas stream is conducted through one or more openings in the nozzle holder to the outer side of the plasma torch.

3. The method of claim 1, wherein the total gas stream is divided up into the first to third partial gas streams only after exiting the electrode.

4. The method of claim 2, wherein the total gas stream is, after exiting the electrode, conducted through the at least one opening which is inclined at an angle δ in a range of ±15°, with respect to the longitudinal axis L1.

5. The method of claim 2, wherein the third partial gas stream is branched off from the total gas stream via the at least one opening in the wall of the electrode.

6. The method of claim 5, wherein the gas stream that corresponds to the total gas stream minus the third partial gas stream is, after exiting the electrode, conducted through at least one opening, which is inclined with respect to the longitudinal axis L1 or at an angle δ in the range of ±15°, with respect to the longitudinal axis L1, in the gas-conducting unit.

7. The method of claim 1, wherein the first partial gas stream is branched off from the total gas stream via the at least one opening in the wall of the electrode.

8. The method of claim 7, wherein the gas stream that corresponds to the total gas stream minus the first partial gas stream is, after exiting the electrode, conducted through at least one opening which is inclined at an angle δ in a range of ±15°, with respect to the longitudinal axis L1.

9. The method of claim 1, wherein the first and third partial gas streams are branched off from the total gas stream via the at least one opening in the wall of the electrode.

10. The method of claim 9, wherein the second partial gas stream is, after exiting the electrode, conducted through at least one opening which is inclined at an angle δ in a range of ±15°, with respect to the longitudinal axis L1.

11. The method of claim 1, wherein the conducting of the first partial gas stream through the first space comprises conducting through the first space with rotation about the longitudinal axis L in the direction of the closed end of the electrode.

12. The method of claim 1, wherein the conducting of the third partial gas stream through the third space comprises conducting through the third space about the longitudinal axis L in the direction of the open end of the electrode.

13. The method of claim 1, wherein, during operation, the difference between a pressure p1 in the cavity and a pressure p2 in the third space and/or the difference between the pressure p1 in the cavity and a pressure p3 in the first space, preferably in the immediate vicinity of the opening(s), are/is selected so as to amount to at least 1 bar.

14. The method of claim 13, wherein the operation comprises cutting operation and/or operation with a burning arc.

15. The method of claim 1, wherein, during operation, a pressure drop in the cavity between the open end of the electrode or the interior space of the cooling tube between the rear end and the front end and/or the opening(s) of the electrode is smaller than a pressure drop across the opening(s) between the inner surface and the outer surface of the electrode.

16. The method of claim 15, wherein the operation comprises cutting operation and/or operation with a burning arc.

17. A method for conducting gas in a gas-cooled plasma torch, wherein the plasma torch has a plasma torch body which holds an electrode with an open end and a closed end, wherein a cavity extends from the open end in the direction of the closed end, and which, with a spacing in an axial direction, holds a nozzle by means of a nozzle holder, wherein the nozzle has a central opening with an upstream inlet end, into which the electrode projects, and with an outlet end with a nozzle bore and is surrounded by a nozzle cap and/or a nozzle protection cap, wherein the plasma torch body has an opening for the gas feeder, wherein the method comprises:
 conducting a total gas stream through the opening for the gas feeder;
 branching off either i) a second partial gas stream or ii) a first and a second partial gas stream or iii) a second and a third partial gas stream from the total gas stream upstream of the electrode via a channel in the plasma torch body;
 conducting the remaining gas stream through the open end of the electrode into the cavity in the direction of the closed end of the electrode;
 conducting the remaining gas stream out of the electrode via at least one opening in the wall of the electrode; and
 conducting the first partial gas stream of the total gas stream through the first space formed between the electrode and the nozzle and through the nozzle bore, conducting the second partial gas stream of the total gas stream through a second space formed by the nozzle and the nozzle cap and/or through a second space formed by the nozzle and the nozzle protection cap and possibly also outward through one or more openings in the nozzle protection cap, and conducting the third partial gas stream of the total gas stream through a third space formed between the electrode and a gas-conducting unit and through one or more openings in the gas-conducting unit to the outer side of the plasma torch.

18. The method of claim 17, wherein the third partial gas stream is conducted through one or more openings in the nozzle holder to the outer side of the plasma torch.

19. The method of claim 17, wherein, if the remaining gas stream comprises the first partial gas stream and a third partial gas stream, said remaining gas stream is also divided up in the electrode into the first partial gas stream and the third partial gas stream.

20. The method of claim 19, wherein the remaining gas stream is divided up by branching off the first and third partial gas streams via the at least one opening in the wall of the electrode.

21. The method of claim 19, wherein the branched-off second partial gas stream is conducted through the at least one opening which is inclined at an angle $\delta$ in a range of ±15°, with respect to the longitudinal axis L1.

22. The method of claim 17, wherein, if the first and the second partial gas stream are branched off upstream of the electrode, the branched-off first and second partial gas streams are conducted through the at least one opening which is inclined relative to the longitudinal axis L1 at an angle $\delta$ in the range of ±15°, with respect to the longitudinal axis L1.

23. The method of claim 17, wherein the conducting of the first partial gas stream through the first space comprises conducting through the first space with rotation about the longitudinal axis L in the direction of the closed end of the electrode.

24. The method of claim 17, wherein the conducting of the third partial gas stream through the third space comprises conducting through the third space about the longitudinal axis L in the direction of the open end of the electrode.

25. The method of claim 17, wherein, during operation, the difference between a pressure p1 in the cavity and a pressure p2 in the third space and/or the difference between the pressure p1 in the cavity and a pressure p3 in the first space, preferably in the immediate vicinity of the opening(s), are/is selected so as to amount to at least 1 bar.

26. The method of claim 25, wherein the operation comprises cutting operation and/or operation with a burning arc.

27. The method of claim 17, wherein, during operation, a pressure drop in the cavity between the open end of the electrode or the interior space of the cooling tube between the rear end and the front end and/or the opening(s) of the electrode is smaller than a pressure drop across the opening(s) between the inner surface and the outer surface of the electrode.

28. The method of claim 27, wherein the operation comprises cutting operation and/or operation with a burning arc.

* * * * *